United States Patent
Shen et al.

(10) Patent No.: US 7,221,714 B2
(45) Date of Patent: May 22, 2007

(54) NON-SYSTEMATIC AND NON-LINEAR PC-TCM (PARALLEL CONCATENATE TRELLIS CODED MODULATION)

(75) Inventors: Ba-Zhong Shen, Irvine, CA (US); Kelly Brian Cameron, Irvine, CA (US); Hau Thien Tran, Irvine, CA (US); Christopher R. Jones, Los Angeles, CA (US)

(73) Assignee: Broadcom Corporation, Irvine, CA (US)

( * ) Notice: Subject to any disclaimer, the term of this patent is extended or adjusted under 35 U.S.C. 154(b) by 756 days.

(21) Appl. No.: 10/446,318

(22) Filed: May 27, 2003

(65) Prior Publication Data

US 2004/0228419 A1 Nov. 18, 2004

Related U.S. Application Data

(60) Provisional application No. 60/469,777, filed on May 12, 2003.

(51) Int. Cl.
*H04L 5/12* (2006.01)
*H04L 23/02* (2006.01)

(52) U.S. Cl. .................. 375/265; 375/261; 375/260

(58) Field of Classification Search ............... 375/265, 375/261, 260
See application file for complete search history.

(56) References Cited

U.S. PATENT DOCUMENTS

| 5,406,570 | A | | 4/1995 | Berrou et al. |
| 5,446,747 | A | | 8/1995 | Berrou |
| 5,563,897 | A | | 10/1996 | Pyndiah et al. |
| 5,594,742 | A | * | 1/1997 | Hemmati ............... 714/792 |
| 6,023,783 | A | * | 2/2000 | Divsalar et al. ......... 714/792 |
| 6,065,147 | A | | 5/2000 | Pyndiah et al. |
| 6,119,264 | A | | 9/2000 | Berrou et al. |
| 6,122,763 | A | | 9/2000 | Pyndiah et al. |
| 2002/0036714 | A1 | * | 3/2002 | Markman ............... 348/607 |

FOREIGN PATENT DOCUMENTS

| EP | 0 735 696 A2 | 10/1996 |
| EP | 0 735 696 A3 | 1/1999 |
| FR | 91 05278 A1 | 10/1992 |

* cited by examiner

*Primary Examiner*—David C. Payne
*Assistant Examiner*—Jia Lu
(74) *Attorney, Agent, or Firm*—Garlick Harrison & Markison; Shayne X. Short

(57) ABSTRACT

Non-systematic and non-linear PC-TCM (Parallel Concatenate Trellis Coded Modulation). A non-systematic and non-linear PC-TCM code is presented that provides quite comparable performance to turbo encoding using only systematic and linear trellis codes (e.g., convolutional codes). The non-systematic and non-linear PC-TCM described herein may be modified to support a wide variety of code rates (e.g., rate 2/3, 5/6, 8/9, and 3/4 among other rates) and also a wide modulation types (e.g., 8 PSK (8 Phase Shift Key) and 16 QAM (16 Quadrature Amplitude Modulation) among other modulation types). In one embodiment, a non-systematic and non-linear PC-TCM presented herein comes to within approximately 0.15 dB of a systematic and linear turbo code. A design approach is presented that allows for the design of such non-systematic and non-linear PC-TCM codes and several exemplary embodiments are also presented that have been designed according to these presented principles.

37 Claims, 40 Drawing Sheets overview of functionality of communication system satellite communication system HDTV (High Definition Television) communication system

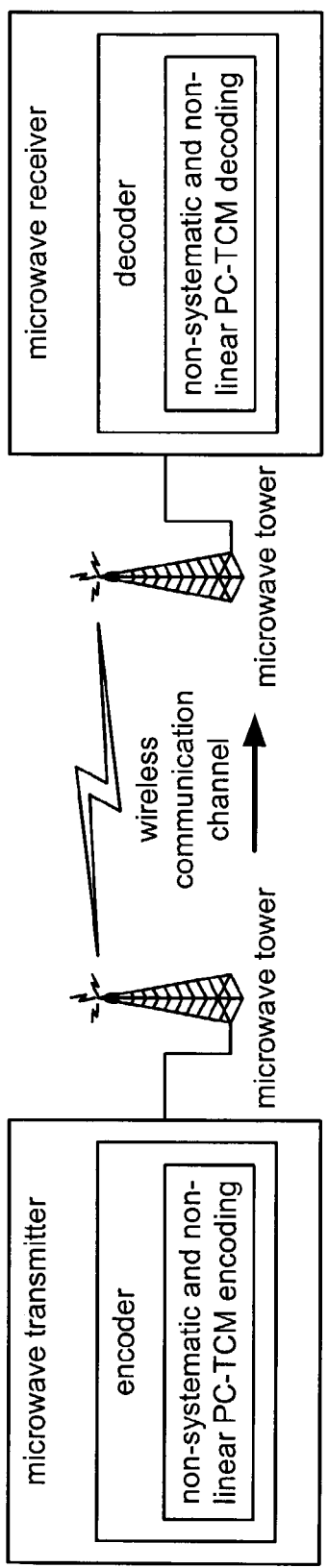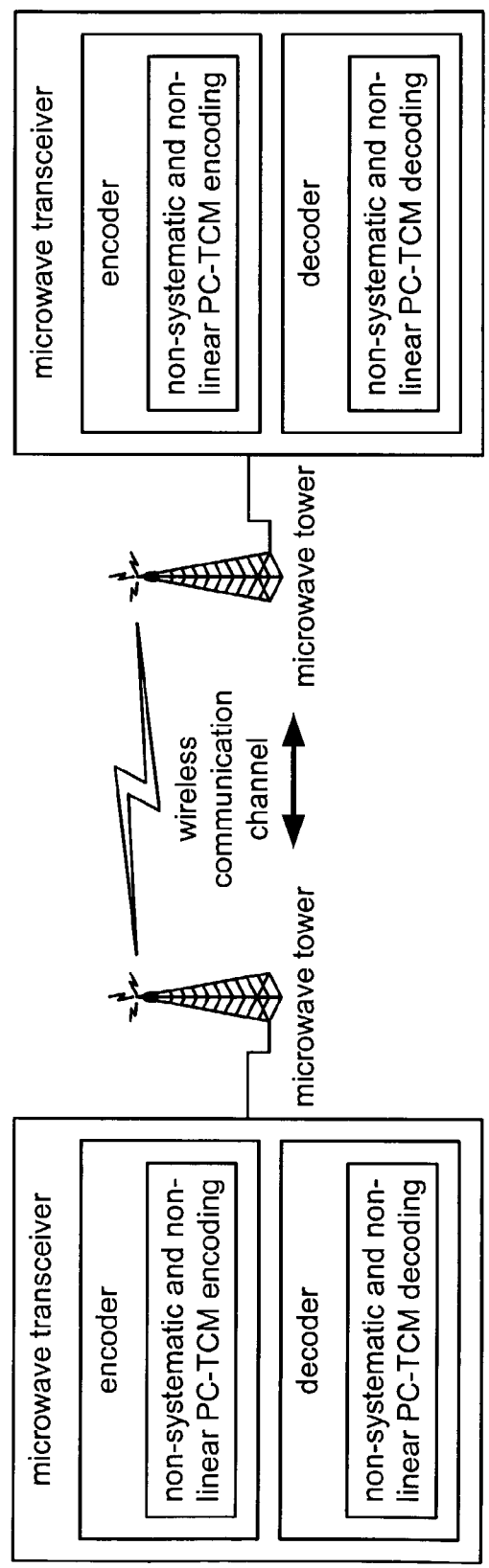

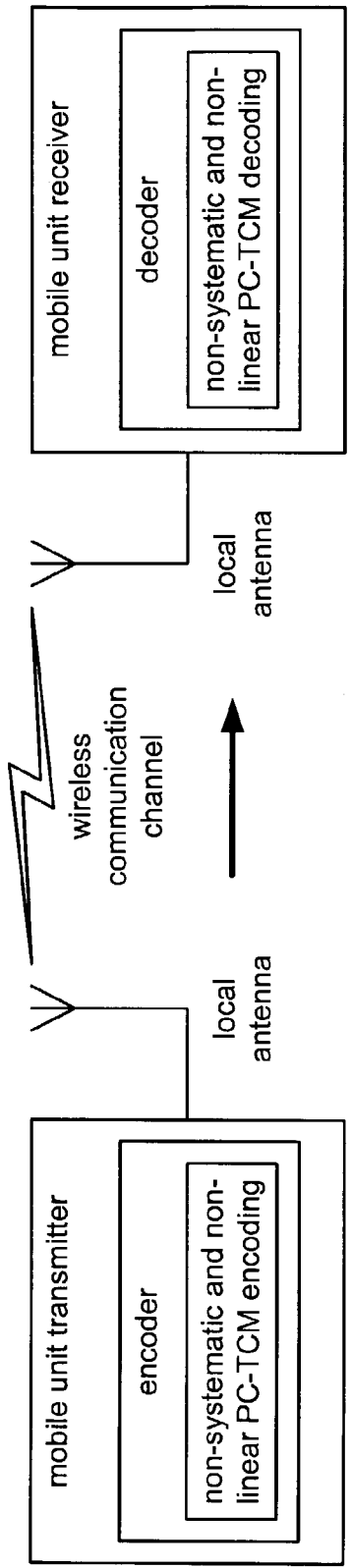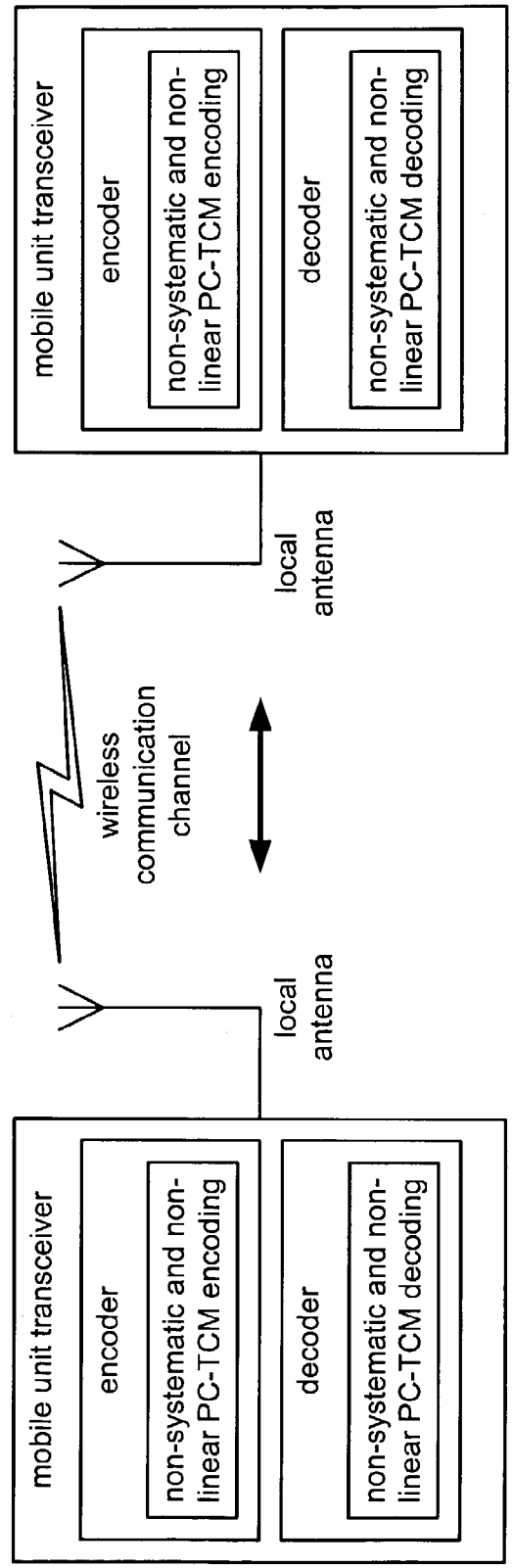
Fig. 5A  uni-directional point-to-point radio communication system
Fig. 5B  bi-directional point-to-point radio communication system

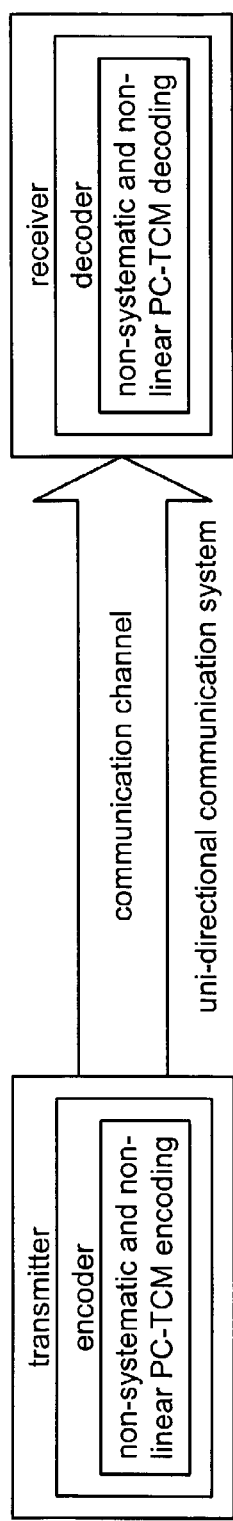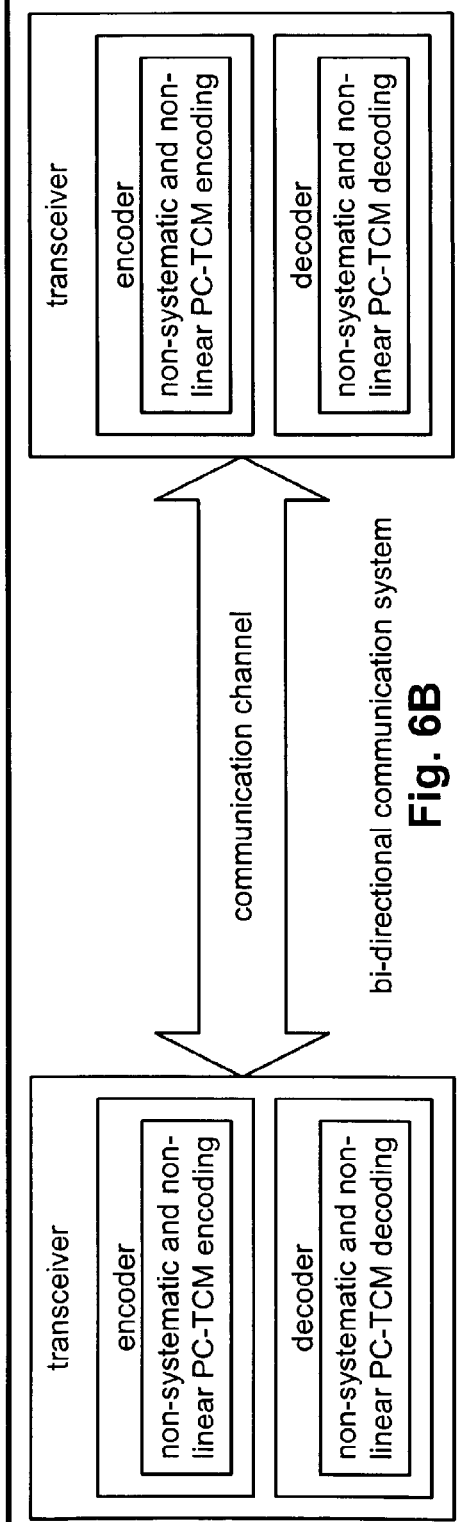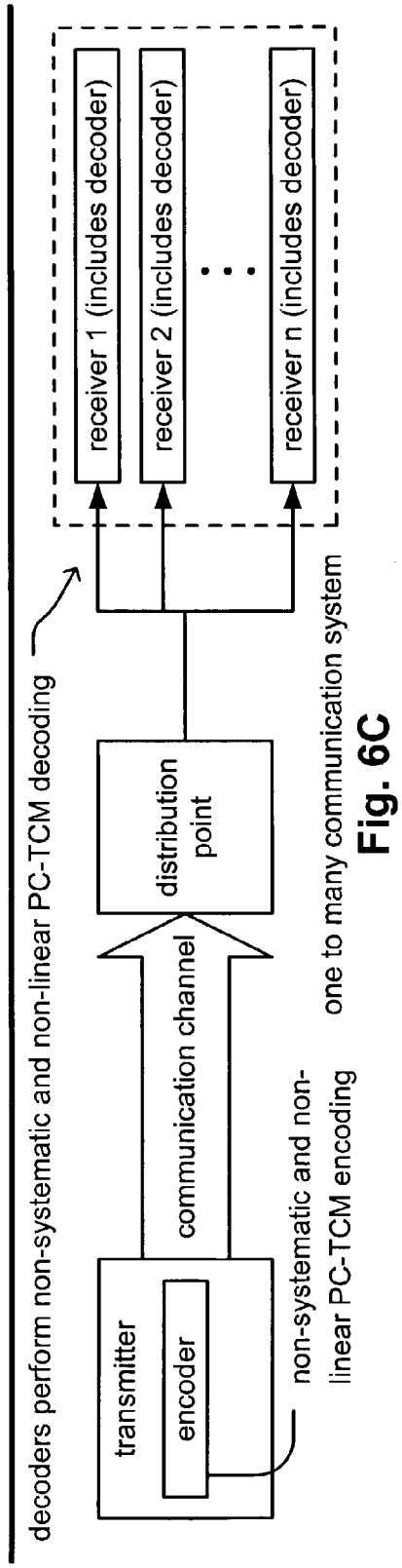
Fig. 6A uni-directional communication system
Fig. 6B bi-directional communication system
Fig. 6C one to many communication system PC-TCM (Parallel Concatenate Trellis Coded Modulation) communication system overview of functionality of communication system non-systematic and non-linear PC-TCM (Parallel Concatenate Trellis Coded Modulation) code design

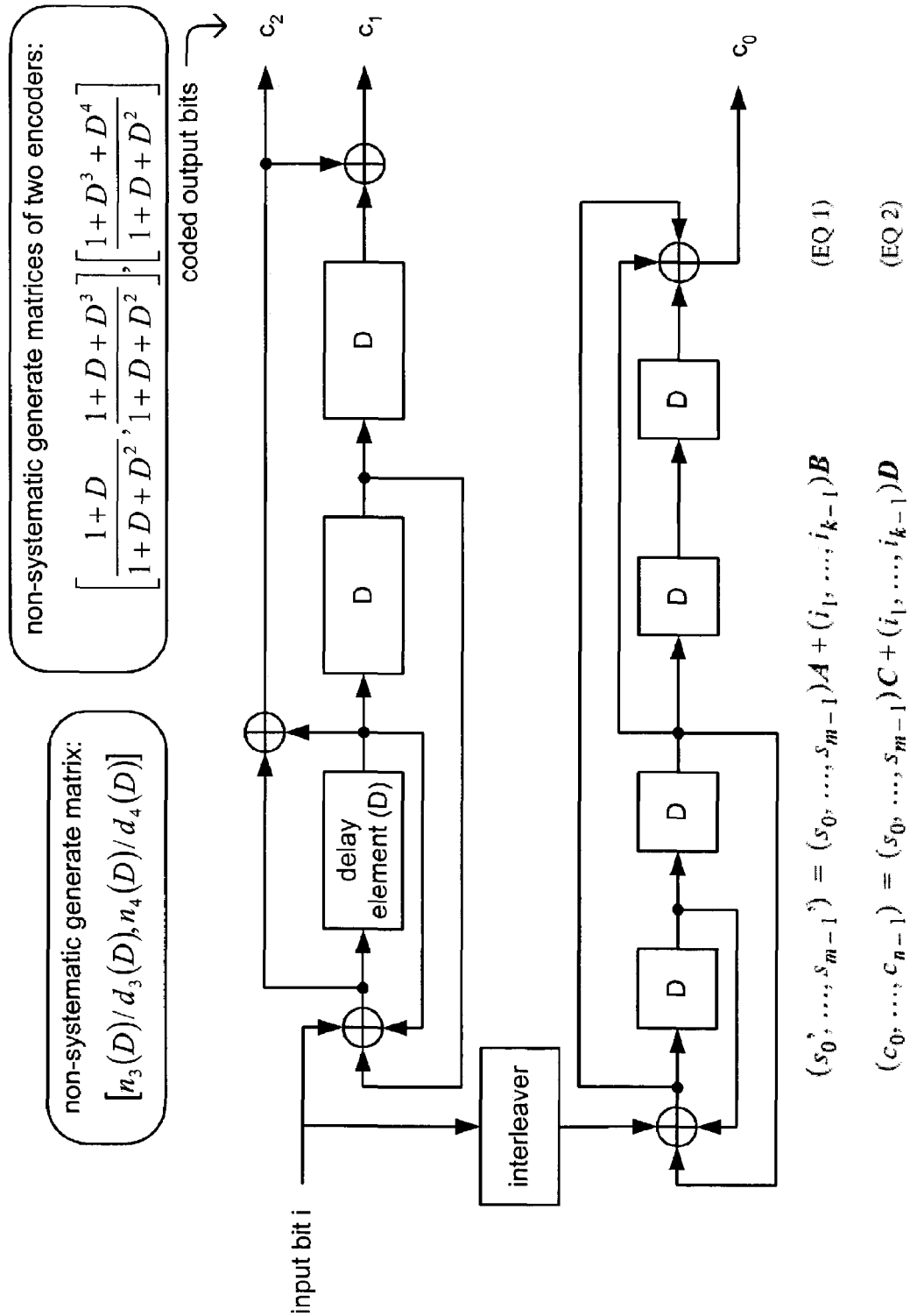
Fig. 12 (prior art: Collins, et al.)

output $o_{s,0}, o_{s,1}, o_{s,2}, o_{s,3}$
input $(i_{s,0}, i_{s,1}, i_{s,2}, i_{s,3})$ non-systematic trellis representation rate 2/3 systematic encoder 8 PSK constellation for rate 2/3 systematic PC-TCM trellis of rate 2/3 systematic encoder performance of rate 2/3 and 1-8 PSK systematic PC-TCM (Parallel Concatenate Trellis Coded Modulation) encoder rate 2/3 non-systematic and linear encoder A

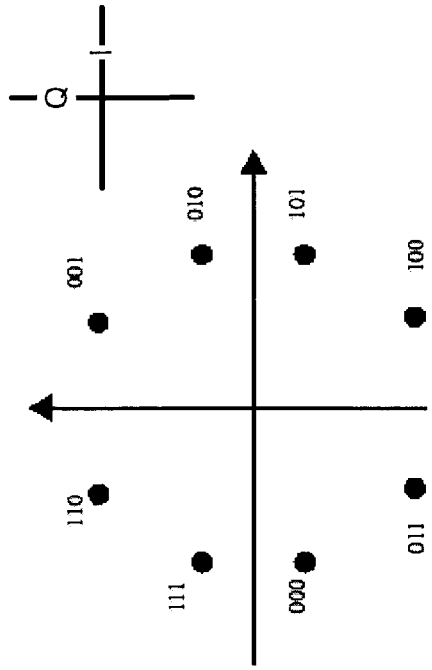

with respect to trellis of rate 2/3 systematic encoder (Fig. 14A): output (different), input (same)

$$A = \begin{bmatrix} 0 & 1 & 0 \\ 0 & 0 & 1 \\ 1 & 0 & 1 \end{bmatrix}, B = \begin{bmatrix} 0 & 1 & 1 \\ 0 & 1 & 0 \end{bmatrix}, C = \begin{bmatrix} 0 & 0 & 1 \\ 0 & 0 & 0 \\ 1 & 1 & 1 \end{bmatrix}, D = \begin{bmatrix} 0 & 0 & 1 \\ 0 & 1 & 1 \end{bmatrix}$$

matrices of rate 2/3 non-systematic and linear encoder A (showing linearity)

Fig. 17B

8 PSK constellation for rate 2/3 non-systematic and linear PC-TCM encoder A

Fig. 17C

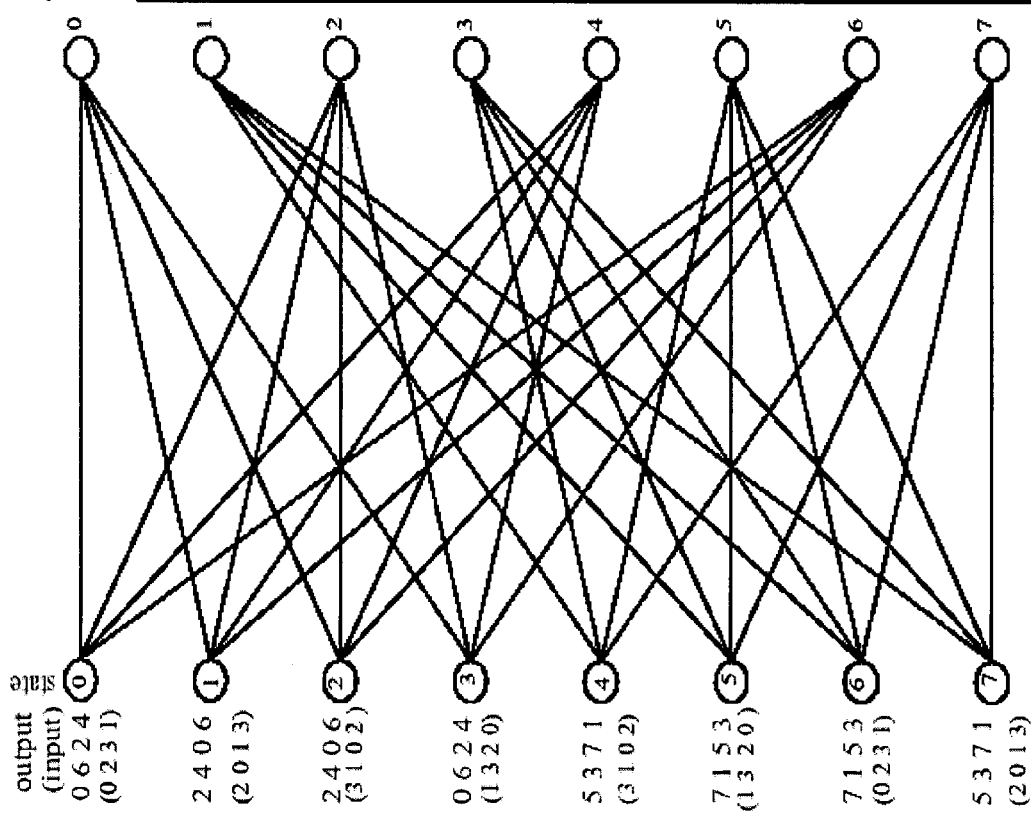

trellis of rate 2/3 non-systematic and linear encoder A

Fig. 17A output (input)
0 6 2 4 (0 2 3 1)
2 4 0 6 (2 0 1 3)
2 4 0 6 (3 1 0 2)
0 6 2 4 (1 3 2 0)
5 3 7 1 (3 1 0 2)
7 1 5 3 (1 3 2 0)
7 1 5 3 (0 2 3 1)
5 3 7 1 (2 0 1 3)

performance of various rate 2/3 encoders

Fig. 19A — trellis of rate 2/3 non-systematic and non-linear encoder B

Fig. 19B — 8 PSK constellation for rate 2/3 non-systematic and non-linear PC-TCM encoder B possible embodiment of rate 2/3 non-systematic and non-linear encoder B performance of various rate 2/3 encoders possible embodiment of rate 2/3 non-systematic and non-linear encoder C performance of various rate 2/3 encoders ($E_b/N_0$ of encoder C reaches approximately within 0.15 dB of rate 2/3 systematic and linear PC-TCM encoder, but slightly higher BER floor than encoder B)

8 PSK constellation for rate 2/3 non-systematic and non-linear PC-TCM encoder D trellis of rate 2/3 non-systematic and non-linear encoder D possible embodiment of rate 2/3 non-systematic and non-linear encoder D Fig. 28A — trellis of rate 2/3 non-systematic and non-linear encoder E Fig. 28B — 8 PSK constellation for rate 2/3 non-systematic and non-linear PC-TCM encoder E possible embodiment of rate 2/3 non-systematic and non-linear encoder E performance of various rate 2/3 encoders
(encoders D and E have comparable performance)

rate 5/6 non-systematic and non-linear constituent encoder: scheme I rate 5/6 non-systematic and non-linear constituent encoder: scheme II 8 PSK constellation mappers for rate 5/6 non-systematic and non-linear PC-TCM encoder performance of various rate 5/6 PC-TCM encoders rate 8/9 non-systematic constituent encoder: scheme III rate 8/9 non-systematic constituent encoder: scheme IV 8 PSK constellation mappers for rate 8/9 non-systematic and non-linear PC-TCM encoder performance of rate 8/9 PC-TCM encoders rate 3/4 non-systematic constituent encoder constellation mapper of rate 3/4 and 16 QAM non-systematic and non-linear PC-TCM encoder performance of rate 3/4 and 16 QAM non-systematic and non-linear PC-TCM encoder non-systematic and non-linear PC-TCM (Parallel Concatenate Trellis Coded Modulation) code design method non-systematic and non-linear PC-TCM (Parallel Concatenate Trellis Coded Modulation) code design method

NON-SYSTEMATIC AND NON-LINEAR PC-TCM (PARALLEL CONCATENATE TRELLIS CODED MODULATION)

CROSS REFERENCE TO RELATED PATENTS/PATENT APPLICATIONS

The present U.S. Utility Patent Application claims priority pursuant to 35 U.S.C. § 119(e) to the following U.S. Provisional Patent Application which is hereby incorporated herein by reference in its entirety and made part of the present U.S. Utility Patent Application for all purposes:
1. U.S. Provisional Application Ser. No. 60/469,777, entitled "Non-systematic and non-linear PC-TCM (Parallel Concatenate Trellis Coded Modulation)," filed May 12, 2003 (May 12, 2003), pending.

BACKGROUND OF THE INVENTION

1. Technical Field of the Invention

The invention relates generally to communication systems; and, more particularly, it relates to coding and decoding of signals employed within such communication systems.

2. Description of Related Art

Data communication systems have been under continual development for many years. One particular type of communication system, turbo code type communication systems, and variants thereof have been the focus of a great deal of interest in the recent years. A primary directive in this area of development has been to try continually to lower the BER (Bit Error Rate) floor for communication channel's having a given SNR (Signal to Noise Ratio. The SNR is oftentimes referred to in terms of the $E_b/N_o$ (ratio of energy per bit $E_b$ to the Spectral Noise Density $N_o$) waterfall part within such a communication system that supports a given BER.

In designing such communication systems and codes employed therein, the ideal goal has been to try reach Shannon's limit in a communication channel. Shannon's limit (sometimes referred to as the communication channel's capacity) may be viewed as being the data rate that is used in a communication channel, having a particular SNR (Signal to Noise Ratio), that will achieve error free transmission through the channel; that is to say, the Shannon's limit is a particular SNR of the communication channel that will support precisely 0.0 BER. In other words, the Shannon limit is the theoretical bound for channel capacity for a given modulation and code rate. The code rate is the ratio of information bits over the total number of bits transmitted within the communication system. In the turbo code context, it is common to refer to code rate (or simply "rate") of n/m, where n is the number of information bits and m is the total number of bits, and where m>n. The difference between m and n typically is referred to as the number of redundancy bits or parity bits of the encoded signal. Turbo codes typically introduce a degree of redundancy to at least a portion of data prior to transmission through a communication channel. This is oftentimes generally referred to as FEC (Forward Error Correction) coding.

Within the context of turbo code design and other code designs having a common directive to achieve as low of a BER floor as possible, there has been a relatively cohesive agreement within the code design community. There is a common belief that the highest performance codes necessarily reside in the code space of turbo codes employing systematic and linear trellises. In designing such turbo codes, the encoder is typically designed such that the encoder satisfies: (1) Ungerboeck's rule for designing systematic TCM (Trellis Coded Modulation) codes and (2) a minimum Hamming distance or Euclidean distance. In short, there has been a belief that to achieve the best performance within such turbo codes, systematic and linear codes are those codes that will provide the greatest results. However, there has also been a great deal of development in the arena of non-systematic codes. It would be desirable if a non-systematic code could be developed that could provide comparable performance to the systematic and linear codes that currently provide for the greatest performance. Unfortunately, however, the prior art does presently provide for any means by which such a code may be designed or implemented.

BRIEF SUMMARY OF THE INVENTION

Various aspects of the invention can be found in a method that is employed to design a non-systematic and non-linear PC-TCM (Parallel Concatenate Trellis Coded Modulation) encoder. Other aspects of the invention may be found in an actual encoder that has been designed according to such a method. The encoder may be of a number of code rate types of encoders.

One such encoder is a non-systematic and non-linear PC-TCM encoder. The encoder includes a rate k/k+n (k and n are integers) upper constituent encoder that is operable to receive input bits and to generate a first plurality of output bits there from. In addition, the encoder includes a sub-block interleaver that is operable to interleave input bit sub-blocks selected during alternate clock cycles. Another constituent encoder is also included; the encoder includes a rate k/k+n (again, k and n are integers) lower constituent encoder that is operable to receive the interleaved input bit sub-blocks from the sub-block interleaver and to generate a second plurality of output bits there from. In some embodiments, the rate k/k+n upper constituent encoder and the rate k/k+n lower constituent encoder may be implemented as rate a rate k/k+1 upper constituent encoder and a rate k/k+1 lower constituent encoder, respectively.

The operation of the encoder may be described as follows: during alternate clock cycles, a symbol mapper of the encoder alternatively selects and groups bits from the first plurality of output bits and the second plurality of output bits to generate a plurality of output symbols. The symbol mapper maps also output symbols from the plurality of output symbols to a constellation according to a symbol mapping. Each of the rate k/k+n upper constituent encoder and the rate k/k+n lower constituent encoder employs a common trellis having a fixed output state distribution and a plurality of fixed state transitions. A corresponding input state distribution for this trellis is identified and employed to support non-systematic and non-linear trellis encoding within each of the rate k/k+n upper constituent encoder and the rate k/k+n lower constituent encoder.

There are also a number of particular variations that may be made to the encoder without departing from the scope and spirit of the invention. Some such variation embodiments are described below. For example, in certain embodiments, the rate k/k+n upper constituent encoder and the rate k/k+n lower constituent encoder may be implemented as rate 2/3 constituent encoders. The symbol mapper may be implemented such that it selects and employs at least one uncoded bit when generating at least one output symbol of the plurality of output symbols. Alternatively, the rate k/k+n upper constituent encoder and the rate k/k+n lower constituent encoder may alternatively be implemented such that they are both rate 5/6 constituent encoders, rate 8/9 constituent encoders, or rate 3/4 constituent encoders.

In some embodiments, each of the rate 5/6 constituent encoders and the rate 8/9 constituent encoders is implemented using a rate 2/3 constituent encoder in conjunction with puncturing of at least output bit. For the rate 5/6 constituent encoders, the output bits are grouped to simultaneously form 2 separate output symbols of 3 bits each. For the rate 8/9 constituent encoders, the output bits are grouped to simultaneously form 3 separate output symbols of 3 bits each. The output symbols of 3 bits each are 8 PSK (8 Phase Shift Key) output symbols, and the symbol mapper is an 8 PSK symbol mapper.

For the rate 3/4 constituent encoders, three output bits and one uncoded bit are grouped to form an output symbols having 4 bits. The output symbol having 4 bits is a 16 QAM (16 Quadrature Amplitude Modulation) output symbol, and the symbol mapper is a 16 QAM symbol mapper.

The trellis employed by the encoder may be an 8 state trellis. Also in such embodiments, the rate k/k+n upper constituent encoder and the rate k/k+n lower constituent encoder are both rate 2/3 constituent encoders, and each of the rate 2/3 upper constituent encoder and the rate 2/3 lower constituent encoder encodes input symbols including 2 bits each and generates output symbols including 3 bits each.

The BER (Bit Error Rate) curve of such non-systematic and non-linear PC-TCM encoder designed according to the invention is relatively comparable to that of a systematic and linear PC-TCM encoder. For example, in one embodiment, when the non-systematic and non-linear PC-TCM encoder is a rate 2/3 non-systematic and non-linear PC-TCM encoder, and when the symbol mapper maps output symbols to an 8 PSK (8 Phase Shift Key) shaped constellation, then for a communication channel having a Shannon's limit capacity of approximately 2 bits per second per Hz (Hertz), the lowest $E_b/N_o$ (ratio of energy per bit $E_b$ to the Spectral Noise Density $N_o$) waterfall part of the rate 2/3 non-systematic and non-linear PC-TCM encoder ranges between approximately 3.45 dB (decibels) at a BER (Bit Error Rate) of approximately $2 \times 10^{-3}$ and approximately 3.65 dB at a BER of approximately $3 \times 10^{-7}$, and the BER floor of the rate 2/3 non-systematic and non-linear PC-TCM encoder ranges between approximately $2 \times 10^{-7}$ and approximately $3 \times 10^{-7}$.

Several various encoder embodiments are presented herein, and the encoders may be implemented within a variety of communication systems including any one or more of a satellite communication system, an HDTV (High Definition Television) communication system, a cellular communication system, a microwave communication system, a point-to-point communication system, and a uni-directional communication system, a bi-directional communication system, and a one to many communication system.

BRIEF DESCRIPTION OF THE SEVERAL VIEWS OF THE DRAWINGS

FIG. 4A is a system diagram illustrating an embodiment of a uni-directional microwave communication system that is built according to the invention.

FIG. 4B is a system diagram illustrating an embodiment of a bi-directional microwave communication system that is built according to the invention.

FIG. 5A is a system diagram illustrating an embodiment of a uni-directional point-to-point radio communication system that is built according to the invention.

FIG. 5B is a system diagram illustrating an embodiment of a bi-directional point-to-point radio communication system that is built according to the invention.

FIG. 6A is a system diagram illustrating an embodiment of a uni-directional communication system that is built according to the invention.

FIG. 6B is a system diagram illustrating an embodiment of a bi-directional communication system that is built according to the invention.

FIG. 6C is a system diagram illustrating an embodiment of a one to many communication system that is built according to the invention.

FIG. 12 is a diagram illustrating a prior art embodiment of a non-systematic and linear turbo encoder with base code rate 1/3 (as described in Collins, et al.).

FIG. 17A is a diagram illustrating an embodiment of a trellis of the rate 2/3 non-systematic and linear encoder A that is built according to the invention.

FIG. 17B is a diagram illustrating an embodiment of matrices of the rate 2/3 non-systematic and linear encoder A (showing its linearity) that is built according to the invention.

FIG. 17C is a diagram illustrating an embodiment of an 8 PSK constellation for the rate 2/3 non-systematic and linear PC-TCM encoder (built using the encoder A as the constituent encoders) that is built according to the invention.

DETAILED DESCRIPTION OF THE INVENTION

The invention presents a non-systematic and non-linear PC-TCM (Parallel Concatenate Trellis Coded Modulation) code design approach and also presents a number of possible such encoder embodiments that may be designed according to the invention. For the first time, a non-systematic and non-linear PC-TCM has been designed whose performance comes relatively close to that of turbo encoders using systematic and linear trellis codes (e.g., convolutional codes). In one embodiment, the invention presents a non-systematic and non-linear PC-TCM that comes to within 0.15 dB of the performance of a turbo encoder using systematic and linear trellis codes; that is to say, the invention presents a non-systematic and non-linear PC-TCM that operates within 0.15 dB of the SNR (Signal to Noise Ratio) of such a prior art turbo encoder using systematic and linear trellis codes.

More specifically, to arrive at the non-systematic and non-linear PC-TCM describe herein, non-systematic (PC-TCM) is presented herein that employs non-systematic constituent trellis encoders. To arrive at such a non-systematic and non-linear PC-TCM, two kinds of non-systematic constituent trellises are considered. The first is a linear trellis encoder, which may be viewed as being a convolutional encoder. The other one is non-linear trellis encoder. Some examples of the specific types of non-systematic and non-linear PC-TCM encoders that are presented include a rate 2/3 and 1-8 PSK non-systematic PC-TCM, a rate 3/4 and 1-QAM non-systematic PC-TCM, a rate 5/6 and 2-8 PSK non-systematic PC-TCM, and a rate 8/9 and 3-8 PSK non-systematic PC-TCM. The performances of several of these possible embodiments are also presented showing the improved performance that may be achieved when following the principles of the invention.

Several of the embodiments described below show how some example communication systems and devices in which the invention may be implemented. Thereafter, some particular example embodiments of non-systematic and non-linear PC-TCM codes, designed according to the invention, are described and their performance is quantified (oftentimes in comparison to prior art turbo encoders using systematic and linear trellis codes).

Figure 1:
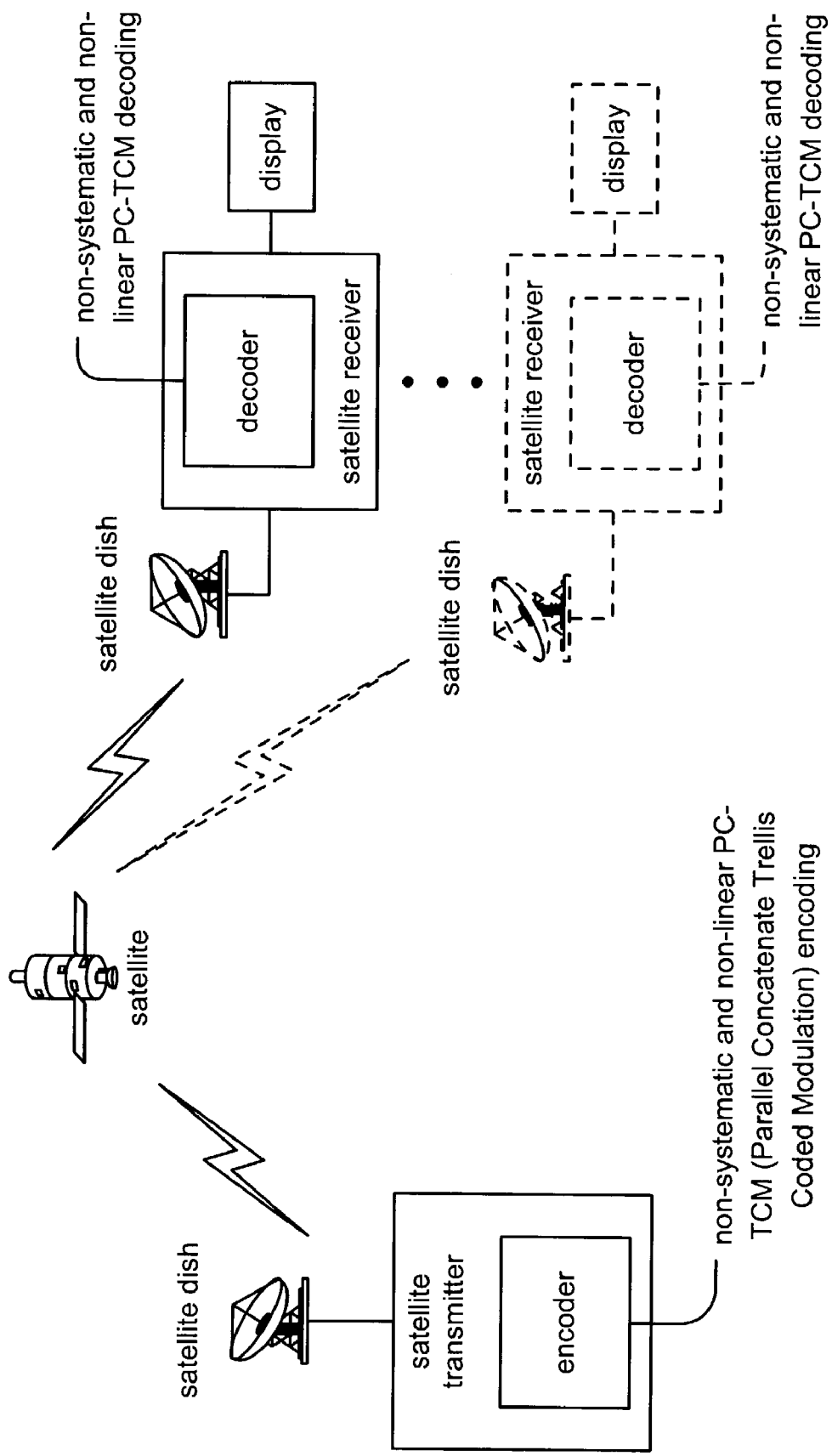
FIG. 1 is a system diagram illustrating an embodiment of a satellite communication system that is built according to the invention.

FIG. 1 is a system diagram illustrating an embodiment of a satellite communication system that is built according to the invention. A satellite transmitter is communicatively coupled to a satellite dish that is operable to communicate with a satellite. The satellite transmitter may also be communicatively coupled to a wired network. This wired network may include any number of networks including the Internet, proprietary networks, and/or other wired networks. The satellite transmitter employs the satellite dish to communicate to the satellite via a wireless communication channel. The satellite is able to communicate with one or more satellite receivers (each having a satellite dish). Each of the satellite receivers may also be communicatively coupled to a display.

Here, the communication to and from the satellite may cooperatively be viewed as being a wireless communication channel, or each of the communication to and from the satellite may be viewed as being two distinct wireless communication channels.

For example, the wireless communication "channel" may be viewed as not including multiple wireless hops in one embodiment. In other multi-hop embodiments, the satellite receives a signal received from the satellite transmitter (via its satellite dish), amplifies it, and relays it to satellite receiver (via its satellite dish); the satellite receiver may also be implemented using terrestrial receivers such as satellite receivers, satellite based telephones, and/or satellite based Internet receivers, among other receiver types. In the case where the satellite receives a signal received from the satellite transmitter (via its satellite dish), amplifies it, and relays it, the satellite may be viewed as being a "transponder;" this is a multi-hop embodiment. In addition, other satellites may exist that perform both receiver and transmitter operations in cooperation with the satellite. In this case, each leg of an up-down transmission via the wireless communication channel would be considered separately.

In whichever embodiment, the satellite communicates with the satellite receiver. The satellite receiver may be viewed as being a mobile unit in certain embodiments (employing a local antenna); alternatively, the satellite receiver may be viewed as being a satellite earth station that may be communicatively coupled to a wired network in a similar manner in which the satellite transmitter may also be communicatively coupled to a wired network.

The satellite transmitter is operable to encode information (using an encoder) that is to be transmitted to the satellite receiver; the satellite receiver is operable to decode the transmitted signal (using a decoder). The encoder is operable to encode information using non-systematic and non-linear PC-TCM encoding according to the invention, and the decoder is operable to perform decoding of the information using non-systematic and non-linear PC-TCM decoding according to the invention. The FIG. 1 shows just one of the many embodiments where non-systematic and non-linear PC-TCM coding may be performed according to the invention.

Figure 2:
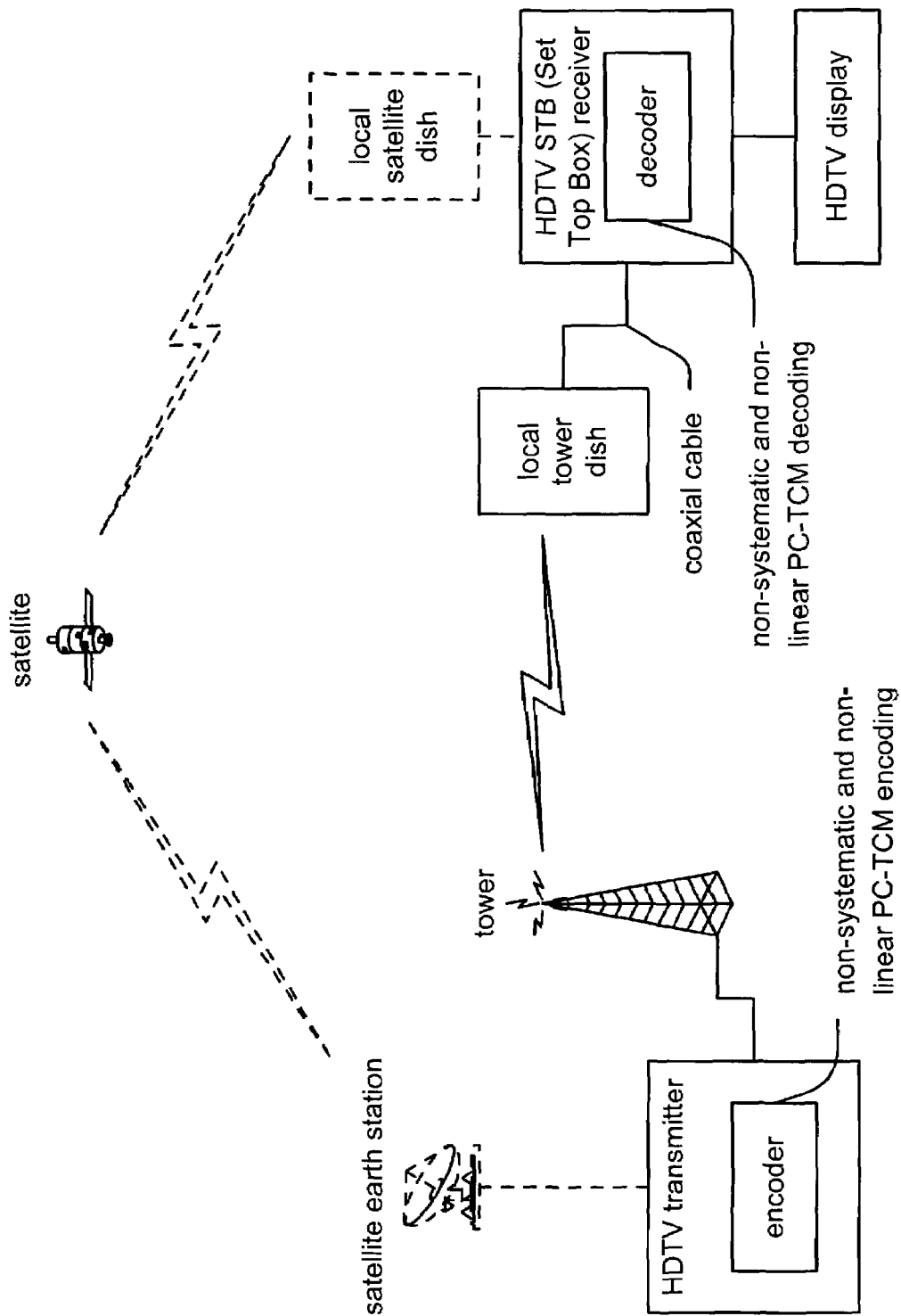
FIG. 2 is a system diagram illustrating an embodiment of a HDTV (High Definition Television) communication system that is built according to the invention.

FIG. 2 is a system diagram illustrating an embodiment of a HDTV (High Definition Television) communication system that is built according to the invention. An HDTV transmitter is communicatively coupled to a tower. The HDTV transmitter, using its tower, transmits a signal to a local tower dish via a wireless communication channel. The local tower dish may communicatively couple to an HDTV set top box receiver via a coaxial cable. The HDTV set top box receiver includes the functionality to receive the wireless transmitted signal that has been received by the local tower dish; this may include any transformation and/or down-converting that may be needed to accommodate any up-converting that may have been performed before and during transmission of the signal from the HDTV transmitter and its tower.

The HDTV set top box receiver is also communicatively coupled to an HDTV display that is able to display the demodulated and decoded wireless transmitted signals received by the HDTV set top box receiver and its local tower dish. The HDTV transmitter (via its tower) transmits a signal directly to the local tower dish via the wireless communication channel in this embodiment. In alternative embodiments, the HDTV transmitter may first receive a signal from a satellite, using a satellite earth station that is communicatively coupled to the HDTV transmitter, and then transmit this received signal to the local tower dish via the wireless communication channel. In this situation, the HDTV transmitter operates as a relaying element to transfer a signal originally provided by the satellite that is destined for the HDTV set top box receiver. For example, another satellite earth station may first transmit a signal to the satellite from another location, and the satellite may relay this signal to the satellite earth station that is communicatively coupled to the HDTV transmitter. The HDTV transmitter performs receiver functionality and then transmits its received signal to the local tower dish.

In even other embodiments, the HDTV transmitter employs its satellite earth station to communicate to the satellite via a wireless communication channel. The satellite is able to communicate with a local satellite dish; the local satellite dish communicatively couples to the HDTV set top box receiver via a coaxial cable (or some other appropriate communication means). This path of transmission shows yet another communication path where the HDTV set top box receiver may communicate with the HDTV transmitter.

In whichever embodiment and whichever signal path the HDTV transmitter employs to communicate with the HDTV set top box receiver, the HDTV set top box receiver is operable to receive communication transmissions from the HDTV transmitter.

The HDTV transmitter is operable to encode information (using an encoder) that is to be transmitted to the HDTV set top box receiver; the HDTV set top box receiver is operable to decode the transmitted signal (using a decoder).

The encoder is operable to encode information using non-systematic and non-linear PC-TCM encoding according to the invention, and the decoder is operable to perform decoding of the information using non-systematic and non-linear PC-TCM decoding according to the invention. The FIG. 2 shows yet another embodiment where non-systematic and non-linear PC-TCM coding may be performed according to the invention.

Figure 3A:
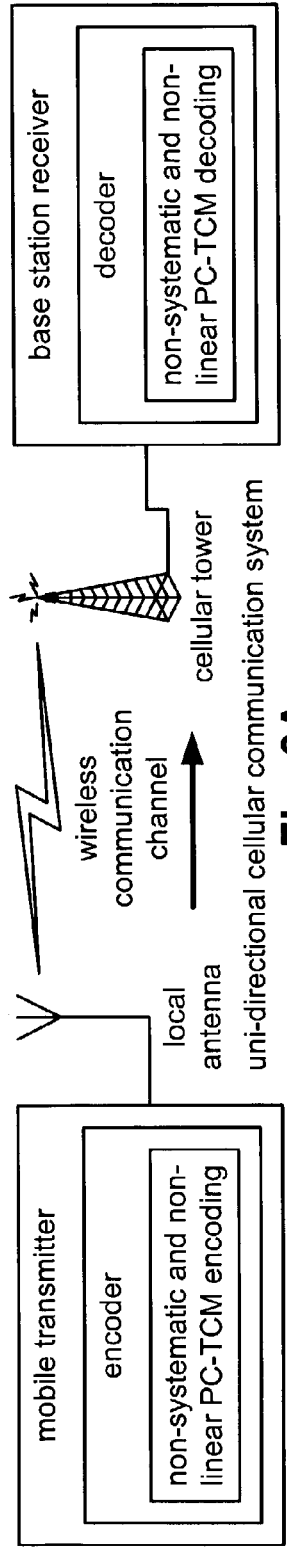
FIG. 3A and FIG. 3B are system diagrams illustrating embodiments of uni-directional cellular communication systems that are built according to the invention.
Figure 3B:
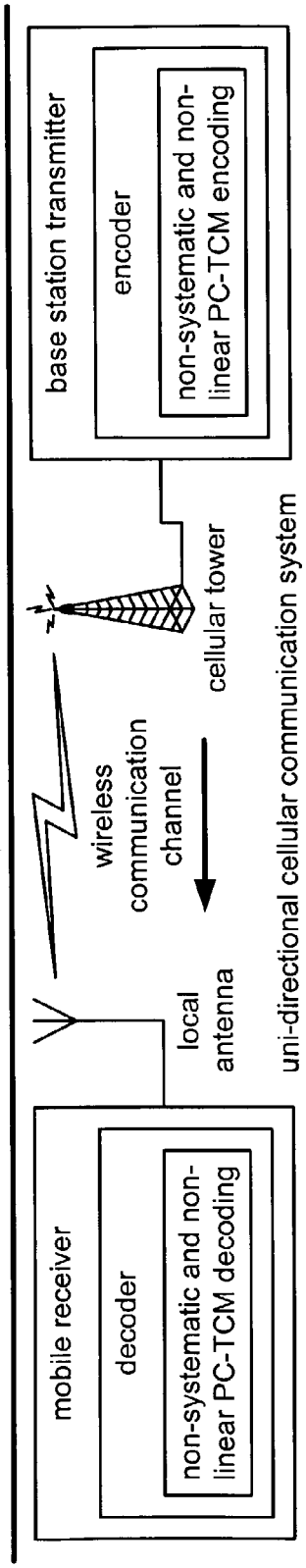

FIG. 3A and FIG. 3B are system diagrams illustrating embodiments of uni-directional cellular communication systems that are built according to the invention.

Referring to the FIG. 3A, a mobile transmitter includes a local antenna communicatively coupled thereto. The mobile transmitter may be any number of types of transmitters including a one way cellular telephone, a wireless pager unit, a mobile computer having transmission functionality, or any other type of mobile transmitter. The mobile transmitter transmits a signal, using its local antenna, to a cellular tower via a wireless communication channel. The cellular tower is communicatively coupled to a base station receiver; the receiving tower is operable to receive data transmission from the local antenna of the mobile transmitter that has been communicated via the wireless communication channel. The cellular tower communicatively couples the received signal to the base station receiver.

The mobile transmitter is operable to encode information (using an encoder) that is to be transmitted to the base station receiver; the base station receiver is operable to decode the transmitted signal (using a decoder).

The encoder is operable to encode information using non-systematic and non-linear PC-TCM encoding according to the invention, and the decoder is operable to perform decoding of the information using non-systematic and non-linear PC-TCM decoding according to the invention. The FIG. 3A shows yet another embodiment where non-systematic and non-linear PC-TCM coding may be performed according to the invention; specifically, the FIG. 3A shows a uni-directional cellular communication system where the communication goes from the mobile transmitter to the base station receiver via the wireless communication channel.

Referring to the FIG. 3B, a base station transmitter includes a cellular tower communicatively coupled thereto. The base station transmitter, using its cellular tower, transmits a signal to a mobile receiver via a communication channel. The mobile receiver may be any number of types of receivers including a one-way cellular telephone, a wireless pager unit, a mobile computer having receiver functionality, or any other type of mobile receiver. The mobile receiver is communicatively coupled to a local antenna; the local antenna is operable to receive data transmission from the cellular tower of the base station transmitter that has been communicated via the wireless communication channel. The local antenna communicatively couples the received signal to the mobile receiver.

The base station transmitter is operable to encode information (using an encoder) that is to be transmitted to the mobile receiver; the mobile receiver is operable to decode the transmitted signal (using a decoder).

The encoder is operable to encode information using non-systematic and non-linear PC-TCM encoding according to the invention, and the decoder is operable to perform decoding of the information using non-systematic and non-linear PC-TCM decoding according to the invention. The FIG. 3B shows yet another embodiment where non-systematic and non-linear PC-TCM coding may be performed according to the invention; specifically, the FIG. 3B shows a uni-directional cellular communication system where the communication goes from the base station transmitter to the mobile receiver via the wireless communication channel.

Figure 3C:
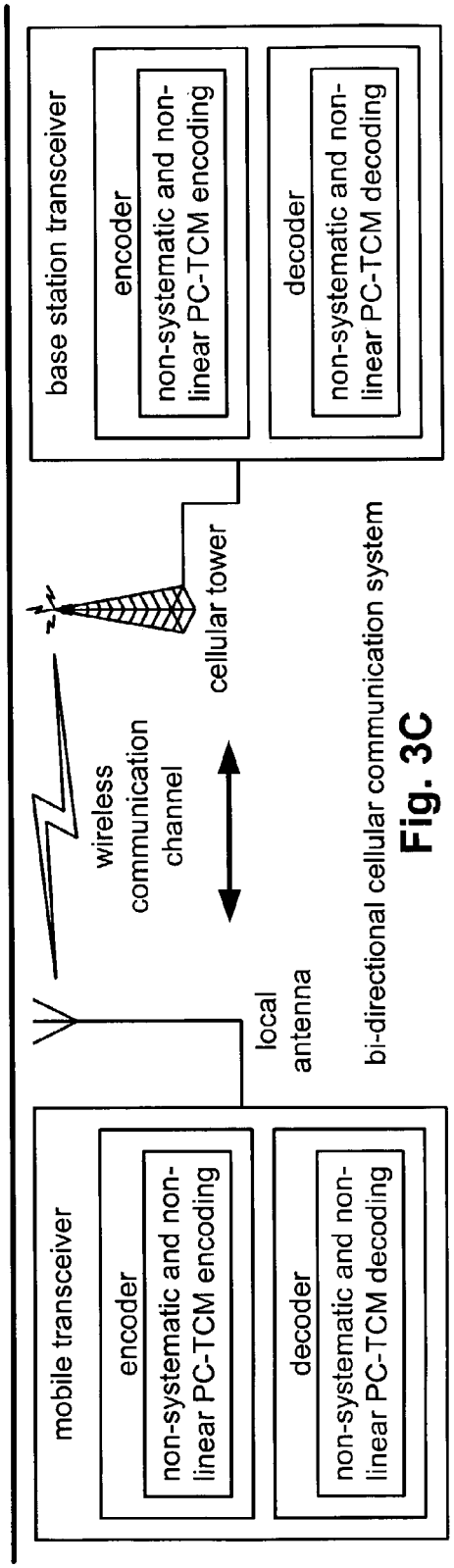
FIG. 3C is a system diagram illustrating an embodiment of a bi-directional cellular communication system that is built according to the invention.

FIG. 3C is a system diagram illustrating an embodiment of a bi-directional cellular communication system that is built according to the invention. The communication within this embodiment may go to and from the base station transceiver and to and from the mobile transceiver via the wireless communication channel.

Referring to the FIG. 3C, a base station transceiver includes a cellular tower communicatively coupled thereto. The base station transceiver, using its cellular tower, transmits a signal to a mobile transceiver via a communication channel. The reverse communication operation may also be performed. The mobile transceiver is able to transmit a signal to the base station transceiver as well. The mobile transceiver may be any number of types of transceiver including a cellular telephone, a wireless pager unit, a mobile computer having transceiver functionality, or any other type of mobile transceiver. The mobile transceiver is communicatively coupled to a local antenna; the local antenna is operable to receive data transmission from the cellular tower of the base station transceiver that has been communicated via the wireless communication channel. The local antenna communicatively couples the received signal to the mobile transceiver.

The base station transceiver is operable to encode information (using its encoder) that is to be transmitted to the mobile transceiver; the mobile transceiver is operable to decode the transmitted signal (using its decoder).

In addition, the mobile transceiver is operable to encode information (using its encoder) that is to be transmitted to the base station transceiver; the base station transceiver is operable to decode the transmitted signal (using its decoder).

The encoders within each of the mobile transceiver and the base station transceiver are operable to encode information using non-systematic and non-linear PC-TCM encoding according to the invention, and the decoders within each of the mobile transceiver and the base station transceiver are operable to perform decoding of the information using non-systematic and non-linear PC-TCM decoding according to the invention. The FIG. 3C shows yet another embodiment where non-systematic and non-linear PC-TCM coding may be performed according to the invention.

FIG. 4A is a system diagram illustrating an embodiment of a uni-directional microwave communication system that is built according to the invention. A microwave transmitter is communicatively coupled to a microwave tower. The microwave transmitter, using its microwave tower, transmits a signal to a microwave tower via a wireless communication channel. A microwave receiver is communicatively coupled to the microwave tower. The microwave tower is able to receive transmissions from the microwave tower that have been communicated via the wireless communication channel.

The microwave transmitter is operable to encode information (using an encoder) that is to be transmitted to the microwave receiver; the microwave receiver is operable to decode the transmitted signal (using a decoder).

The encoder is operable to encode information using non-systematic and non-linear PC-TCM encoding according to the invention, and the decoder is operable to perform decoding of the information using non-systematic and non-linear PC-TCM decoding according to the invention. The FIG. 4A shows yet another embodiment where non-systematic and non-linear PC-TCM coding may be performed according to the invention; specifically, the FIG. 4A shows a uni-directional microwave communication system where the communication goes from the microwave transmitter to the microwave receiver via the wireless communication channel.

FIG. 4B is a system diagram illustrating an embodiment of a bi-directional microwave communication system that is built according to the invention. Within the FIG. 4B, a first microwave transceiver is communicatively coupled to a first microwave tower. The first microwave transceiver, using the first microwave tower (the first microwave transceiver's microwave tower), transmits a signal to a second microwave tower of a second microwave transceiver via a wireless communication channel. The second microwave transceiver is communicatively coupled to the second microwave tower (the second microwave transceiver's microwave tower). The second microwave tower is able to receive transmissions from the first microwave tower that have been communicated via the wireless communication channel. The reverse communication operation may also be performed using the first and second microwave transceivers.

Each of the microwave transceivers is operable to encode information (using an encoder) that is to be transmitted to the other microwave transceiver; each microwave transceiver is operable to decode the transmitted signal (using a decoder) that it receives. Each of the microwave transceivers includes an encoder and a decoder.

The encoders within each of the microwave transceivers are operable to encode information using non-systematic and non-linear PC-TCM encoding according to the invention, and the decoders within each of the microwave transceivers are operable to perform decoding of the information using non-systematic and non-linear PC-TCM decoding according to the invention. The FIG. 4B shows yet another embodiment where non-systematic and non-linear PC-TCM coding may be performed according to the invention.

FIG. 5A is a system diagram illustrating an embodiment of a uni-directional point-to-point radio communication system that is built according to the invention. A mobile unit transmitter includes a local antenna communicatively coupled thereto. The mobile unit transmitter, using its local antenna, transmits a signal to a local antenna of a mobile unit receiver via a wireless communication channel.

The mobile unit transmitter is operable to encode information (using an encoder) that is to be transmitted to the mobile unit receiver; the mobile unit receiver is operable to decode the transmitted signal (using a decoder).

The encoder is operable to encode information using non-systematic and non-linear PC-TCM encoding according to the invention, and the decoder is operable to perform decoding of the information using non-systematic and non-linear PC-TCM decoding according to the invention. The FIG. 5A shows yet another embodiment where non-systematic and non-linear PC-TCM coding may be performed according to the invention; specifically, the FIG. 5A shows a uni-directional communication system where the communication goes from the mobile unit transmitter to the mobile unit receiver via the wireless communication channel.

FIG. 5B is a system diagram illustrating an embodiment of a bi-directional point-to-point radio communication system that is built according to the invention. Within the FIG. 5B, a first mobile unit transceiver is communicatively coupled to a first local antenna. The first mobile unit transceiver, using the first local antenna (the first mobile unit transceiver's local antenna), transmits a signal to a second local antenna of a second mobile unit transceiver via a wireless communication channel. The second mobile unit transceiver is communicatively coupled to the second local antenna (the second mobile unit transceiver's local antenna). The second local antenna is able to receive transmissions from the first local antenna that have been communicated via the communication channel. The reverse communication operation may also be performed using the first and second mobile unit transceivers.

Each mobile unit transceiver is operable to encode information (using an encoder) that is to be transmitted to the other mobile unit transceiver; each mobile unit transceiver is operable to decode the transmitted signal (using a decoder) that it receives.

The encoders within each of the mobile unit transceivers are operable to encode information using non-systematic and non-linear PC-TCM encoding according to the invention, and the decoders within each of the mobile unit transceivers are operable to perform decoding of the information using non-systematic and non-linear PC-TCM decoding according to the invention. The FIG. 5B shows yet another embodiment where non-systematic and non-linear PC-TCM coding may be performed according to the invention.

FIG. 6A is a system diagram illustrating an embodiment of a uni-directional communication system that is built according to the invention. A transmitter communicates to a receiver via a uni-directional communication channel. The uni-directional communication channel may be a wireline (or wired) communication channel or a wireless communication channel without departing from the scope and spirit of the invention. The wired media by which the uni-directional communication channel may be implemented are varied, including coaxial cable, fiber-optic cabling, and copper cabling, among other types of "wiring." Similarly, the wireless manners in which the uni-directional communication channel may be implemented are varied, including satellite communication, cellular communication, microwave communication, and radio communication, among other types of wireless communication.

The transmitter is operable to encode information (using an encoder) that is to be transmitted to the receiver; the receiver is operable to decode the transmitted signal (using a decoder).

The encoder is operable to encode information using non-systematic and non-linear PC-TCM encoding according to the invention, and the decoder is operable to perform decoding of the information using non-systematic and non-linear PC-TCM decoding according to the invention. The FIG. 6A shows yet another embodiment where non-systematic and non-linear PC-TCM coding may be performed according to the invention.

FIG. 6B is a system diagram illustrating an embodiment of a bi-directional communication system that is built according to the invention. Within the FIG. 6B, a first transceiver is communicatively coupled to a second transceiver via a bi-directional communication channel. The bi-directional communication channel may be a wireline (or wired) communication channel or a wireless communication channel without departing from the scope and spirit of the invention. The wired media by which the bi-directional communication channel may be implemented are varied, including coaxial cable, fiber-optic cabling, and copper cabling, among other types of "wiring." Similarly, the wireless manners in which the bi-directional communication channel may be implemented are varied, including satellite communication, cellular communication, microwave communication, and radio communication, among other types of wireless communication.

Each of the transceivers is operable to encode information (using an encoder) that is to be transmitted to the other transceiver; each transceiver is operable to decode the transmitted signal (using a decoder) that it receives.

The encoders within each of the transceivers are operable to encode information using non-systematic and non-linear PC-TCM encoding according to the invention, and the decoders within each of the transceivers are operable to perform decoding of the information using non-systematic and non-linear PC-TCM decoding according to the invention. The FIG. 6B shows yet another embodiment where non-systematic and non-linear PC-TCM coding may be performed according to the invention.

FIG. 6C is a system diagram illustrating an embodiment of a one to many communication system that is built according to the invention. A transmitter is able to communicate, via broadcast in certain embodiments, with a number of receivers, shown as receivers 1, 2, . . . , n via a uni-directional communication channel. The uni-directional communication channel may be a wireline (or wired) communication channel or a wireless communication channel without departing from the scope and spirit of the invention. The wired media by which the bi-directional communication channel may be implemented are varied, including coaxial cable, fiber-optic cabling, and copper cabling, among other types of "wiring." Similarly, the wireless manners in which the bi-directional communication channel may be implemented are varied, including satellite communication, cellular communication, microwave communication, and radio communication, among other types of wireless communication.

A distribution point is employed within the one to many communication system to provide the appropriate communication to the receivers 1, 2, . . . , and n. In certain embodiments, the receivers 1, 2, . . . , and n each receive the same communication and individually discern which portion of the total communication is intended for themselves.

The transmitter is operable to encode information (using an encoder) that is to be transmitted to the receivers 1, 2, . . . , and n; each of the receivers 1, 2, . . . , and n is operable to decode the transmitted signal (using a decoder).

The encoder of the transmitter is operable to encode information using non-systematic and non-linear PC-TCM encoding according to the invention, and the decoders within each of the receivers are operable to perform decoding of the information using non-systematic and non-linear PC-TCM decoding according to the invention. The FIG. 6C shows yet another embodiment where non-systematic and non-linear PC-TCM coding may be performed according to the invention.

Figure 7A:
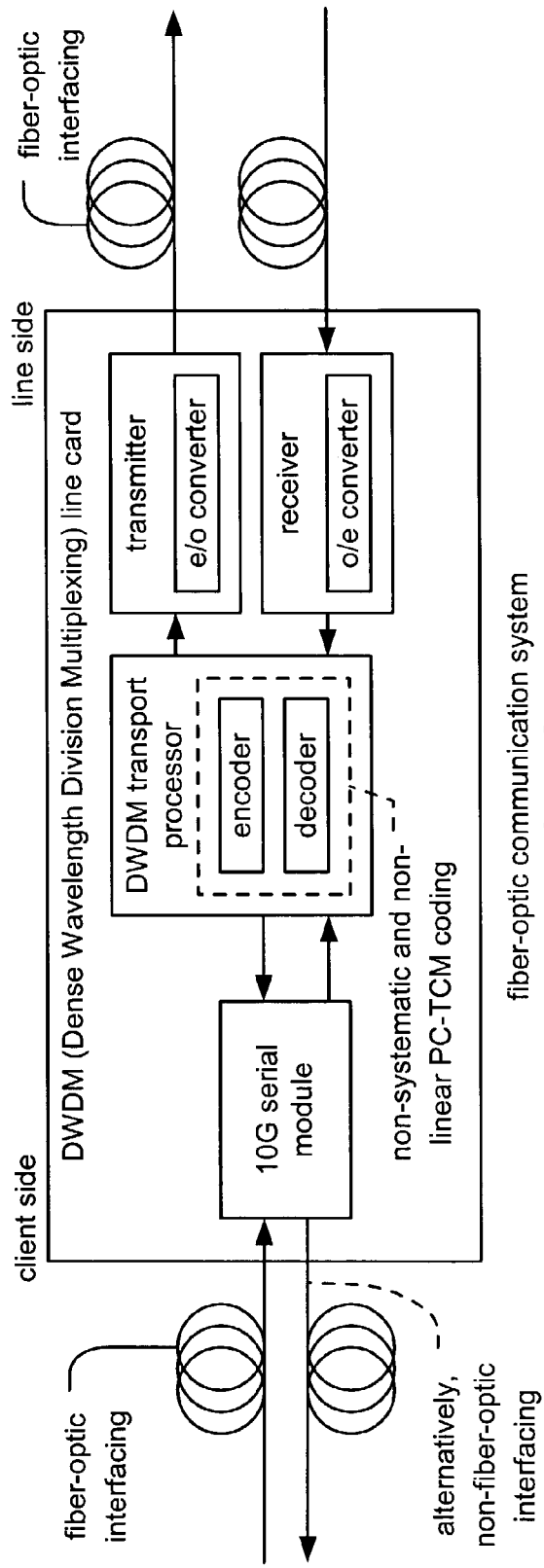
FIG. 7A is a system diagram illustrating an embodiment of a fiber-optic communication system that is built according to the invention.

FIG. 7A is a system diagram illustrating an embodiment of a fiber-optic communication system that is built according to the invention. The fiber-optic communication system is operable to support non-systematic and non-linear PC-TCM coding according to the invention. The fiber-optic communication system includes a DWDM (Dense Wavelength Division Multiplexing (in the context of fiber optic communications) line card that is interposed between a line side and a client side.

DWDM is a technology that has gained increasing interest recently. From both technical and economic perspectives, the ability to provide potentially unlimited transmission capacity is the most obvious advantage of DWDM technology. The current investment already made within fiber-optic infrastructure can not only be preserved when using DWDM, but it may even be optimized by a factor of at least 32. As demands change, more capacity can be added, either by simple equipment upgrades or by increasing the number of wavelengths (lambdas) on the fiber-optic cabling itself, without expensive upgrades. Capacity can be obtained for the cost of the equipment, and existing fiber plant investment is retained. From the bandwidth perspective, some of the most compelling technical advantage of DWDM can be summarized as follows:

The transparency of DWDM: Because DWDM is a physical layer architecture (PHY), it can transparently support both Time Division Multiplexing (TDM) and data formats such as asynchronous transfer mode (ATM), Gigabit Ethernet, ESCON, and Fibre Channel with open interfaces over a common physical layer.

The scalability of DWDM: DWDM can leverage the abundance of dark fiber in many metropolitan area and enterprise networks to quickly meet demand for capacity on point-to-point links and on spans of existing SONET/SDH rings.

The dynamic provisioning capabilities of DWDM: the fast, simple, and dynamic provisioning of network connections give providers the ability to provide high-bandwidth services in days rather than months.

Fiber-optic interfacing is employed at each of the client and line sides of the DWDM line card. The DWDM line card includes a transport processor that includes functionality to support DWDM long haul transport, DWDM metro transport, next-generation SONET/SDH multiplexers, digital cross-connects, and fiber-optic terminators and test equipment. On the line side, the DWDM line card includes a transmitter, that is operable to perform electrical to optical conversion for interfacing to an optical medium, and a receiver, that is operable to perform optical to electrical conversion for interfacing from the optical medium. On the client side, the DWDM line card includes a 10G serial module that is operable to communicate with any other devices on the client side of the fiber-optic communication system using a fiber-optic interface. Alternatively, the interface may be implemented using non-fiber-optic media, including copper cabling and/or some other type of interface medium.

The DWDM transport processor of the DWDM line card includes a decoder that is used to decode received signals from either one or both of the line and client sides and an encoder that is used to encode signals to be transmitted to either one or both of the line and client sides.

The decoder is operable to perform decoding of the information using non-systematic and non-linear PC-TCM decoding according to the invention. The FIG. 7A shows yet another embodiment where non-systematic and non-linear PC-TCM decoding according to the invention.

Figure 7B:
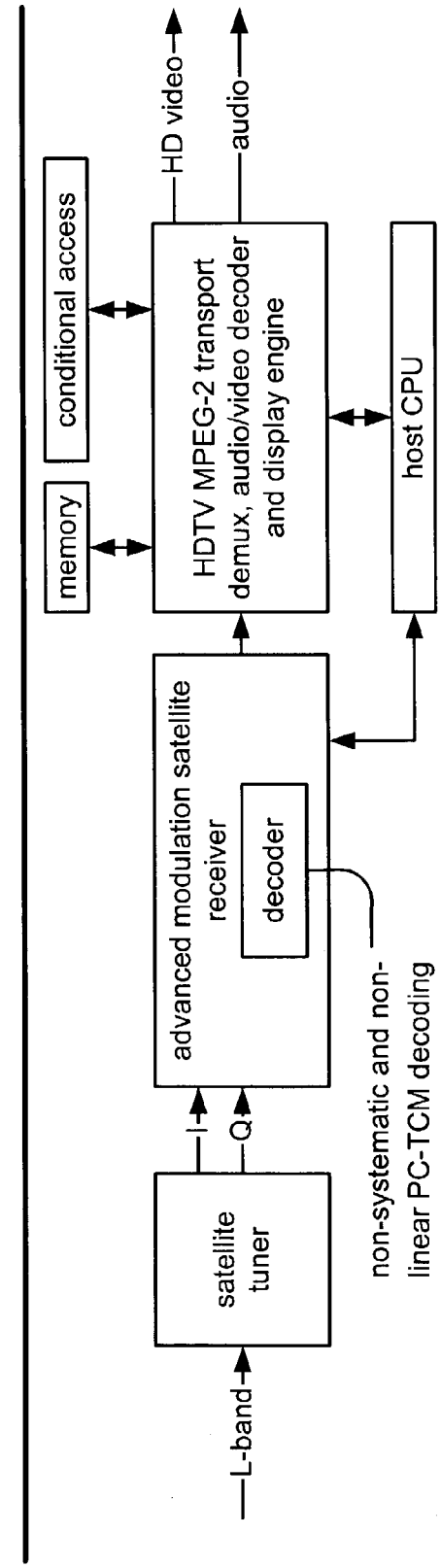
FIG. 7B is a system diagram illustrating an embodiment of a satellite receiver STB (Set Top Box) system that is built according to the invention.

FIG. 7B is a system diagram illustrating an embodiment of a satellite receiver STB (Set Top Box) system that is built according to the invention. The satellite receiver STB system includes an advanced modulation satellite receiver that is implemented in an all digital architecture. The satellite receiver STB system includes a satellite tuner that receives a signal via the L-band. The satellite tuner extracts I,Q (in-phase and quadrature) components from a signal received from the L-band and provides them to the advanced modulation satellite receiver. The advanced modulation satellite receiver includes an embodiment of the decoder. The decoder is operable to perform non-systematic and non-linear PC-TCM decoding according to the invention.

The advanced modulation satellite receiver communicatively couples to an HDTV MPEG-2 (Motion Picture Experts Group 2 (Standard—Compressed Video at 4–9 Mbps)) transport de-mux, audio/video decoder and display engine. The advanced modulation satellite receiver and the HDTV MPEG-2 transport de-mux, audio/video decoder and display engine communicatively couple to a host CPU (Central Processing Unit). The HDTV MPEG-2 transport de-mux, audio/video decoder and display engine also communicatively couples to a memory module and a conditional access functional block. The HDTV MPEG-2 transport de-mux, audio/video decoder and display engine provides HD video and audio output that may be provided to an HDTV display.

The advanced modulation satellite receiver is a single-chip digital satellite receiver supporting the decoder that is operable to support decoding of information using non-systematic and non-linear PC-TCM decoding according to the invention. The advanced modulation satellite receiver is operable to receive communication provided to it from a transmitter device that includes an encoder that encodes information using non-systematic and non-linear PC-TCM encoding as well.

Figure 8:
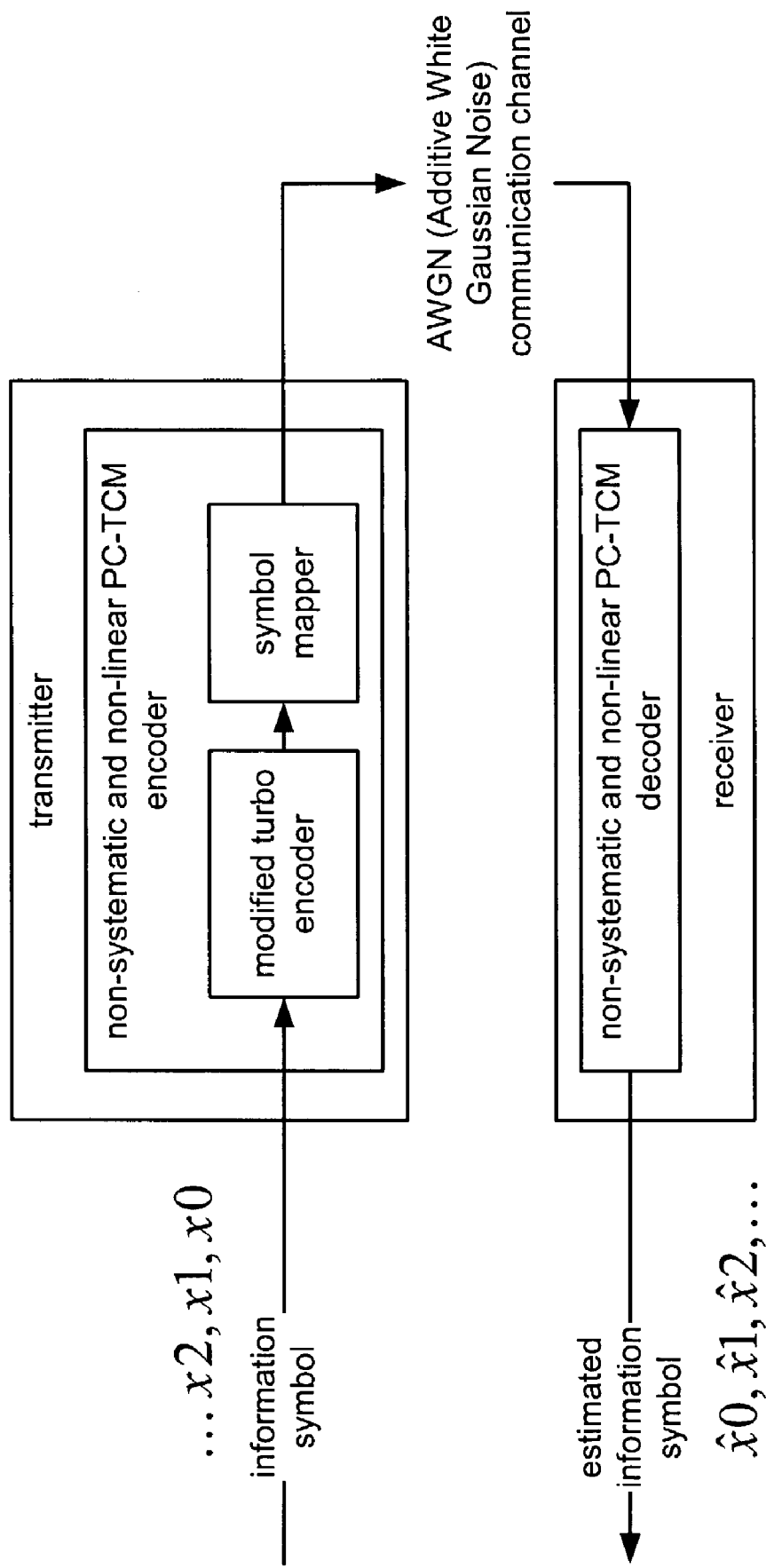
FIG. 8 is a system diagram illustrating an embodiment of a PC-TCM (Parallel Concatenate Trellis Coded Modulation) communication system that is built according to the invention.

FIG. 8 is a system diagram illustrating an embodiment of a PC-TCM (Parallel Concatenate Trellis Coded Modulation) communication system that is built according to the invention. The PC-TCM communication system includes a transmitter and a receiver that are communicatively coupled to one another via a communication channel that introduces AWGN (Additive White Gaussian Noise) to the signal. The communication channel may be wireline or wireless according to the invention. The AWGN communication channel may be viewed as being a relatively noisy communication channel in some embodiments.

The transmitter includes a non-systematic and non-linear PC-TCM encoder that encodes one or more information symbols and then modulates those encoded symbols. Those encoded symbol may also undergo modulation encoding to map those symbols to a constellation and an associating mapping. The transmitter then prepares this signal for transmission across the communication channel. At the other end of the communication channel, the receiver includes a PC-TCM decoder that receives and estimates the encoded symbols that have been transmitted across the AWGN communication channel. Further details of the operation of the various functional blocks contained within the PC-TCM encoder and the PC-TCM decoder are also described in more detail below.

Generally speaking, within the PC-TCM encoder, a modified turbo encoder performs symbol encoding and the symbol mapper maps those encoded symbols to an appropriate modulation (including a constellation and a corresponding mapping). Similarly, generally speaking within the PC-TCM decoder, the PC-TCM decoder performs calculations that are employed to perform decoding of the received symbols. The PC-TCM decoder is operable to perform decoding using the non-systematic and non-linear PC-TCM decoding according to the invention.

It is also understood that a variety of means of modulation, transmission, receipt, and demodulation may be performed to generate the analog signals to be transmitted across the communication channel without departing from the scope and spirit thereof. Each and any such appropriate and necessary communication means may be practiced without departing from the scope and spirit of the invention of PC-TCM encoding/decoding described herein.

Figure 9:
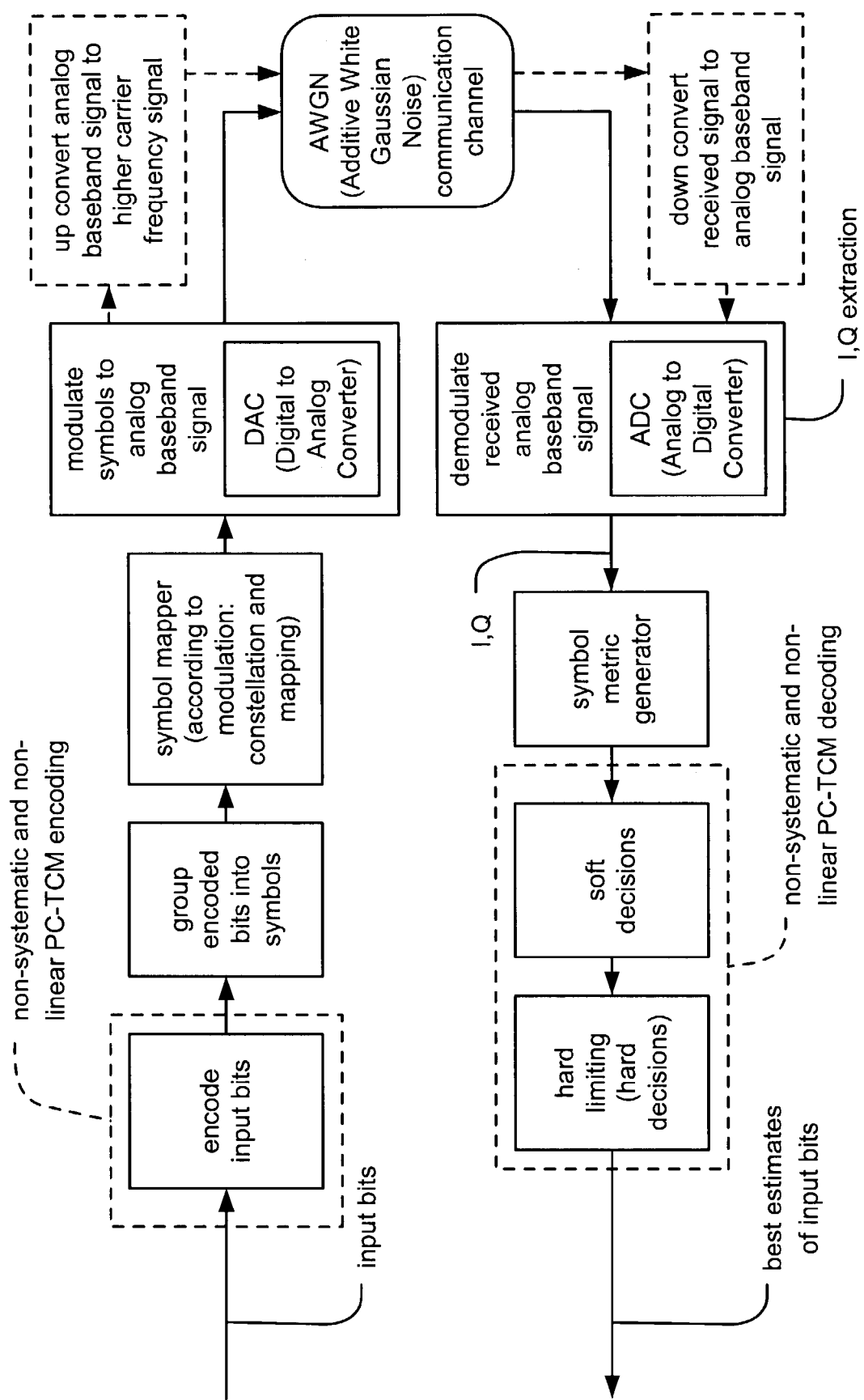
FIG. 9 is a diagram illustrating an embodiment of an overview of functionality of a communication system that is built according to the invention.

FIG. 9 is a diagram illustrating an embodiment of an overview of functionality of a communication system that is built according to the invention. The functionality described within this embodiment may be viewed as being performed within a variety of the various communication system embodiments described within this specification.

Inputs bits are initially provided to a transmitter side of a communication channel. The input bits are initially encoded thereby generating encoded input bits. This encoding may be performed according to the non-systematic and non-linear PC-TCM encoding of the invention. These encoded bits are then grouped into symbols. These symbols, comprised of the encoded bits that are appropriately grouped, are provided to a symbol mapper that maps the symbols according to a modulation that includes a constellation and a corresponding mapping; this may be viewed as undergoing modulation encoding. At this point, the symbols may be viewed as being a digital baseband signal. These symbols are then modulated to generate an analog baseband signal whose frequency is that of baseband and whose magnitude and phase components vary at that baseband frequency. This may be performed using a DAC (Digital to Analog Converter). This analog baseband signal may then be provided to a communication channel. The communication channel may be viewed as being an AWGN (Additive White Gaussian Noise) communication channel.

In some embodiments, the analog baseband signal may undergo some up converting. For example, the analog baseband signal may be up converted to a higher carrier frequency for transmission on the communication channel. This up conversion may also involve transforming the analog baseband signal up to intermediate frequency before being transformed up to the higher carrier frequency at which the signal is transmitted across the communication channel.

The transmitted signal is then received at a receiver end of the communication channel. Initially, the received signal that has been transmitted may undergo any necessary down converting to transform the received signal to an analog baseband signal. This may also include some transformation to an intermediate frequency before converting the signal down to an analog baseband signal. Alternatively, the conversion may be performed directly to the analog baseband signal.

The received analog baseband signal is then demodulated to generate a digital baseband signal. This may be performed using an ADC (Analog to Digital Converter). This may also be viewed as performing the I,Q (In-phase, Quadrature) component extraction of the various symbols within the analog baseband signal. These I,Q components are then provided to a symbol metric generator that calculated metrics for the symbols within the received digital baseband signal.

Using these metrics calculated by the symbol metric generator, soft decisions (on either a symbol level basis, a bit level basis, or a hybrid level basis including some bit level basis soft decisions and some symbol level soft decisions) are then made using these metrics calculated by the symbol metric generator. Finally, hard limiting is performed on the soft decisions. This may be viewed as making hard decisions using the soft decisions generated previously. These hard decisions may be viewed as being the best estimates of the input bits that had been provided at the transmitter side of the communication system. It is noted that the hard decisions may be performed on a bit level basis where the individual bits of the received symbols are individually estimated. Alternatively, the hard decisions may be performed on a symbol level basis where the individual symbols of the received symbols are individually estimated and the corresponding bit level decisions of those received symbols are made based on the corresponding hard symbol decisions. In even another embodiment, the hard decisions may be performed on a hybrid level basis where the individual symbols of the received symbols as well as some the individual bits of the received symbols are individually estimated; in this embodiment, the corresponding bit level decisions of those received symbols are made using both some of the hard bit decisions as well as some of the hard symbol decisions.

Moreover, it is noted that this overview of the functionality of a communication system may be viewed as being supported within the context of many of the various embodiments described in this specification. Such non-systematic and non-linear PC-TCM coding may be supported in each of the various embodiments described herein. In addition, several example embodiments are described that show how this non-systematic and non-linear PC-TCM coding may be implemented according to the invention.

Figure 10:
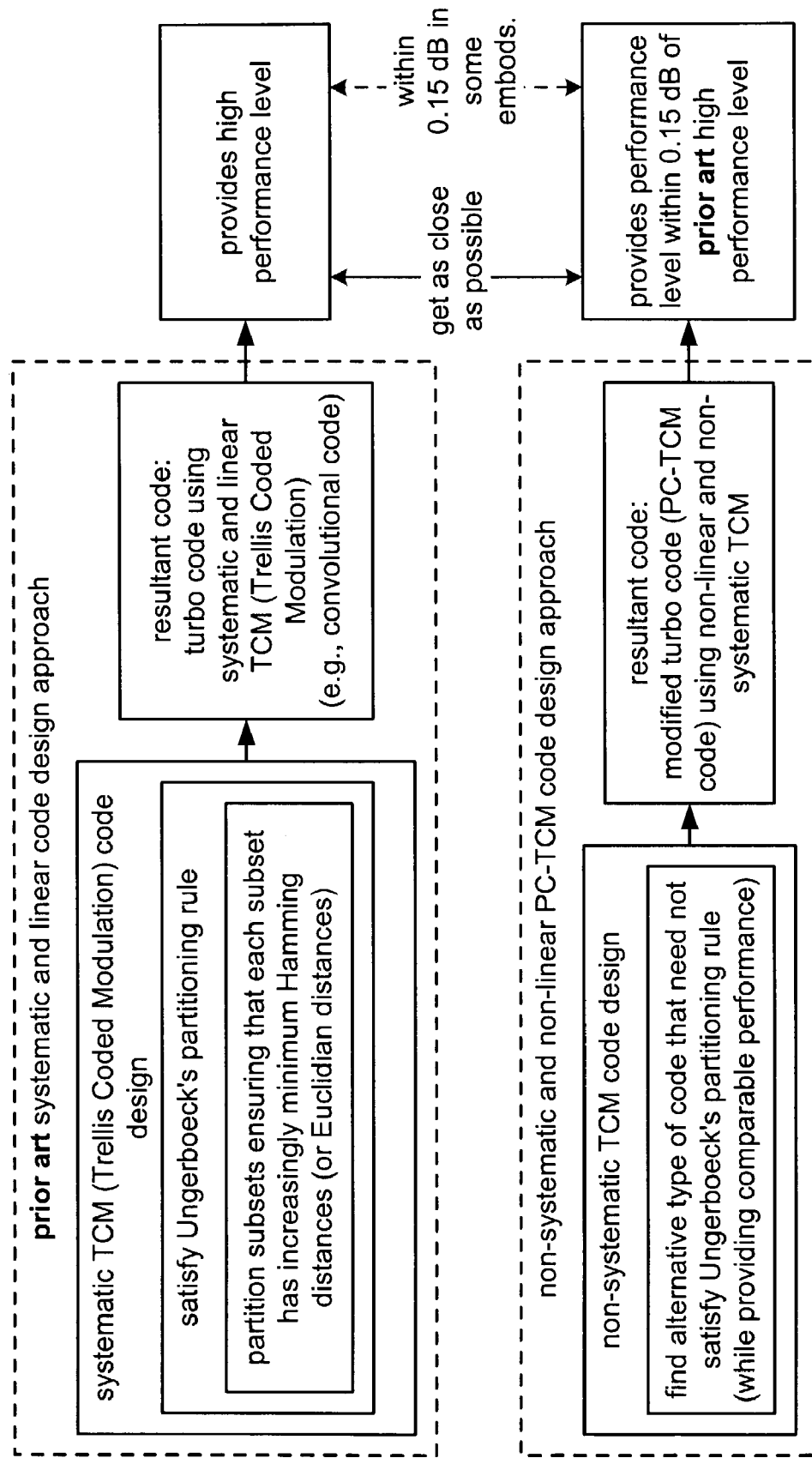
FIG. 10 is a diagram illustrating a non-systematic and non-linear PC-TCM (Parallel Concatenate Trellis Coded Modulation) code design approach as compared to a prior art approach systematic and linear code design approach.

FIG. 10 is a diagram illustrating a non-systematic and non-linear PC-TCM (Parallel Concatenate Trellis Coded Modulation) code design approach as compared to a prior art approach systematic and linear code design approach. The prior art code design approach for designing systematic and linear codes that reach the lowest BERs (Bit Error Rates) most typically involve employing systematic TCM (Trellis Coded Modulation) code design. This prior art approach necessarily involves employing codes that satisfy Ungerboeck's partitioning rule. That is to say, according to the Ungerboeck's partitioning rule, subsets are partitioned such that each subset has increasingly minimum Hamming distances (or Euclidian distances). The prior art has come to a relatively strong consensus that the resultant code that provides for the best performance, when designed under such constraints, is a turbo code using systematic and linear TCM; these codes are typically convolutional codes as known in the art. The prior art indicates that such codes are those that provide for the highest performance levels.

In contradistinction, the invention employs a non-systematic and non-linear PC-TCM code design approach that employs a non-systematic PC-TCM code design. According to this approach of the invention, an alternative type of code is found that need not satisfy Ungerboeck's partitioning rule, yet the alternative code does provide for comparable performance. Such a resultant code, designed according to the invention, may be viewed as a PC-TCM code that may also be viewed as a modified turbo code using non-systematic and non-linear constituent encoders.

The design directive of the invention is to arrive at a PC-TCM code that provides performance as close as possible to that of the prior art turbo code employing systematic and linear TCM. In one embodiment, a PC-TCM code of the invention reaches as close as 0.15 dB in terms of SNR to that of a prior art turbo code employing systematic and linear TCM. Other embodiments are also presented herein that do not reach as close as 0.15 dB, yet some application embodiments may be suitable for some applications where a non-systematic code may be desirable over a systematic code. In such instance, the use of such a non-systematic and non-linear PC-TCM code, designed according to the invention, may be preferable. The invention presents many advantages perhaps most important being that Ungerboeck's rule need not be satisfied; this may make for a broader possible set of codes that may be designed. Several such embodiments designed according to the principles of the invention are described in more detail below. Clearly, these several embodiments are exemplary. Other types of embodiments that include different input bit block size (or input symbol number size), code rate, constellation types, mappings, and different output bit block size (or output symbol number size), among some of the variations possible, are also possible in accordance with invention.

Figure 11:
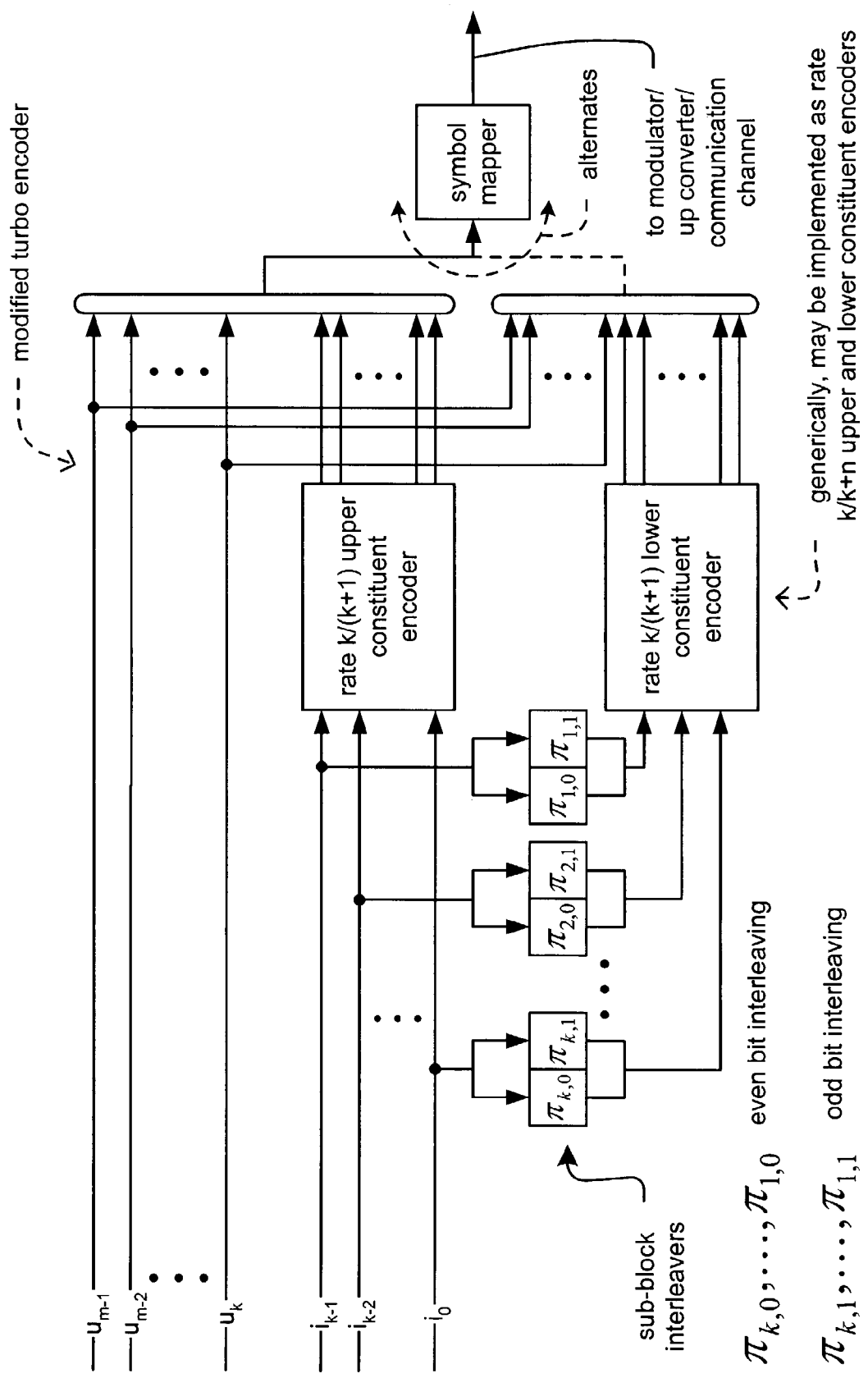
FIG. 11 is a diagram illustrating an embodiment of a non-systematic and non-linear PC-TCM (Parallel Concatenate Trellis Coded Modulation) encoder that is built according to the invention.

FIG. 11 is a diagram illustrating an embodiment of a non-systematic and non-linear PC-TCM (Parallel Concatenate Trellis Coded Modulation) encoder that is built according to the invention. The generic encoder of such a PC-TCM described here includes sub-block interleavers shown as $\pi_{i,j}$. Before being interleaved, every information bit block is broken into two separate sub-blocks, one with the bits taken from odd clock time, and the other one taken from even clock time. Then, the two sub-blocks will be interleaved separately with $\pi_{j,0}$ and $\pi_{j,1}$, respectively. The two constituent encoders are trellis encoders. In an odd clock time, the symbol mapper maps the output of the upper constituent encoder; otherwise, in an even clock time, it maps the output of the lower constituent encoder. This generic encoder is based on Robertson and Worz model described within P. Robertson and T. Worz, "Bandwidth-efficient turbo trellis coded modulation using punctured components," *IEEE Journal on Selected Area in Communications*, pp. 206–218, vol. 16, February 1998.

The PC-TCM encoder shown in this embodiment is operable to be code input bits at a code rate of k/k+1. For example, when 2 input bits are employed as an input symbol (then k=2), and the code rate of the PC-TCM encoder is k/k+1=2/3. Similarly, when 3 input bits are employed as an input symbol (then k=3), and the code rate of the PC-TCM encoder is k/k+1=3/4. Therefore, in the rate 2/3 embodiment, for every 2 input bits, a 3 bit encoded symbol will be produced.

Clearly, alternative PC-TCM encoder designs could also be made according to the invention that operate using code rates not taking the form of code rate of k/k+1; for example, PC-TCM encoders having code rate of k/2k or most generally of k/k+n (where n is an integer) may be constructed using the principles described herein. This is also applicable for all of the embodiments of the invention described herein.

For example, in the context of the non-systematic and non-linear PC-TCM described herein, these 3 bit symbols may be modulation coded using an 8 PSK modulation (having an 8 PSK shaped constellation and a particular mapping of the constellation points contained therein). It is also noted that one or more uncoded bits (shown as $u_{m-1}$, $u_{m-2}$, ..., $u_k$) may be used to generate the outputs symbols from the PC-TCM encoder.

Input bits (shown as $i_{k-1}$, $i_{k-2}$, ..., $i_0$) are provided initially to the non-systematic and non-linear PC-TCM encoder. These input bits are provided simultaneously to a rate k/k+1 upper constituent encoder and also to the sub-block interleavers. The sub-block interleaver is operable to perform even bit interleaving and odd bit interleaving on the input bits in the manner described above. That is to say, different interleaving is performed on the input bits, depending on their relative location within the input bit stream. Again, this even bit interleaving and odd bit interleaving on the precoded bits is shown as $\pi_{j,0}$ (even bit interleaving) and $\pi_{j,1}$ (odd bit interleaving), respectively. The odd and even bit interleaving cycles may be associated with alternating clock cycles at which the PC-TCM encoder is operating. After having undergone either the even bit interleaving or odd bit interleaving, the appropriately interleaved input bits are then passed to a rate k/k+1 lower constituent encoder.

The rate k/k+1 upper constituent encoder outputs an upper plurality of encoded bits, and the rate k/k+1 lower constituent encoder outputs a lower plurality of encoded bits. Selected bits from the upper plurality of encoded bits and the lower plurality of encoded bits are selected, along with one or more uncoded bits, by a symbol mapper that is operable to perform modulation encoding of the selected bits. Thee bits may be grouped to form symbols that undergo the modulation encoding as well. Bits are alternatively selected from the upper plurality of encoded bits and the lower plurality of encoded bits (as well as one or more uncoded bits) to form an output symbol (e.g., a single 8 PSK symbol in the rate 2/3 embodiment). Clearly, 2 separate 8 PSK symbols may be generated in a rate 5/6 embodiment, and 3 separate 8 PSK symbols may be generated in a rate 8/9 embodiment. Alternatively, a single 16 QAM may be generated in a rate 3/4 embodiment. Other rate type encoder may also be employed that generate different types of output symbols without departing from the scope and spirit of the invention.

These output symbols, in whichever embodiment is employed at a given time, are then provided to a modulator that may include a Digital to Analog Converter (DAC) that generates an analog signal that may be transmitted across a communication channel. This analog signal may be viewed as a baseband analog signal whose frequency varies at the rate of a baseband clock at which the PC-TCM encoder operates. This analog signal may also be up converted, in frequency, to a higher frequency for transmission across the communication channel. For example, the baseband analog signal may be converted up to an IF (Intermediate Frequency) for transmission across the communication channel, or to another frequency that corresponds to the bandwidth constraints of the communication channel.

The communication channel may be any of the various types of communication channels described within this specification. The PC-TCM encoder may be viewed as being a modified turbo encoder, which employs PC-TCM encoding, in conjunction with the symbol mapping. The output symbols are then mapped to the constellation appropriate points within the corresponding constellation according to the symbol mapper in the particular embodiment.

FIG. 12 is a diagram illustrating a prior art embodiment of a non-systematic and linear turbo encoder with base code rate 1/3 (as described in Collins, et al.). This embodiment is provided here for allowing the reader to understand more clearly the divergence of the invention from such prior art designs in terms of code design.

Within the generic encoder mentioned above that is based on the Robertson and Worz model, the upper and upper constituent encoder and the lower constituent encoder are both taken to be RSC (Recursive Systematic Convolutional) encoders. In fact, when two constituent encoders are RSC encoders, the portion of the encoder that does not include the symbol mapper, described previously within the FIG. 11, is in fact a turbo encoder similar to the one invented by Berrou, et al., and as described in the following documents:

C. Berrou, A. Galvieux and P. Thitinmajshima, "Near Shannon limit error-correcting coding and decoding: Turbo-codes," in *Proc. ICC '93*, pp. 1064–10470, May 1993; and C. Berrou, "Error-correction coding method with at least two systematic convolutional coding in parallel, corresponding iterative decoding method, decoding module and decoder," U.S. Pat. No. 5,446,747, Aug. 29, 1995.

Within the document referenced below, Collins, et al., proposed a non-systematic turbo-code using one 1/2 rate non-systematic convolutional encoder and one rate 1 non-systematic convolutional encoder to be used as the constituent encoders.

O. M. Collins, O. Y. Takeshita and D. J. Costello, Jr., "Iterative decoding of non-systematic turbo-codes," in *Proc. ISIT 2000*, Sorrento, Italy, p. 172, Jun. 25–30, 2000.

The prior art non-systematic encoder defined within the Collins, et al., reference may be defined by the generate matrix described below:

$$[n_3(D)/d_3(D), n_4(D)/d_4(D)]$$

Within this generate matrix, the terms $n_3(D)$, $d_3(D)$, $n_4(D)$, $d_4(D)$ are the binary polynomials employed by the encoder. For example, within the approach described by Collins, et al., when the generate matrices of the two constituent encoders are as follows:

$$\left[\frac{1+D}{1+D+D^2}, \frac{1+D+D^3}{1+D+D^2}\right], \left[\frac{1+D^3+D^4}{1+D+D^2}\right],$$

then the block diagram of the prior art non-systematic turbo code presented therein is the one shown within the FIG. 12. It is noted that while this turbo encoder is in fact non-systematic, it is a linear turbo encoder. It is noted that this prior art is not a PC-TCM encoder, but rather it is a turbo encoder based on linear codes.

The code rate of such a non-systematic turbo encoder in is 1/3. To obtain a higher code rate, puncturing may be performed as described within the C. Berrou, U.S. Pat. No. 5,446,747 reference. However, it is known that not all convolutional encoders may be obtained by puncturing a rate 1/2 encoder. As one example, a rate 2/3 systematic convolutional encoder (described in more detail below within FIG. 13B) cannot be obtained by puncturing any rate 1/2 convolutional encoder. Clearly, such a prior art encoder has some serious limitations in application given that it is not adaptable to a wide variety of code rates.

Moreover, although the constituent encoders used in the C. Berrou, et al., *Proc. ISIT* 2000 reference and in the Collins, et al., reference are trellis encoders, there are only one kind of trellis encoders, namely, linear trellis encoders. When such an encoder is linear, the trellis encoder is a convolutional encoder as described in the following document:

R. J. McEliece, "The algebraic theory of convolutional codes," in *Handbook of Coding Theory* (Chapter 12), pp. 1065–1138, V. S. Pless and W. C. Huffman, eds. Amsterdam: Elsevier Science Publisher, 1998.

A definition is presented by McEliece of a rate k/n linear trellis encoder (or convolutional encoder) with memory m. The definition of McEliece may be summarized as follows:

Let $(i_1, \ldots, i_{k-1})$ and $(s_0, \ldots, s_{m-1})$ denote current input and current state, respectively. Then the next state $(s'_0, \ldots, s'_{m-1})$ and the output $(c_0, \ldots, c_{m-1})$ of the encoder can be represented as follows:

$$(s'_0, \ldots s'_{m-1}) = (s_0, \ldots s_{m-1})A + (i_1, \ldots i_{k-1})B \qquad \text{EQ. 1}$$

$$(c_0, \ldots c_{m-1}) = (s_0, \ldots s_{m-1})C + (i_1, \ldots i_{k-1})D \qquad \text{EQ. 2}$$

where A is an m×m matrix, B is an k×m matrix, C is an m×n matrix, and D is an k×n matrix. Using this definition as presented by McEliece, a design criterion may be made for use in designing and ensuring the non-linearity of a non-systematic and non-linear PC-TCM code according to the invention. This design criterion, criterion 1, may be summarized as follows:

Criterion 1: If the current input is (00 . . . , 0) and current state is (00 . . . , 0), but the next state of a trellis encoder is not (00 . . . , 0), then the trellis encoder is non-linear.

Figure 13A:
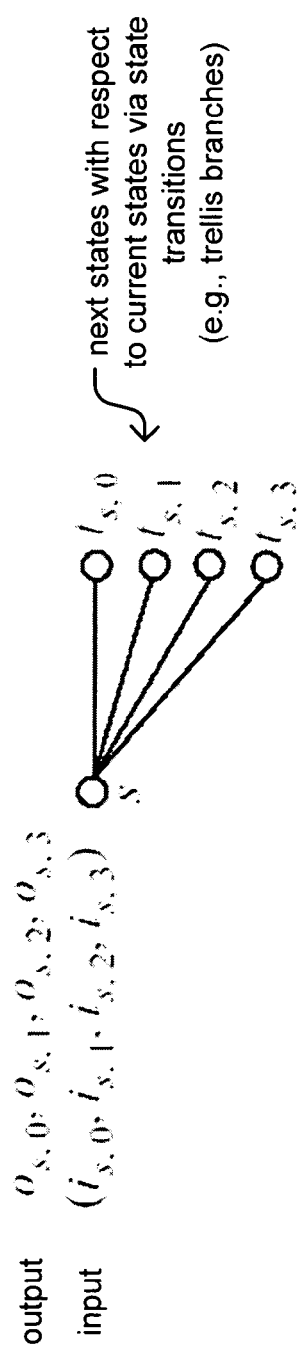
FIG. 13A is a diagram illustrating an embodiment of non-systematic trellis representation that is employed according to the invention.

FIG. 13A is a diagram illustrating an embodiment of non-systematic trellis representation that is employed according to the invention. In general, an encoder is deemed to be "systematic" only if the input is readily available within the output of the encoder, and if the input cannot be readily seen in the output, then the encoder is typically deemed to be "non-systematic." However, at least one prior art reference (M. D. Trott, et al., referenced below) deems an encoder still to be "systematic" if the input can be determined as a closed formula function of the output, and the Trott reference deems an encoder to be "non-systematic" if the input cannot be determined as a closed formula function of the output. The Trott reference employs a more strict definition of non-systematic than is typically used in the prior art.

The non-systematic and non-linear PC-TCM described herein according to the invention is based on this stricter definition of "non-systematic" as used within the Trott reference.

Again, the following reference provides further discussion on some interpretations of the differences between systematic and non-systematic encoder types:

M. D. Trott, S. Bendetto, R. Garelo and M. Mondin, "Rotational invariance of trellis codes-part I: encoder and precoder," *IEEE Trans. on Information Theory*, pp. 751–765, Vol. 42, May 1996.

For clarity of the various aspects of the invention and for illustrative purposes, this specification focuses on PC-TCMs with trellis encoders of memory length 3. However, it is noted that all the principles of the invention may also be extended to trellis encoders with memory lengths more than 3. The basic trellis encoder employed within this presentation is a rate 2/3 encoder. To generate higher rate encoders, puncturing of encoded bits may be performed.

The basic trellis encoder employed within this discussion is a trellis encoder with memory length 3 and 2-bit symbol. The trellis encoder has 8 state nodes and 4 out transitions from any 1 state node.

The 8 state nodes may be denoted by 0,1, . . . , and 7; an output from state s may be denoted by $(o_{s,0}, o_{s,1}, o_{s,2}, o_{s,3})$; and its corresponded input may be denoted by $(i_{s,0}, i_{s,1}, i_{s,2}, i_{s,3})$, where $o_{s,j}$ is a three bit symbol and $i_{s,j}$ is a two bit symbol. The next state, after a transition within the trellis (e.g., state transitions or state trellis branches), may be represented as $t_{s,j}$ with respect to the current state s and input $i_{s,j}$. Using this example, the 4 possible state transitions to which the trellis encoder may transition from the current state s are shown as being $t_{s,0}, t_{s,1}, t_{s,2}, t_{s,3}$.

Using this notation described above, a second criterion may be defined to ensuring the non-systematic nature of a trellis encoder. This design criterion, criterion 2, may be summarized as follows:

Criterion 2: If there exist two states $s_1, s_2$ and $j,k \in \{0,1,2,3\}$ such that $o_{s_1,j} = o_{s_2,k}$, but $i_{s_1,j} \neq i_{s_2,k}$, then the trellis encoder is non-systematic.

This design criterion 2 may also be summarized as follows: when there exist two output states that are the same, and yet if each of these output states may be reached when transitioning from different input states in response to different inputs, then the trellis encoder is non-systematic.

Using these design criteria (criterion 1 and criterion 2), the invention presents a code design approach that may be used for designing a high performance non-systematic PC-TCM. This design approach may be performed using the following two steps:

1. With a fixed output distribution and a fixed state transition, an input distribution is to find such that the design criterion 2 is satisfied.

2. A constellation mapper providing the lowest BER (Bit Error Rate) is then found.

For illustrative purposes in this specification, a high performance rate 2/3 systematic PC-TCM is initially employed.

Figure 13B:
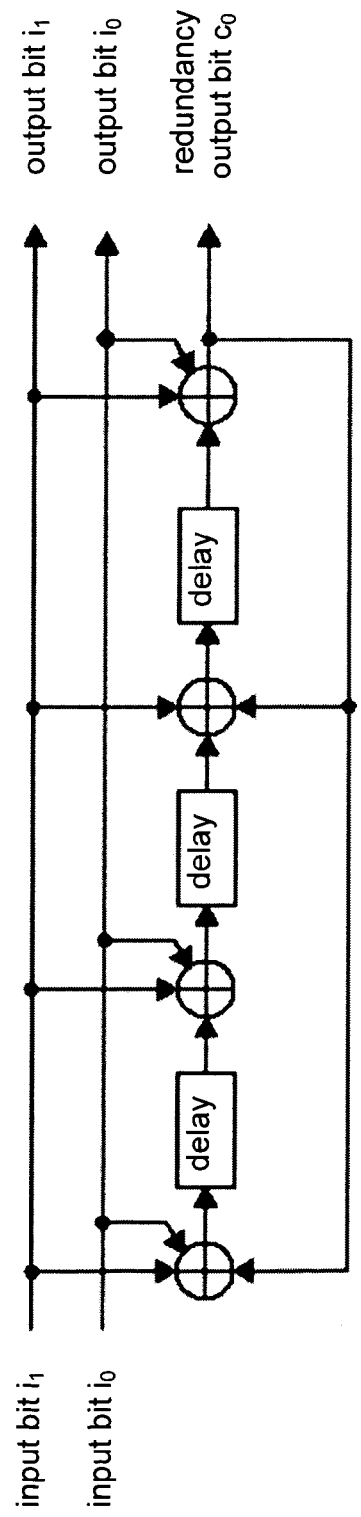
FIG. 13B is a diagram illustrating an embodiment of a rate 2/3 systematic encoder that is built according to the invention.

FIG. 13B is a diagram illustrating an embodiment of a rate 2/3 systematic encoder that is built according to the invention. The rate 2/3 systematic encoder includes a number of delay elements and adders, connected as depicted in the diagram. The rate 2/3 systematic encoder in this diagram may be employed as the constituent encoders (e.g., upper and lower constituent encoders) when building a PC-TCM encoder according to the invention. It can be seen that this encoder is systematic, in that, the input bits, $i_0, i_1$, are readily available in the output, shown as output bits $i_0, i_1$. In addition, a single redundancy bit (or coded bit) is also available in the output, shown as redundancy output bit $c_0$. Redundancy bits are also sometimes referred to as parity bits.

Figure 14B:
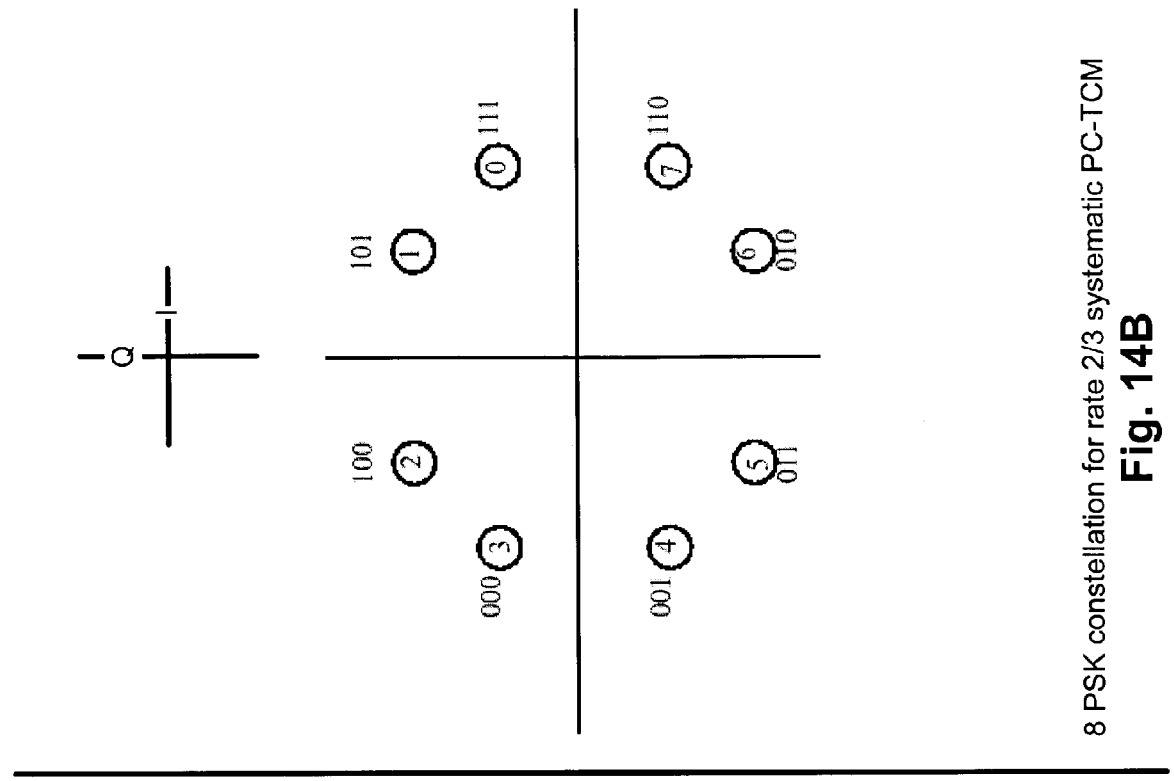
FIG. 14B is a diagram illustrating an embodiment of an 8 PSK (8 Phase Shift Key) constellation for a rate 2/3 systematic PC-TCM encoder (built using the rate 2/3 systematic encoder as the constituent encoders) that is built according to the invention.
Figure 14A:
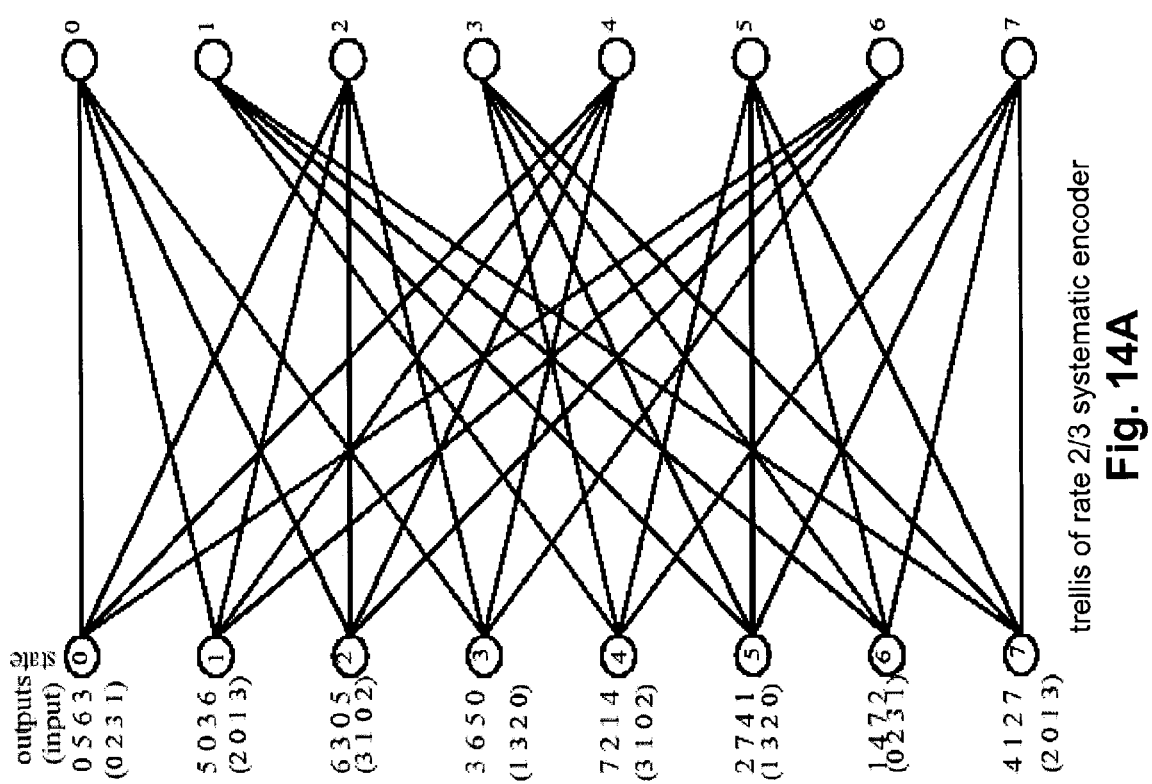
FIG. 14A is a diagram illustrating an embodiment of a trellis of a rate 2/3 systematic encoder that is built according to the invention.

FIG. 14A is a diagram illustrating an embodiment of a trellis of a rate 2/3 systematic encoder that is built according to the invention. In addition, it may be noted that this encoder generates a code with a best effective free distance $d_2=5$, and the number of the effective nearest neighbor is 1. The operation of the state transitions (or transitions across the trellis branches) may be described as follows:

This illustrated trellis is an 8 state trellis. The operation of this 8 state trellis, with the mapping shown, may then be described as follows. After looking at these examples, state transitions from the other states will also be understood.

When the encoder is in the state 0 (0=000 binary), and when a 0 (0=00 binary) valued input symbol is provided, then the state of the encoder will transition from the input state 0=000 to the output state 0=000. This may be viewed as the state of the encoder transitioning along the $1^{st}$ possible branch of the trellis extending from the input state 0=000; this branch may be viewed as being indexed by the 0=00 input symbol. That is to say: when starting from the input state 0=000, and when receiving as input the 2 bit symbol 0=00, the encoder will transition to output state 0=000, and a 3 bit, coded output symbol is generated by the encoder having a value of 0=000.

Looking at another example: when the encoder is in the state 0 (0=000 binary), and when a 2 (2=10 binary) valued input symbol is provided, then the state of the encoder will transition from the input state 0=000 to the output state 2=010. This may be viewed as the state of the encoder transitioning along the $2^{nd}$ possible branch of the trellis extending from the input state 0=000; this branch may be viewed as being indexed by the 2=10 input symbol. That is to say: when starting from the input state 0=000, and when receiving as input the 2 bit symbol 2=10, the encoder will transition to output state 2=010, and a 3 bit, coded output symbol is generated by the encoder having a value of 5=101.

Looking at another example: when the encoder is in the state 0 (0=000 binary), and when a 3 (3=11 binary) valued input symbol is provided, then the state of the encoder will transition from the input state 0=000 to the output state 4=100. This may be viewed as the state of the encoder transitioning along the $3^{rd}$ possible branch of the trellis extending from the input state 0=000; this branch may be viewed as being indexed by the 3=11 input symbol. That is to say: when starting from the input state 0=000, and when receiving as input the 2 bit symbol 3=11, the encoder will transition to output state 4=100, and a 3 bit, coded output symbol is generated by the encoder having a value of 6=110.

Looking at final example extending from the input state 0 (0=000 binary): when the encoder is in the state 0 (0=000 binary), and when a 1 (1=01 binary) valued input symbol is provided, then the state of the encoder will transition from the input state 0=000 to the output state 6=110. This may be viewed as the state of the encoder transitioning along the $4^{th}$ possible branch of the trellis extending from the input state 0=000; this branch may be viewed as being indexed by the 1=01 input symbol. That is to say: when starting from the input state 0=000, and when receiving as input the 2 bit symbol 1=01, the encoder will transition to output state 6=110, and a 3 bit, coded output symbol is generated by the encoder having a value of 3=011.

The state transitions of this trellis, along the other various braches of the trellis, extending from the other initial input states and in response to the various possible inputs, may be understood in reference to these example state transitions.

FIG. 14B is a diagram illustrating an embodiment of an 8 PSK (8 Phase Shift Key) constellation for a rate 2/3 systematic PC-TCM encoder (built using the rate 2/3 systematic encoder as the constituent encoders) that is built according to the invention. The mapping of the 8 constellation points in the 8 PSK constellation is made based on modeling and simulation as to which provides the lowest BER (Bit Error Rate).

The constellation points are numbered consecutively and counter-clockwise from 0, 1, 2, . . . , to 7 as shown within the center of the constellation points. The mapping of the constellation points may be described as follows:

Constellation point 0: corresponds output symbol 7 (7=111 binary)
Constellation point 1: corresponds output symbol 5 (5=101 binary)
Constellation point 2: corresponds output symbol 4 (4=100 binary)
Constellation point 3: corresponds output symbol 0 (0=000 binary)
Constellation point 4: corresponds output symbol 1 (1=001 binary)
Constellation point 5: corresponds output symbol 3 (3=011 binary)
Constellation point 6: corresponds output symbol 2 (2=010 binary)
Constellation point 7: corresponds output symbol 6 (6=110 binary)

Figure 15:
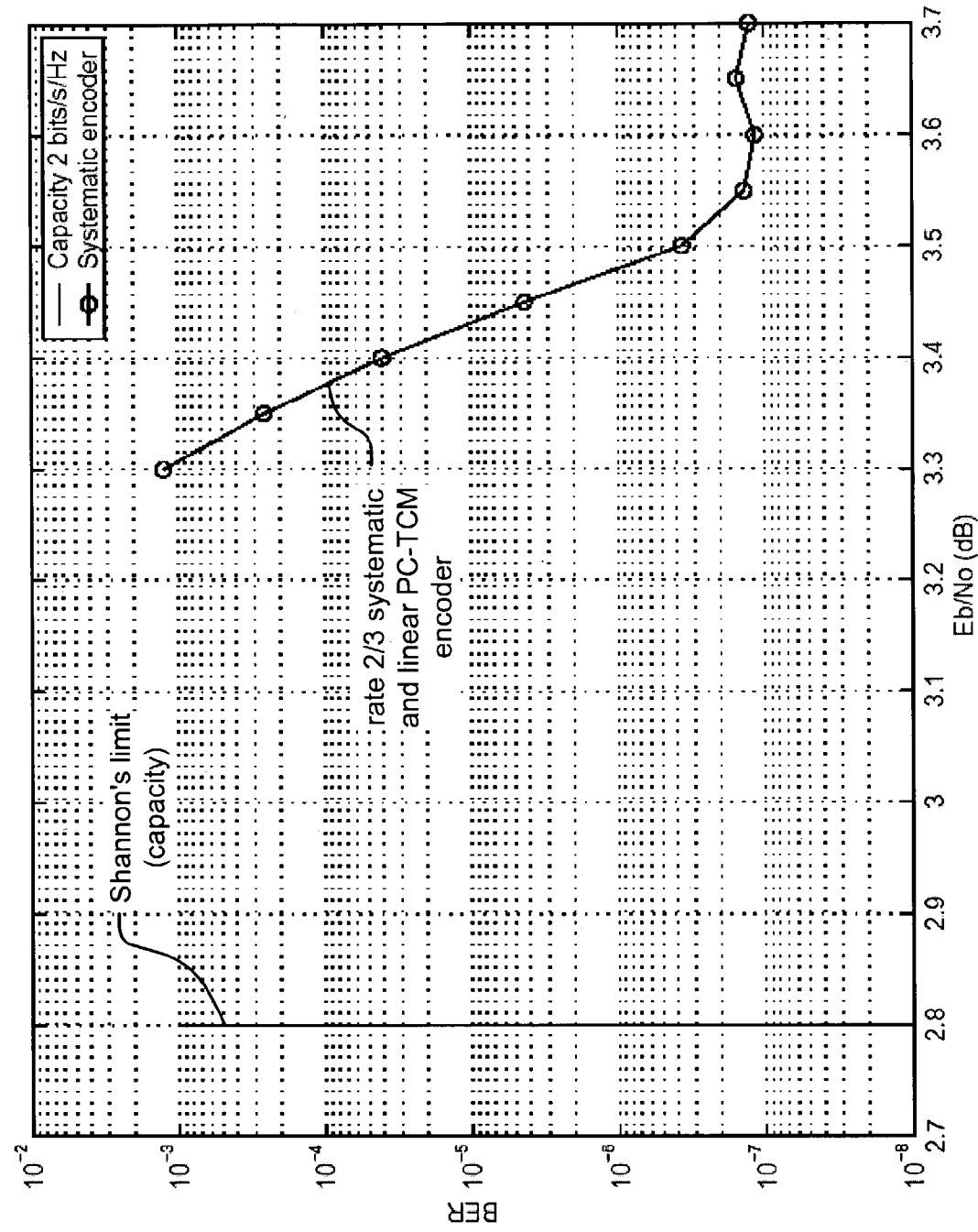
FIG. 15 is a diagram illustrating an embodiment of performance of a rate 2/3 and 1-8 PSK systematic PC-TCM encoder that is built according to the invention.

FIG. 15 is a diagram illustrating an embodiment of performance of a rate 2/3 and 1-8 PSK systematic PC-TCM encoder that is built according to the invention. These performance curves, as well as many others described within this specification, are described in the context of BER (Bit Error Rate) versus $E_b/N_o$ (ratio of energy per bit $E_b$ to the Spectral Noise Density $N_o$). This term $E_b/N_o$ is the measure of SNR (Signal to Noise Ratio) for a digital communication system. When looking at these performance curves, the BER may be determined for any given $E_b/N_o$ (or SNR). For example, when operating at a $E_b/N_o$ of approximately 3.4 dB (decibels), the BER of this rate 2/3 and 1-8 PSK systematic PC-TCM encoder is approximately $4 \times 10^{-5}$. Similarly, when operating at a $E_b/N_o$ of approximately 3.5 dB (decibels), the BER of this rate 2/3 and 1-8 PSK systematic PC-TCM encoder is approximately $3.75 \times 10^{-7}$. The performance of this rate 2/3 and 1-8 PSK systematic PC-TCM encoder may also be found when operating at other $E_b/N_o$ as well.

The performance of this rate 2/3 and 1-8 PSK systematic PC-TCM encoder is used throughout this specification as a benchmark against which comparison of other PC-TCM encoders may be compared.

Figure 16:
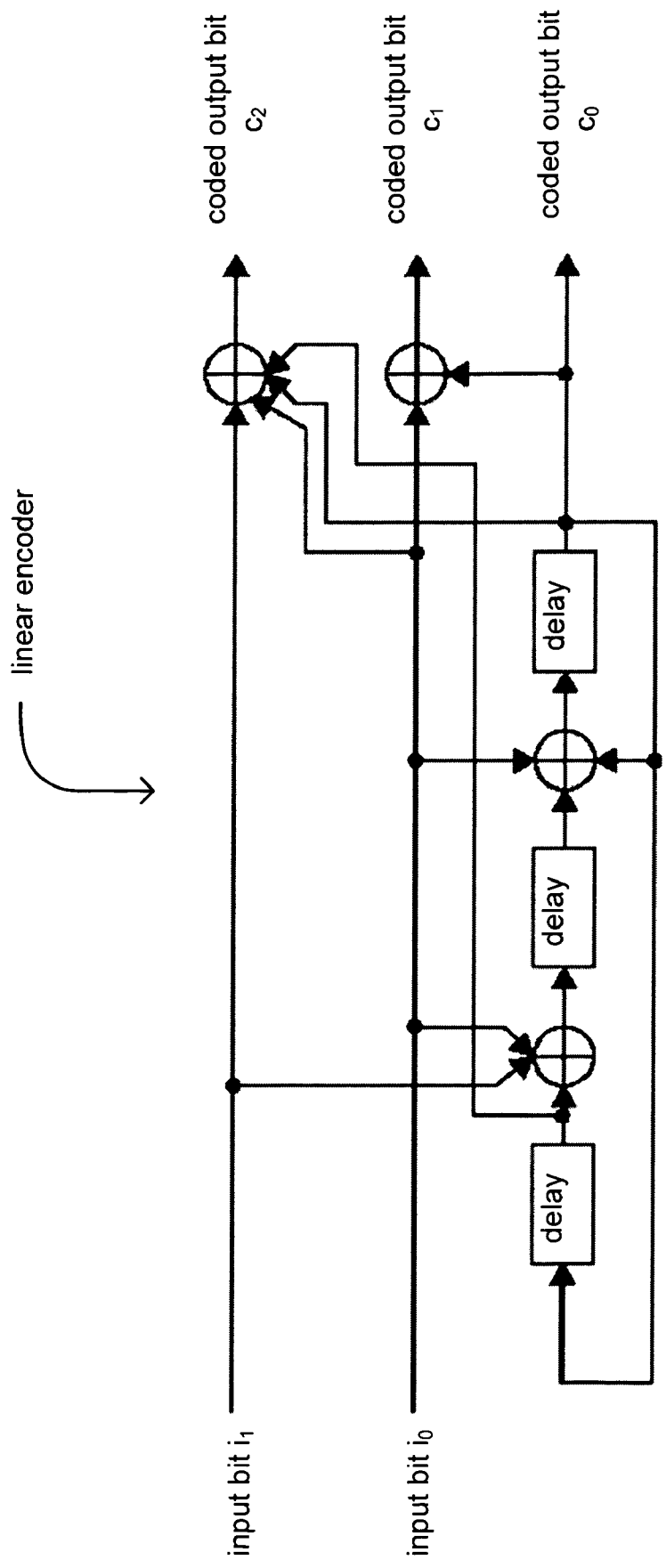
FIG. 16 is a diagram illustrating an embodiment of a rate 2/3 non-systematic and linear encoder A that is built according to the invention.

FIG. 16 is a diagram illustrating an embodiment of a rate 2/3 non-systematic and linear encoder A that is built according to the invention. The rate 2/3 non-systematic and linear encoder A includes a number of delay elements and adders, connected as depicted in the diagram. Continuing on with the search for an encoder according to the invention, it is noted that the search for a non-systematic PC-TCM starts with modifying the systematic convolutional constituent encoder described above. In this way, a linear trellis encoder may initially be constructed. Among the possible rate 2/3 trellis encoders, an encoder, referred to as encoder A in this specification, gives a reasonable good performance for PC-TCM. The circuit of encoder A is presented in this diagram.

It can be seen that this encoder A is a non-systematic encoder, in that, the input bits, $i_0, i_1$, are not readily available in the output. Three coded output bits, $c_2, c_1, c_0$, are produced by this encoder A.

FIG. 17A is a diagram illustrating an embodiment of a trellis of the rate 2/3 non-systematic and linear encoder A that is built according to the invention. This trellis corresponds to the encoder A described above. When comparing this trellis to the trellis described within the FIG. 14A, it is noted that the output distribution is different, but that the input distribution is the same.

For example, from this trellis, it can be seen that when the output is 0 (0=000 binary), the input at state 0 (0=000 binary) is the 2 bit symbol 0 (0=00 binary), while the input is the 2 bit symbol 1 (1=01 binary) at state 1 (1=001 binary). Therefore, by the design criterion 2 presented above, this trellis encoder is in fact non-systematic.

FIG. 17B is a diagram illustrating an embodiment of matrices of the rate 2/3 non-systematic and linear encoder A (showing its linearity) that is built according to the invention.

Moreover, to show the linearity of this encoder, the corresponding values of the trellis may be substituted into the Equations described above (EQ. 1 and EQ. 2) to obtain the following matrices:

$$A = \begin{bmatrix} 010 \\ 001 \\ 101 \end{bmatrix}, B = \begin{bmatrix} 011 \\ 010 \end{bmatrix}, C = \begin{bmatrix} 001 \\ 000 \\ 111 \end{bmatrix}, D = \begin{bmatrix} 001 \\ 011 \end{bmatrix}$$

Using these valued matrices for A, B, C, and D, it can be readily verified that all of the possible states, inputs, and outputs, do in fact satisfy the Equations (EQ. 1 and EQ. 2). Therefore, this trellis encoder is in fact linear. These Equations (EQ. 1 and EQ. 2) are provided again here for clarity for the reader.

$$(s'_0, \ldots s'_{m-1}) = (s_0, \ldots s_{m-1})A + (i_1, \ldots i_{k-1})B \qquad \text{EQ. 1}$$

$$(c_0, \ldots c_{m-1}) = (s_0, \ldots s_{m-1})C + (i_1, \ldots i_{k-1})D \qquad \text{EQ. 2}$$

FIG. 17C is a diagram illustrating an embodiment of an 8 PSK constellation for the rate 2/3 non-systematic and linear PC-TCM encoder (built using the encoder A as the constituent encoders) that is built according to the invention. That is to say, using the encoder A as the constituent encoders when building a rate 2/3 non-systematic and linear PC-TCM encoder, the constellation mapping providing the lowest BER is selected after trying several of the possible constellation mappings. The symbol mapping assignments are shown next to the corresponding constellation point.

Figure 18:
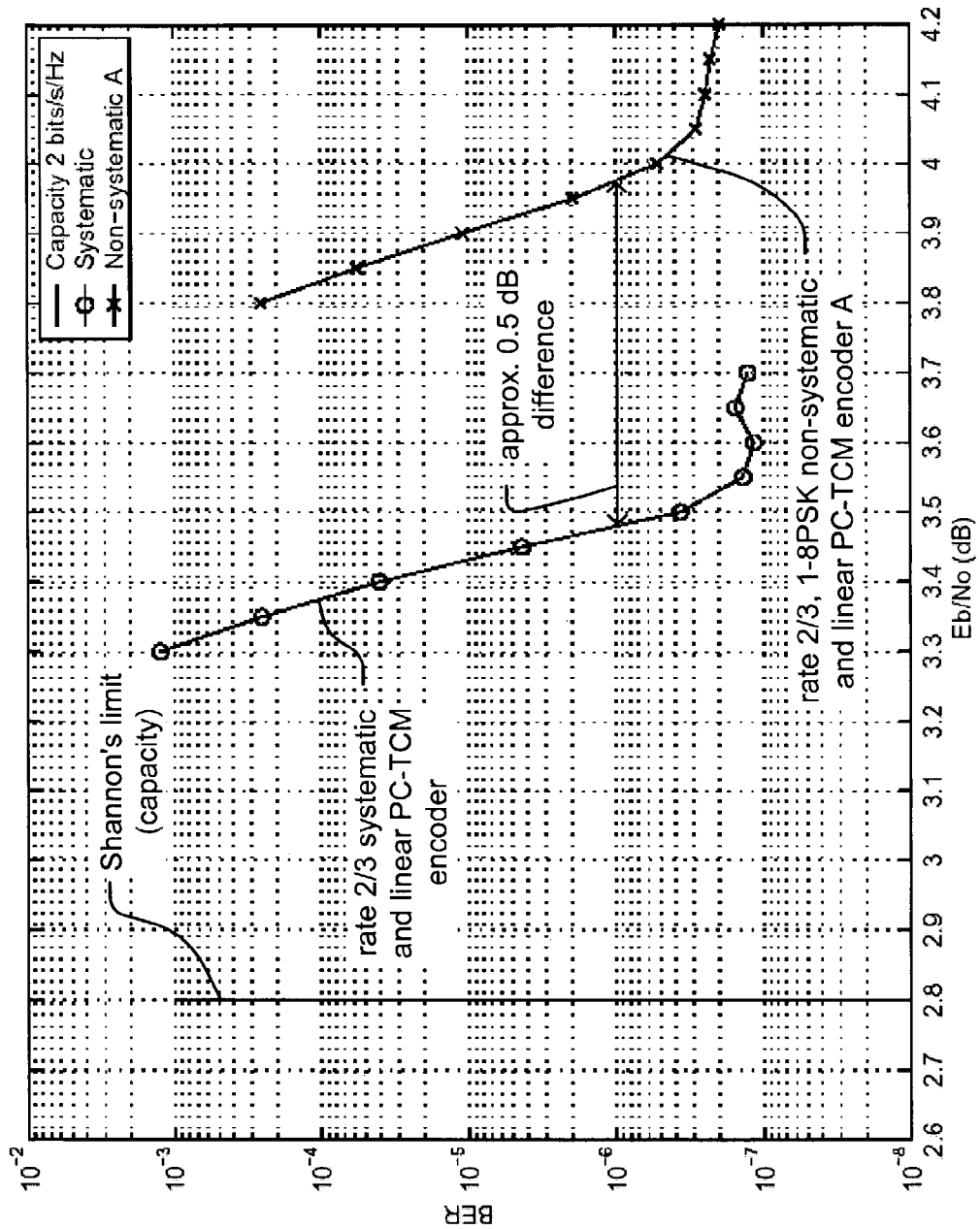
FIG. 18 is a diagram that compares the performance of some of the various rate 2/3 encoder embodiments that may be built according to the invention.

FIG. 18 is a diagram that compares the performance of some of the various rate 2/3 encoder embodiments that may be built according to the invention. Using the encoder A as a constituent encoder for such a rate 2/3 non-systematic and linear PC-TCM encoder, and using the constellation mapper shown within the FIG. 17C for an 8 PSK constellation, it can be seen that the performance of this non-systematic and linear PC-TCM suffers only about a 0.5 dB loss in $E_b/N_o$ (or SNR), when supporting a BER of approximately $1\times10^{-6}$, when compared to that of the rate 2/3 systematic and linear PC-TCM whose performance in shown within the FIG. 15.

Moreover, it can also be seen that the waterfall part of the BER curve of the rate 2/3 non-systematic and linear PC-TCM encoder (built using the encoder A as the constituent encoders) is also approximately about 0.5 dB different than that of the systematic and linear PC-TCM encoder described above.

While the performance of this non-systematic and linear PC-TCM encoder (built using encoder A as the constituent encoders) is relatively good when compared to the systematic and linear PC-TCM, the design process continues to find a viable and high performing non-systematic and non-linear PC-TCM encoder whose performance is even closer to that of the systematic and linear PC-TCM. In these previous discussions, the selection of constituent encoder is restricted only to include in linear encoders. However, from the trellis of the rate 2/3 non-systematic and linear encoder A, shown within the FIG. 17A, it can be seen that the linear encoder produces a "non-ideal trellis." "Non-ideal" is an accurate description given that 4 output values of the various state transitions (or trellis branches) actually go to the same terminating state; they are not all distinct. In an effort to avoid this, the search range of possible trellises is extended to all possible trellises, including non-linear trellises.

Figure 19:
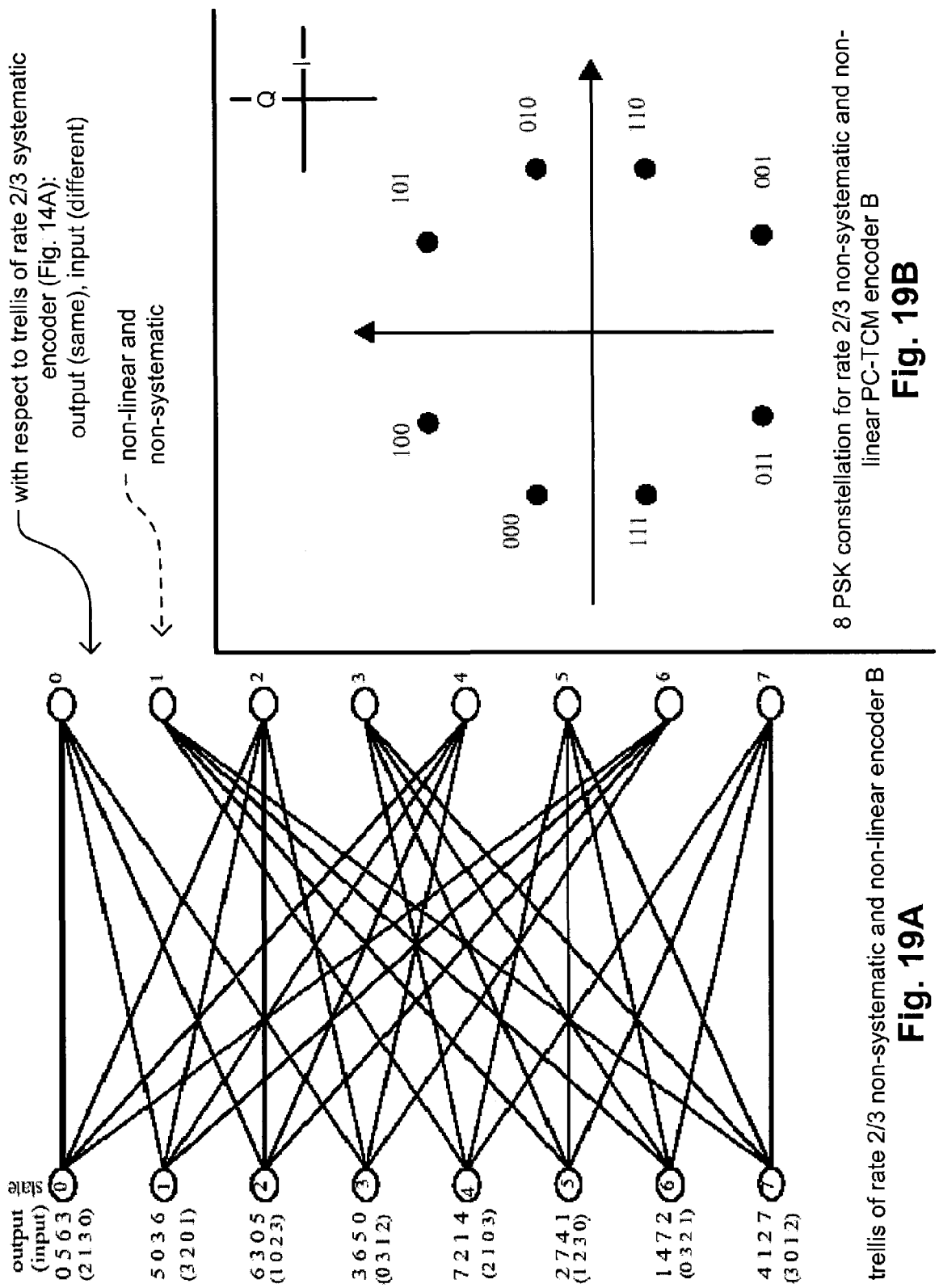
FIG. 19A is a diagram illustrating an embodiment of a trellis of the rate 2/3 non-systematic and non-linear encoder B that is built according to the invention.
FIG. 19B is a diagram illustrating an embodiment of an 8 PSK constellation for the rate 2/3 non-systematic and non-linear PC-TCM (built using the encoder B as the constituent encoders) that is built according to the invention.

FIG. 19A is a diagram illustrating an embodiment of a trellis of the rate 2/3 non-systematic and non-linear encoder B that is built according to the invention. The design of the non-systematic and non-linear encoder B is made using the various aspects of the invention described above. For example, by fixing the output distribution of the trellis of the rate 2/3 systematic and linear encoder described above within FIG. 14A, all of the possible input distributions are considered that meet the requirements of criterion 2.

When comparing this trellis to the trellis described within the FIG. 14A, it is noted that the output distribution is the same, but that the input distribution is different.

One of the first encoder that is found in this search is encoder B, whose trellis is shown within this diagram. In contrast to the encoder A (which is non-systematic and linear), this encoder B is non-systematic and also non-linear. For example, from this trellis, it can be seen that when the output is 5 (5=101 binary), the input at state 0 (0=000 binary) is 1 (1=01 binary). In addition, when the output is 5 (5=101 binary), the input at state 1 (0=001 binary) is 3 (3=11 binary). Therefore, there are two different input states for which the encoder B will arrive at the same output state in response to 2 different inputs; therefore the encoder B is in fact non-systematic.

As far as the linearity (or non-linearity) of the encoder B, is can be seen that when the current state is 0 (0=000 binary) and the current input is 0 (0=00), then the next state is 6 (6=110 binary) and the output is 3 (3=11 binary). Therefore, according to the design criterion 1, the encoder B is in fact non-linear.

FIG. 19B is a diagram illustrating an embodiment of an 8 PSK constellation for the rate 2/3 non-systematic and non-linear PC-TCM encoder (built using the encoder B as the constituent encoders) that is built according to the invention. Similar to the other embodiments described above, using the encoder B as the constituent encoders when building a rate 2/3 non-systematic and non-linear PC-TCM encoder, the constellation mapping providing the lowest BER is selected after trying several of the possible constellation mappings. The symbol mapping assignments are shown next to the corresponding constellation point.

Figure 20:
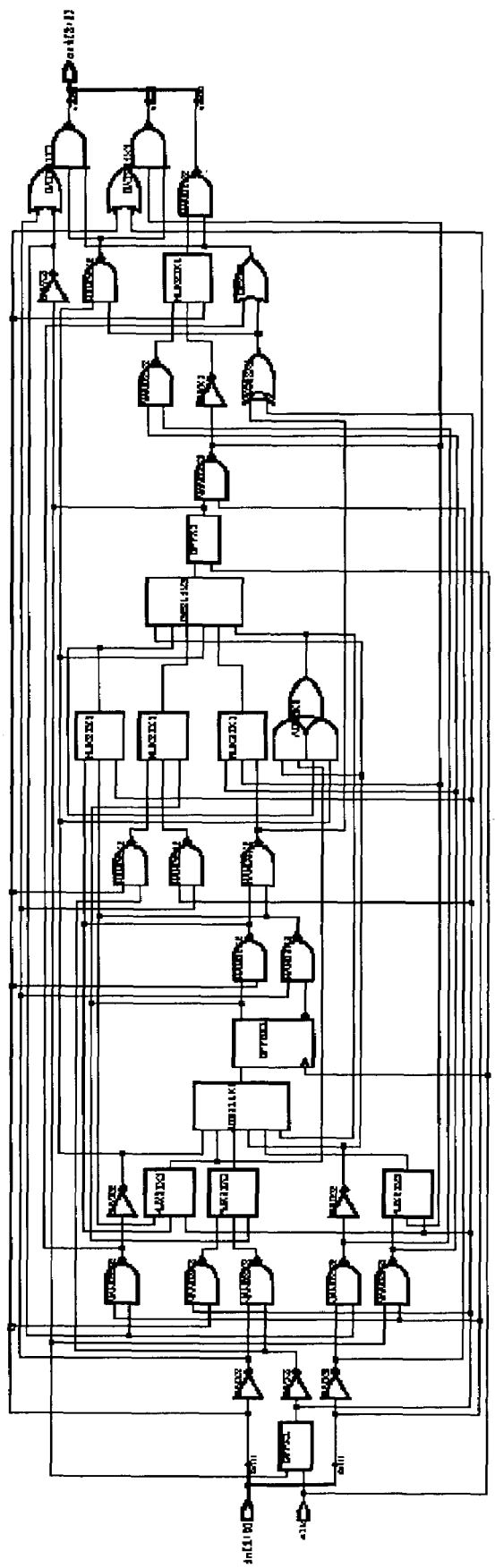
FIG. 20 is a diagram illustrating a possible embodiment (shown as a circuit) of a rate 2/3 non-systematic and non-linear encoder B that is built according to the invention.

FIG. 20 is a diagram illustrating a possible embodiment (shown as a circuit) of a rate 2/3 non-systematic and non-linear encoder B that is built according to the invention. This circuitry is constructed using the trellis of the rate 2/3 non-systematic and non-linear encoder B described above. The trellis of the rate 2/3 non-systematic and non-linear encoder B described above shows its non-systematic nature, and this circuitry implementation of the rate 2/3 non-systematic and non-linear encoder B show its non-systematic nature even more apparently.

Figure 21:
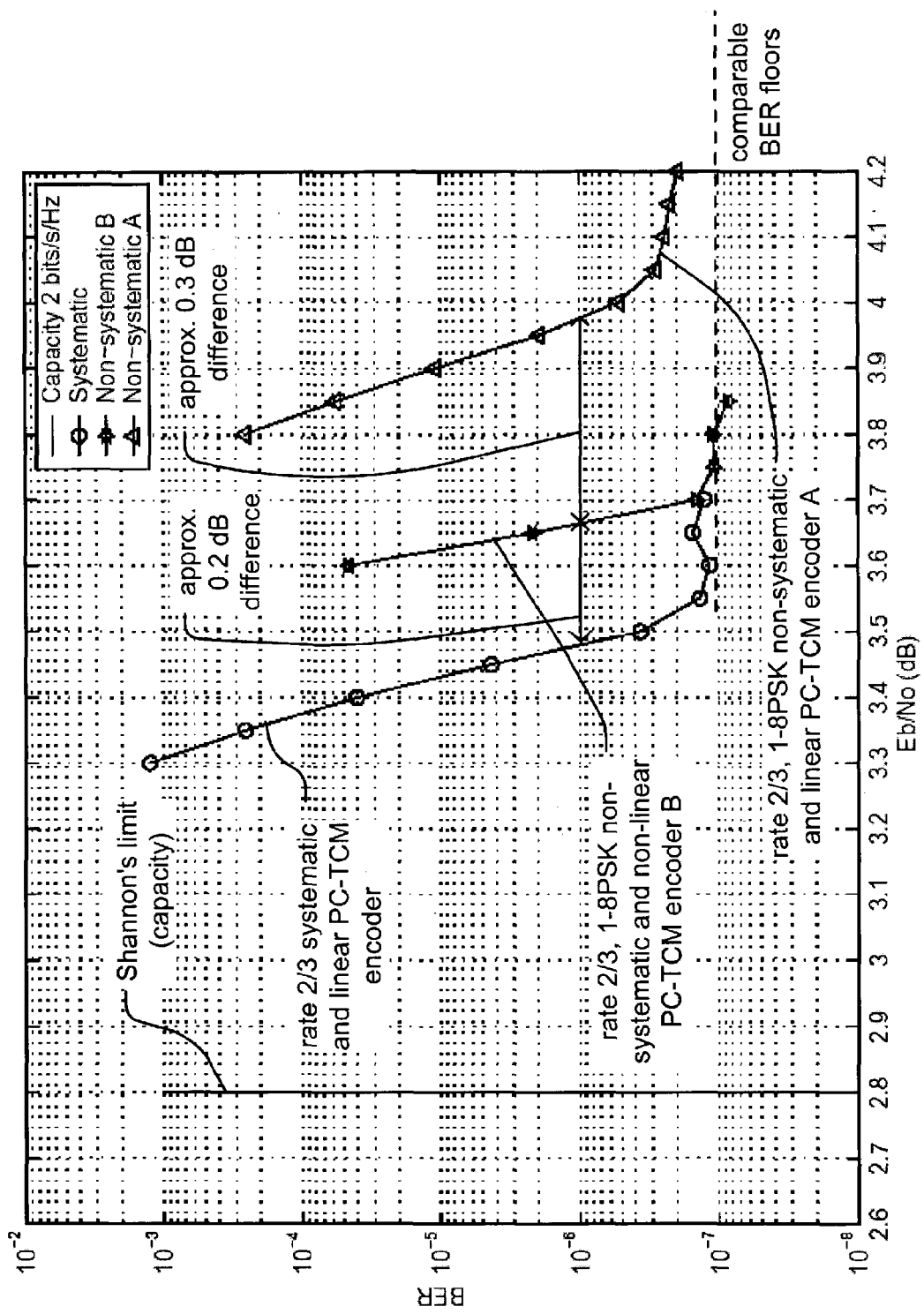
FIG. 21 is a diagram that compares the performance of some of the other various rate 2/3 encoder embodiments that may be built according to the invention.

FIG. 21 is a diagram that compares the performance of some of the other various rate 2/3 encoder embodiments that may be built according to the invention. Using the encoder B as a constituent encoder for such a rate 2/3 non-systematic and non-linear PC-TCM encoder, and using the constellation mapper shown within the FIG. 19B for an 8 PSK constellation, it can be seen that the performance of this non-systematic and non-linear PC-TCM encoder (built using the encoder B as the constituent encoders) gives about a 0.3 dB gain in $E_b/N_o$ (or SNR), when supporting a BER of approximately $1\times10^{-6}$, when compared to that of the rate 2/3 non-systematic and linear PC-TCM encoder (built using the encoder A as the constituent encoders) whose performance is shown within the FIG. 18 (and also within this diagram of FIG. 20).

Moreover, it can also be seen that the waterfall part of the BER curve of the rate 2/3 non-systematic and linear PC-TCM encoder (built using the encoder B as the constituent encoders) is also approximately only about 0.2 dB different than that of the systematic and linear PC-TCM encoder described above.

The BER curves in this diagram also indicates that the floor of the BER curve of the non-systematic and non-linear PC-TCM (using the encoder B as the constituent encoders) occurs at approximately the same BER as that of the rate 2/3 systematic and linear PC-TCM encoder.

In an effort to improve the performance of the waterfall part, the search for an even better non-systematic and non-linear PC-TCM encoder continues. That is to say, while the performance of this non-systematic and non-linear PC-TCM encoder (built using encoder B as the constituent encoders) is relatively good when compared to the first systematic and linear PC-TCM described, and while the performance of this non-systematic and non-linear PC-TCM encoder (built using encoder B as the constituent encoders) is better than the performance of the non-systematic and linear PC-TCM (using encoder A as the constituent encoders), the design process continues to find an even more viable and high performing non-systematic and non-linear PC-TCM encoder whose performance is even closer to that of the systematic and linear PC-TCM.

Figure 22:
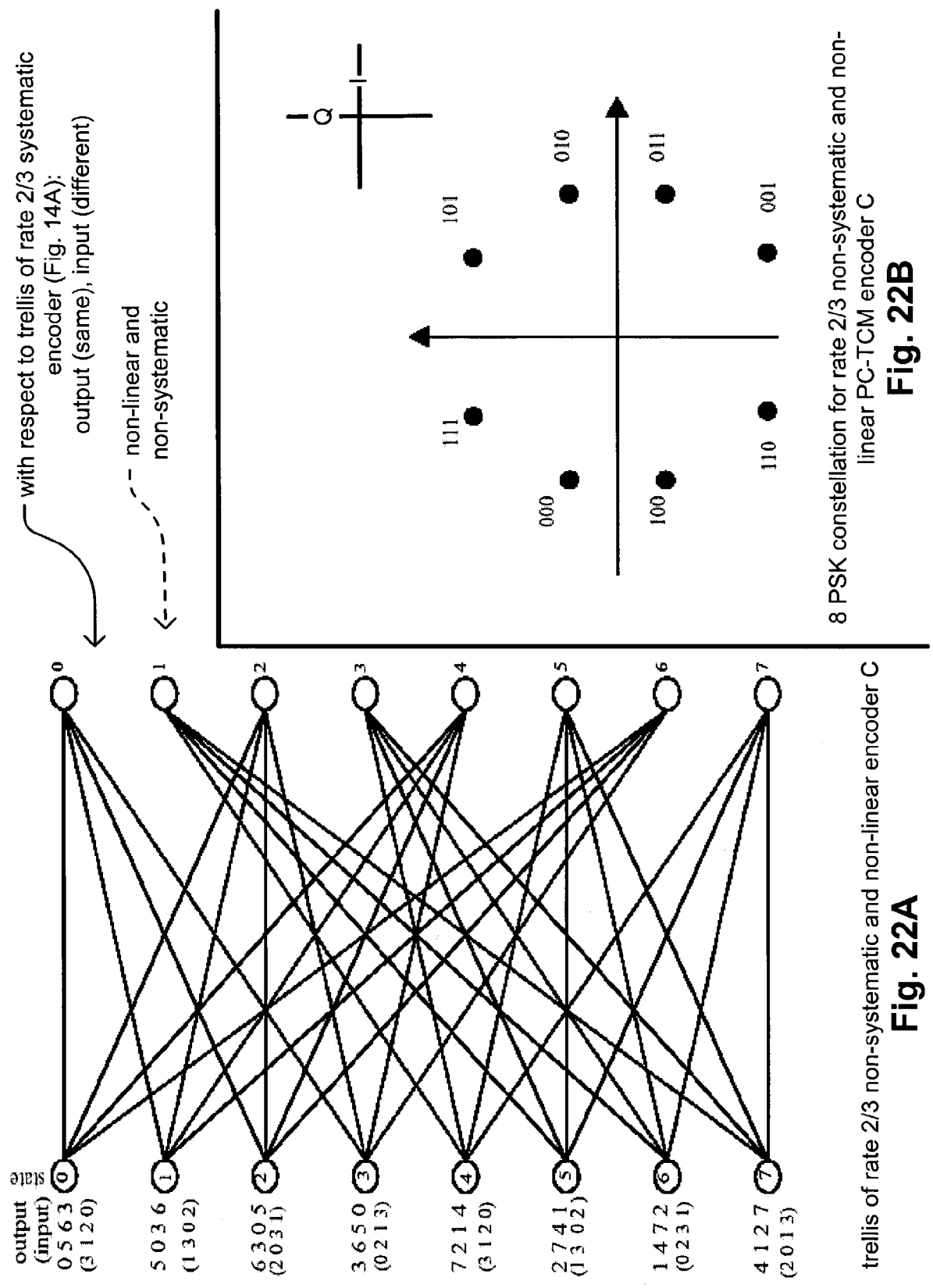
FIG. 22A is a diagram illustrating an embodiment of a trellis of the rate 2/3 non-systematic and non-linear encoder C that is built according to the invention.
FIG. 22B is a diagram illustrating an embodiment of an 8 PSK constellation for the rate 2/3 non-systematic and non-linear PC-TCM (built using the encoder C as the constituent encoders) that is built according to the invention.

FIG. 22A is a diagram illustrating an embodiment of a trellis of the rate 2/3 non-systematic and non-linear encoder C that is built according to the invention. Similar to the embodiments described above, the design of the non-systematic and non-linear encoder C is made using the various aspects of the invention described above.

When comparing this trellis to the trellis described within the FIG. 14A, it is noted that the output distribution is the same, but that the input distribution is different. When looking at the trellis of this encoder C, it can be seen that the next state that is given by the current state 0 (0=000 binary) and current input 0 (0=00 binary) is 6 (6=110) which is not 0 (0=000 binary). Given these conditions, and when considering criterion 1, it is seen that the encoder C is in fact a non-linear encoder.

As far as the systematic (or non-systematic) nature of the encoder C, this may be determined by looking at the output 1 (1=001 binary). The corresponding input at state 4 (4=100 binary) is 2 (2=10 binary), while the corresponded input at state 6 (6=110 binary) is 0 (0=00 binary). Therefore, by analyzing the design criterion 2, the encoder C is in fact also a non-systematic encoder. Therefore the encoder C is a non-systematic and non-linear PC-TCM encoder.

FIG. 22B is a diagram illustrating an embodiment of an 8 PSK constellation for the rate 2/3 non-systematic and non-linear PC-TCM encoder (built using the encoder C as the constituent encoders) that is built according to the invention.

Again, similar to the other embodiments described above, using the encoder C as the constituent encoders when building a rate 2/3 non-systematic and non-linear PC-TCM encoder, the constellation mapping providing the lowest BER is selected after trying several of the possible constellation mappings. The symbol mapping assignments are shown next to the corresponding constellation point.

Figure 23:
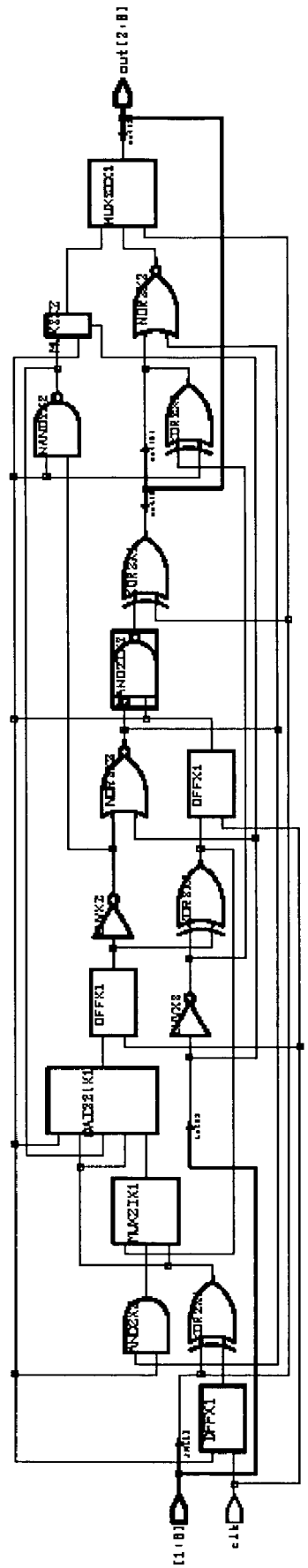
FIG. 23 is a diagram illustrating a possible embodiment (shown as a circuit) of a rate 2/3 non-systematic and non-linear encoder C that is built according to the invention.

FIG. 23 is a diagram illustrating a possible embodiment (shown as a circuit) of a rate 2/3 non-systematic and non-linear encoder C that is built according to the invention. This circuitry is constructed using the trellis of the rate 2/3 non-systematic and non-linear encoder C described above. As with the other encoder embodiments described above, the trellis of the rate 2/3 non-systematic and non-linear encoder C described above shows its non-systematic nature, and this circuitry implementation of the rate 2/3 non-systematic and non-linear encoder C show its non-systematic nature even more apparently.

Figure 24:
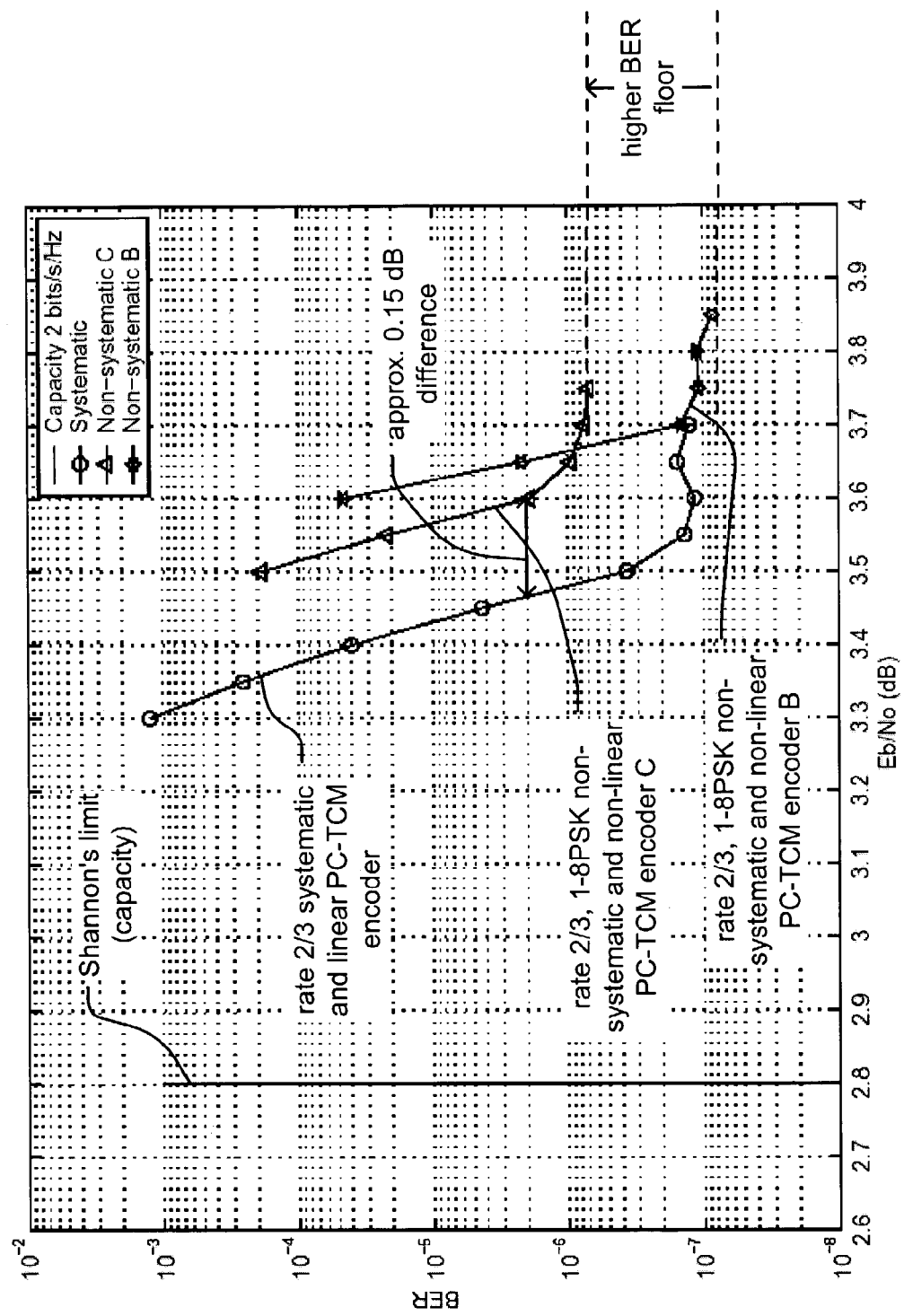
FIG. 24 is a diagram that compares the performance of some of the other various rate 2/3 encoder embodiments that may be built according to the invention.

FIG. 24 is a diagram that compares the performance of some of the other various rate 2/3 encoder embodiments that may be built according to the invention. Using the encoder C as a constituent encoder for such a rate 2/3 non-systematic and non-linear PC-TCM encoder, and using the constellation mapper shown within the FIG. 22B for an 8 PSK constellation, it can be seen that the performance of this non-systematic and non-linear PC-TCM encoder (built using the encoder C as the constituent encoders) reaches approximately to within 0.15 dB in terms of $E_b/N_o$ (or SNR), when supporting a BER of approximately $2 \times 10^{-6}$, when compared to that of the rate 2/3 systematic and linear PC-TCM encoder whose performance is shown originally within the FIG. 15.

Using the 8 PSK constellation mapper defined within FIG. 22B, it can be seen within this diagram of the performance of the non-systematic and non-linear PC-TCM (using the encoder C as the constituent encoders) as shown in the FIG. 24 that its waterfall part of the BER curve is approximately only about 0.15 dB different from that of the systematic and linear PC-TCM encoder described above. However, it is also noted that the BER floor for the non-systematic and non-linear PC-TCM encoder (built using the encoder C as the constituent encoders) is higher (or worse) than that of the non-systematic and non-linear PC-TCM encoder (built using the encoder B as the constituent encoders).

Given that this non-systematic and non-linear PC-TCM encoder (built using the encoder C as the constituent encoders) does provide for some improvement in terms of the waterfall part of the BER curve, its degradation in terms of BER floor pushes the search for another, even better non-systematic and non-linear PC-TCM encoder that will provide a better waterfall part of the BER curve and a lower BER floor.

Figure 25B:
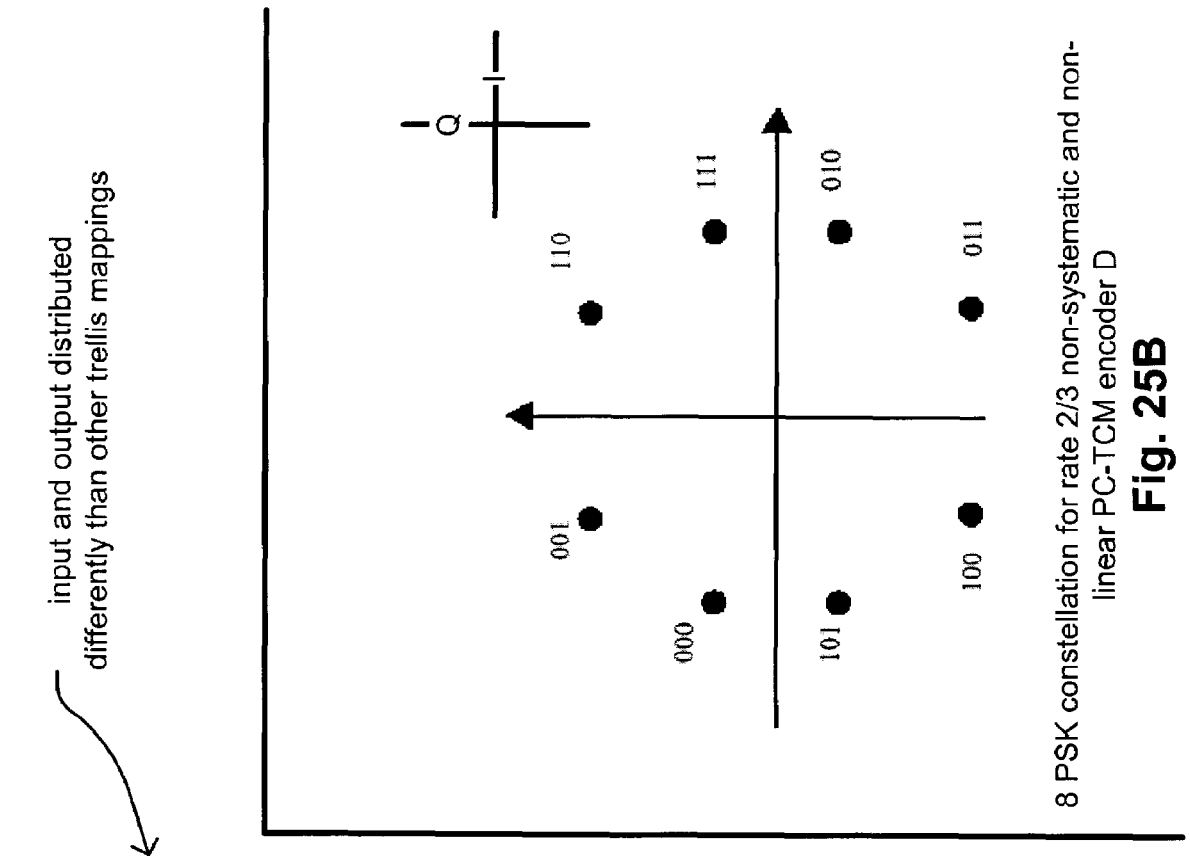
FIG. 25B is a diagram illustrating an embodiment of an 8 PSK constellation for the rate 2/3 non-systematic and non-linear PC-TCM (built using the encoder D as the constituent encoders) that is built according to the invention.
Figure 25A:
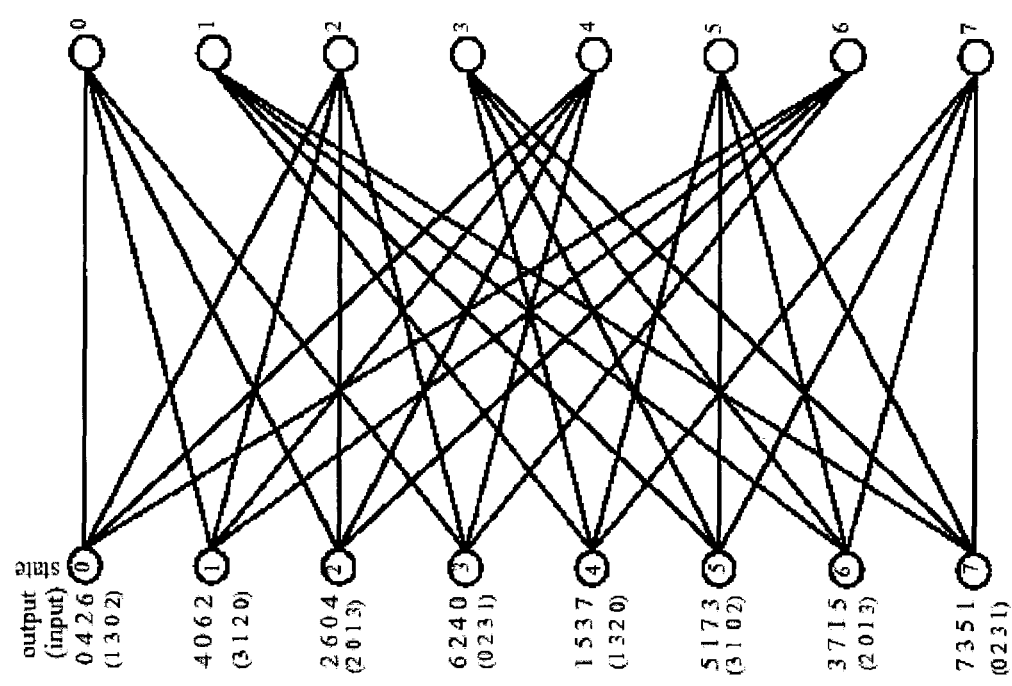
FIG. 25A is a diagram illustrating an embodiment of a trellis of the rate 2/3 non-systematic and non-linear encoder D that is built according to the invention.

FIG. 25A is a diagram illustrating an embodiment of a trellis of the rate 2/3 non-systematic and non-linear encoder D that is built according to the invention. As mentioned above, the invention involves, in one aspect, finding the best input distribution for an encoder having a fixed output distribution and a fixed state transition such that the design criterion 2 is satisfied.

In doing, so a fixed output distribution is made such that the distribution of the output of the trellis is changed from that of the best rate 2/3 systematic encoder to the distribution that corresponds to the one given in the trellis encoder used in Ungerboeck and as described in the following reference:

G. Ungerboeck, "Channel coding with multilevel/phase signal," *IEEE Trans. On Information Theory*, Vol. IT-28, pp. 55–67, January 1982.

By searching all of the possible input distributions that satisfy the design criterion 2, it is found that this type of trellis may also be employed to design a very good performing non-systematic encoder. The next two encoders that are considered are referred to as encoders D and E and their trellises and constellation mappings are shown in the corresponding Figures described below. Using the design criteria (criterion 1 and criterion 2) it can be seen that by changing the distributions of the input and outputs and making them different than previously described and ensuring that they satisfy these design criteria described above. It is also noted that both of the next two encoders that are considered (encoders D and E) are also non-systematic and non-linear in nature.

FIG. 25B is a diagram illustrating an embodiment of an 8 PSK constellation for the rate 2/3 non-systematic and non-linear PC-TCM (built using the encoder D as the constituent encoders) that is built according to the invention. Again, similar to the other embodiments described above, using the encoder D as the constituent encoders when building a rate 2/3 non-systematic and non-linear PC-TCM encoder, the constellation mapping providing the lowest BER is selected after trying several of the possible constellation mappings. Again, the symbol mapping assignments are shown next to the corresponding constellation point.

Figure 26:
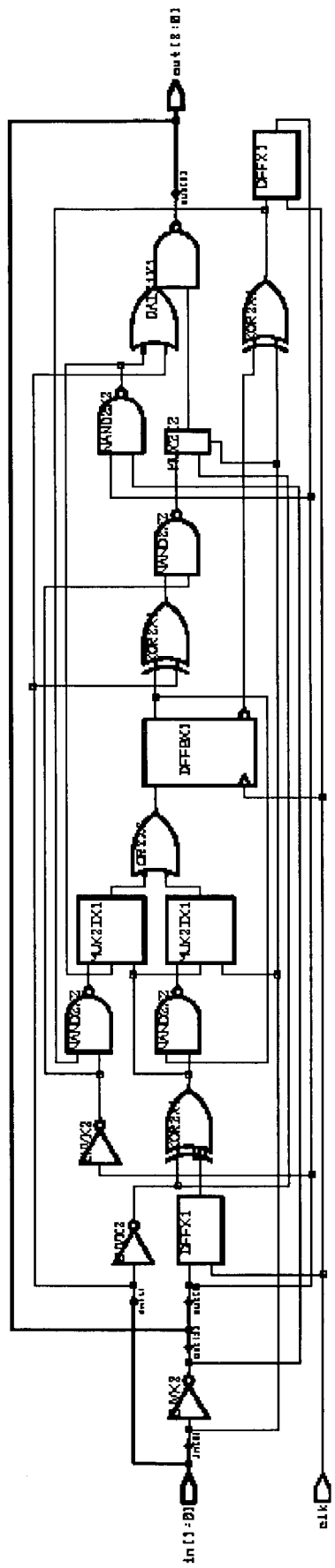
FIG. 26 is a diagram illustrating a possible embodiment (shown as a circuit) of a rate 2/3 non-systematic and non-linear encoder D that is built according to the invention.

FIG. 26 is a diagram illustrating a possible embodiment (shown as a circuit) of a rate 2/3 non-systematic and non-linear encoder D that is built according to the invention. This circuitry is constructed using the trellis of the rate 2/3 non-systematic and non-linear encoder D described above. Again, as with the other encoder embodiments described above, the trellis of the rate 2/3 non-systematic and non-linear encoder D described above shows its non-systematic nature, and this circuitry implementation of the rate 2/3 non-systematic and non-linear encoder D show its non-systematic nature even more apparently.

Figure 27:
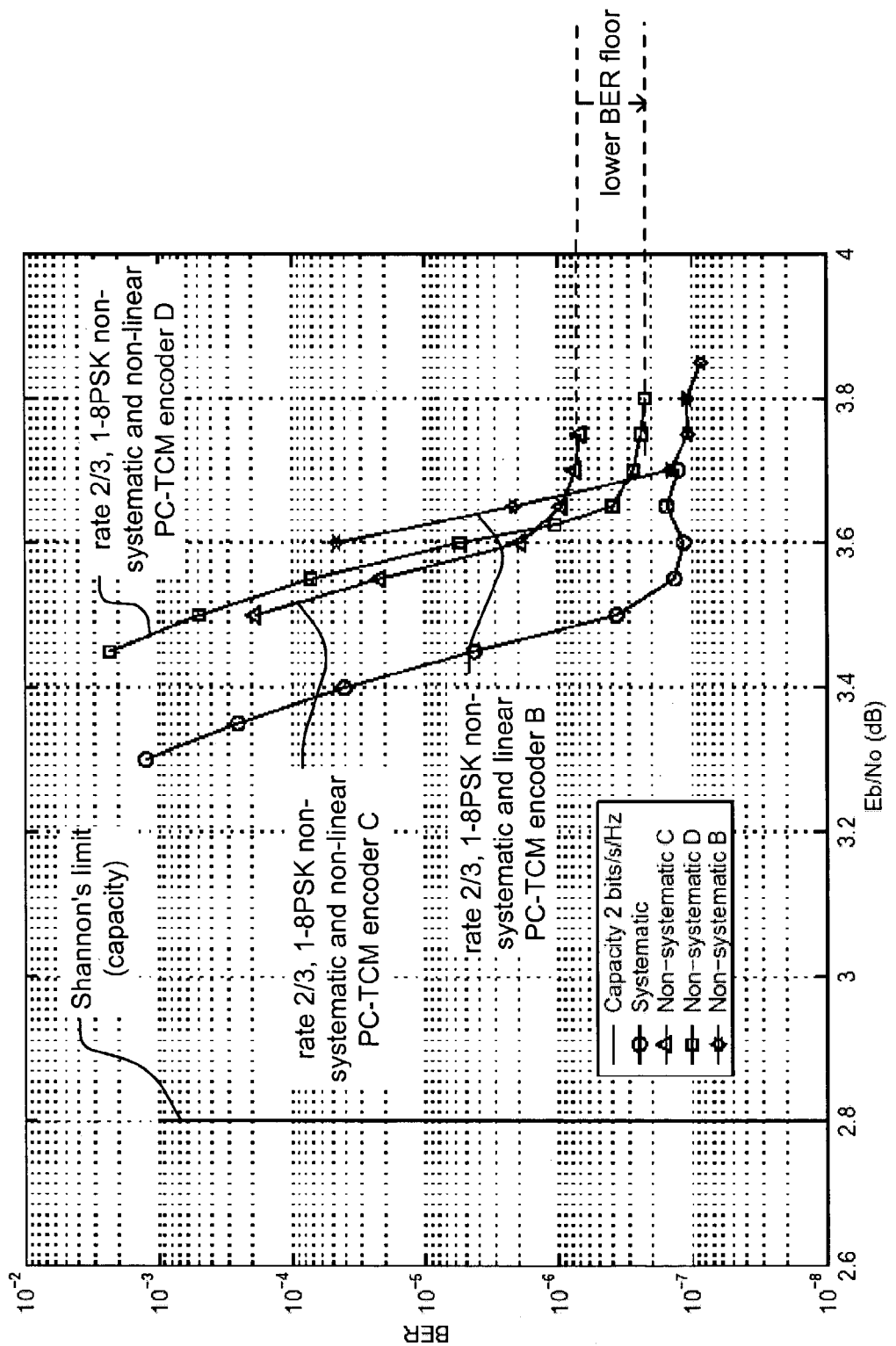
FIG. 27 is a diagram that compares the performance of some of the other various rate 2/3 encoder embodiments that may be built according to the invention.

FIG. 27 is a diagram that compares the performance of some of the other various rate 2/3 encoder embodiments that may be built according to the invention. When comparing the performance of the rate 2/3 non-systematic and non-linear PC-TCM (built using the encoder D as the constituent encoders) to the rate 2/3 non-systematic and non-linear PC-TCM (built using the encoder B as the constituent encoders) and the rate 2/3 non-systematic and non-linear PC-TCM (built using the encoder C as the constituent encoders), it can be seen that the performance of the rate 2/3 non-systematic and non-linear PC-TCM (built using the encoder D as the constituent encoders) is between the performance of the other two encoders shown.

That is to say, the rate 2/3 non-systematic and non-linear PC-TCM (built using the encoder D as the constituent encoders) provides a lower (or better) BER floor when compared to the rate 2/3 non-systematic and non-linear PC-TCM (built using the encoder C as the constituent encoders) although it suffers from a slight degradation of the waterfall part of the BER curve when compared to the rate 2/3 non-systematic and non-linear PC-TCM (built using the encoder C as the constituent encoders). This rate 2/3 non-systematic and non-linear PC-TCM (built using the encoder D as the constituent encoders) represents a relatively close performing encoder to that of the systematic and linear PC-TCM described above.

Figure 28:
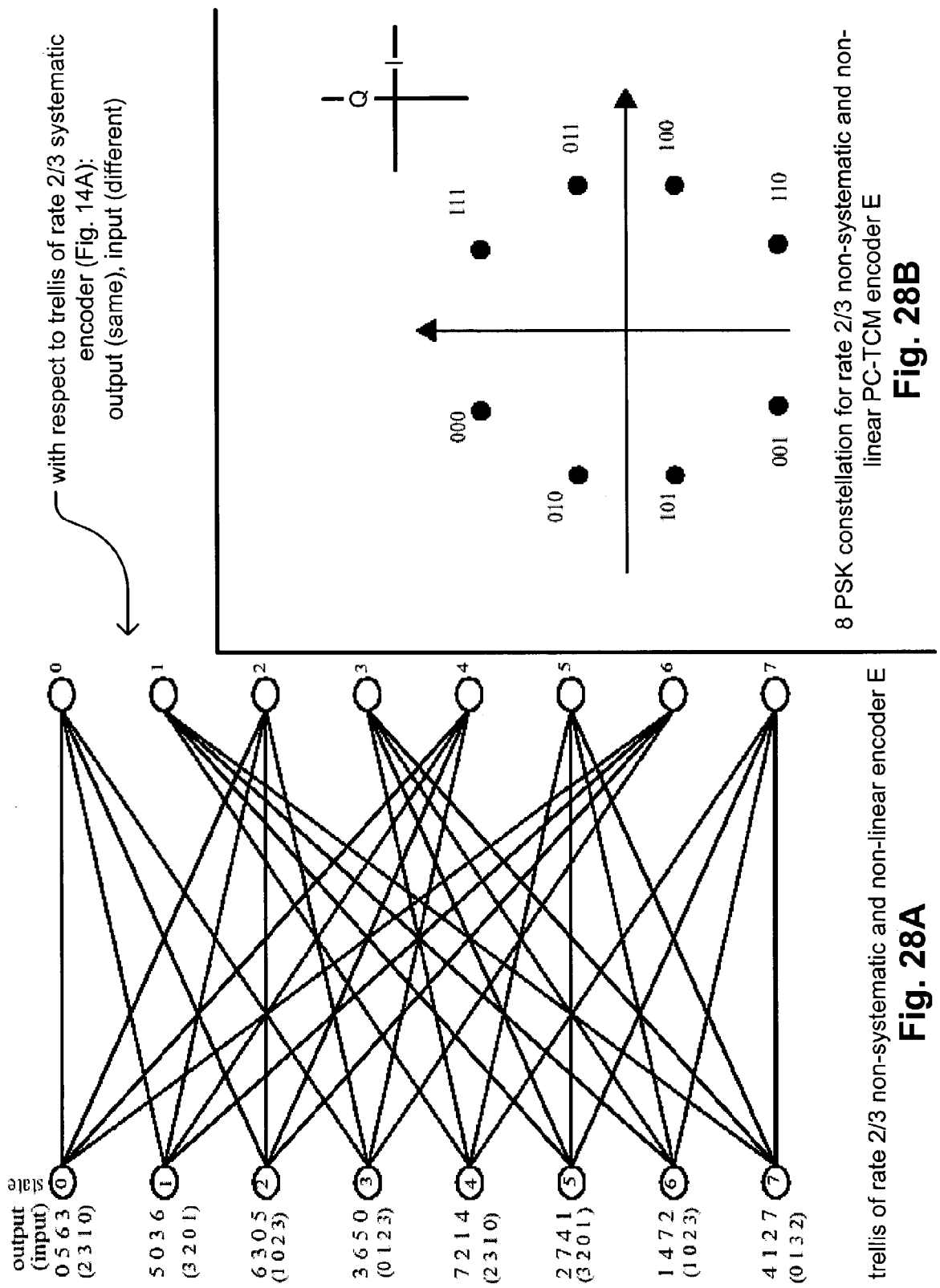
FIG. 28A is a diagram illustrating an embodiment of a trellis of the rate 2/3 non-systematic and non-linear encoder E that is built according to the invention.
FIG. 28B is a diagram illustrating an embodiment of an 8 PSK constellation for the rate 2/3 non-systematic and non-linear PC-TCM (built using the encoder E as the constituent encoders) that is built according to the invention.

FIG. 28A is a diagram illustrating an embodiment of a trellis of the rate 2/3 non-systematic and non-linear encoder E that is built according to the invention. By using the same output distributions of the encoders B and C, another encoder, referred to as encoder E, may be made that is also a non-systematic and non-linear trellis encoder. When comparing this trellis to the trellis described within the FIG. 14A, it is noted that the output distribution is the same, but that the input distribution is different.

FIG. 28B is a diagram illustrating an embodiment of an 8 PSK constellation for the rate 2/3 non-systematic and non-linear PC-TCM (built using the encoder E as the constituent encoders) that is built according to the invention. Once again, similar to the other embodiments described above, using the encoder E as the constituent encoders when building a rate 2/3 non-systematic and non-linear PC-TCM encoder, the constellation mapping providing the lowest BER is selected after trying several of the possible constellation mappings. Again, the symbol mapping assignments are shown next to the corresponding constellation point.

Figure 29:
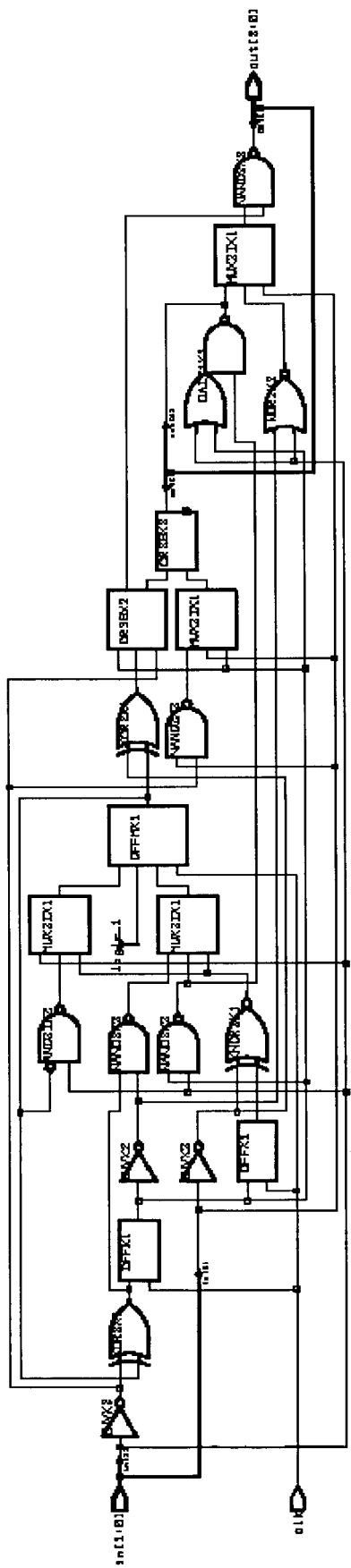
FIG. 29 is a diagram illustrating a possible embodiment (shown as a circuit) of a rate 2/3 non-systematic and non-linear encoder E that is built according to the invention.

FIG. 29 is a diagram illustrating a possible embodiment (shown as a circuit) of a rate 2/3 non-systematic and non-linear encoder E that is built according to the invention. This circuitry is constructed using the trellis of the rate 2/3 non-systematic and non-linear encoder E described above. Again, as with the other encoder embodiments described above, the trellis of the rate 2/3 non-systematic and non-linear encoder E described above shows its non-systematic nature, and this circuitry implementation of the rate 2/3 non-systematic and non-linear encoder E show its non-systematic nature even more apparently.

Figure 30:
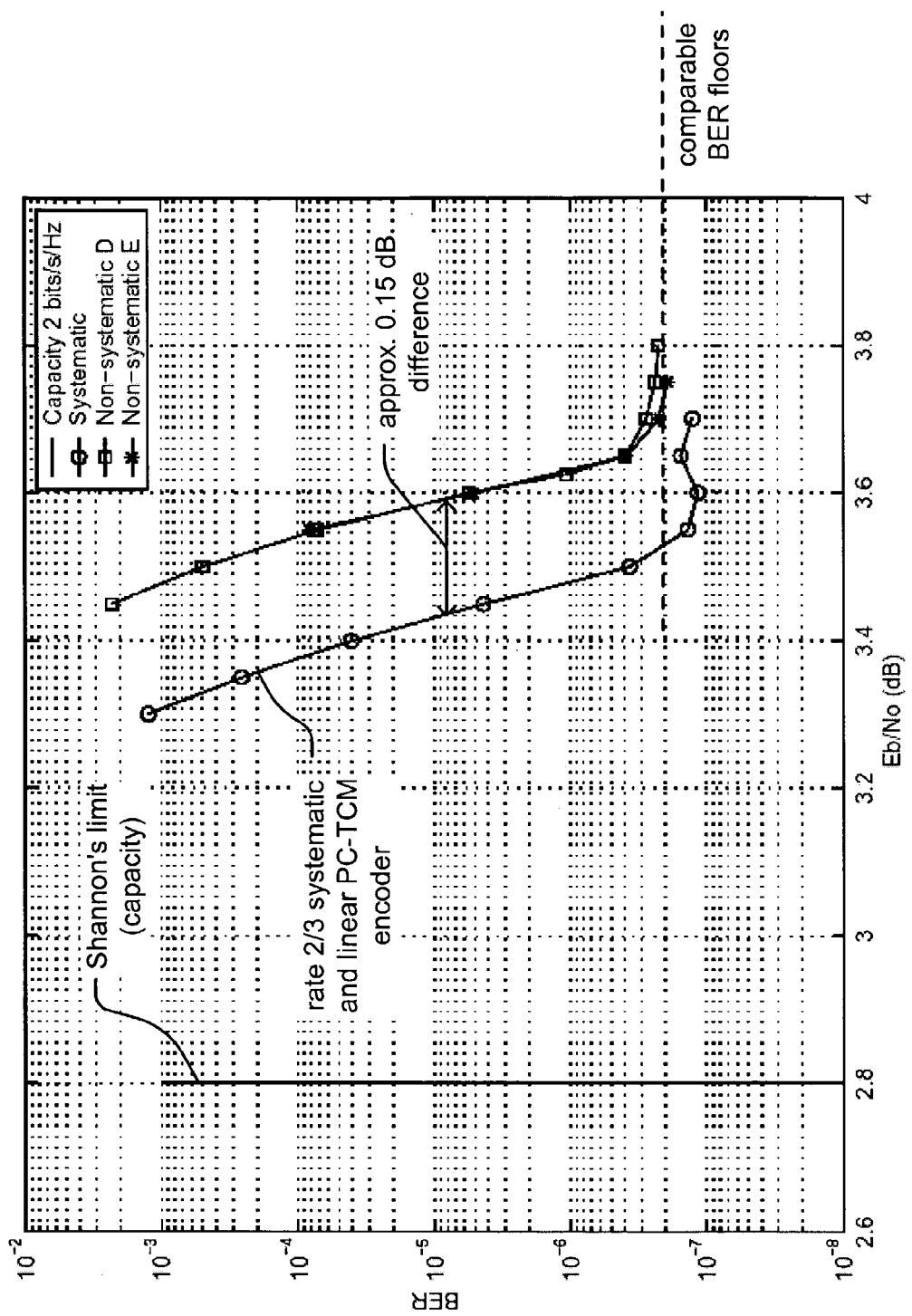
FIG. 30 is a diagram that compares the performance of some of the other various rate 2/3 encoder embodiments that may be built according to the invention.

FIG. 30 is a diagram that compares the performance of some of the other various rate 2/3 encoder embodiments that may be built according to the invention. As can be seen by the BER curves in this diagram when comparing the rate 2/3 non-systematic and non-linear PC-TCM (built using the encoder E as the constituent encoders) with the rate 2/3 non-systematic and non-linear PC-TCM (built using the encoder D as the constituent encoders), it can be seen that their performance is very comparable.

It has been shown that a non-systematic and non-linear PC-TCM encoder (built using the encoder D or the encoder E as the constituent encoders) has a relatively similar BER floor to that of a systematic and linear PC-TCM encoder while only suffering degradation in the waterfall part of the BER curve of approximately 0.15 dB.

While many of the various PC-TCM encoders described above have been rate 2/3 encoders, it is again noted that the design approach of the invention may also be applied to other rate PC-TCM encoders including higher rate PC-TCM encoders. Several possible embodiments that may be designed according to the invention are described in more detail below.

Specifically, non-systematic and non-linear PC-TCM encoders having code rates 3/4, 5/6 and 8/9 are presented. Within these various embodiments, all the constituent encoders of these PC-TCM encoders are constructed using the rate 2/3 non-systematic and non-linear trellis encoders described in the previous sections. More specifically, the encoder D (being of rate 2/3) is employed as a portion of the constituent encoders that are constructed to support these higher code rates. That is to say, the encoder D is employed as a component in constructing the various constituent encoders that are then employed to build these higher rate non-systematic and non-linear PC-TCM encoders. Clearly, although the encoder D is employed, other of the various encoder presented above could alternatively be used as building blocks in making constituent encoders for use in building non-systematic and non-linear PC-TCM encoder as well without departing from the scope and spirit of the invention. In general, it is possible to apply any of the other rate 2/3 encoders to build higher rate PC-TCM encoders.

Figures 31A, 31B, 31C:
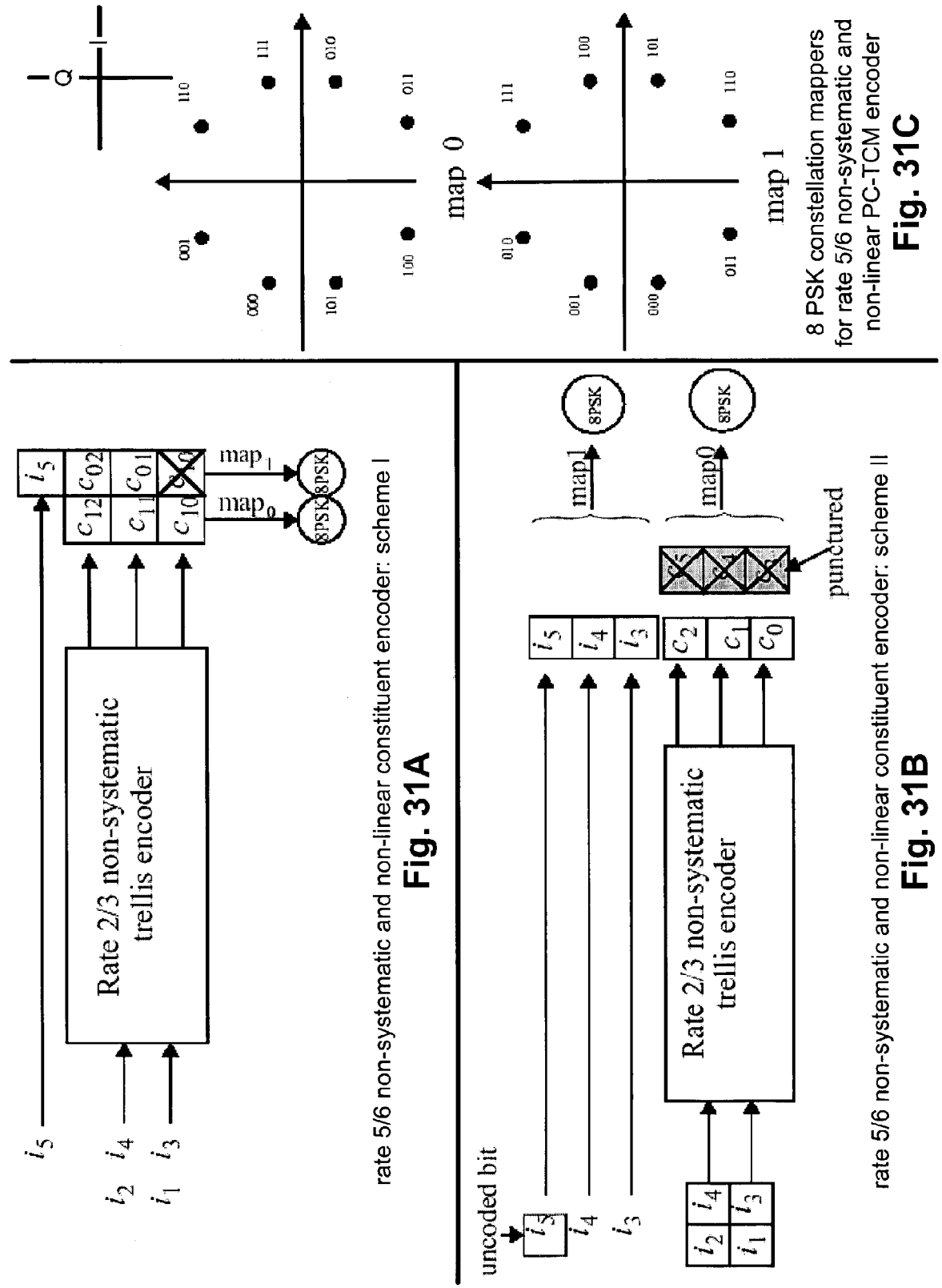
FIG. 31A is a diagram illustrating an embodiment of a rate 5/6 non-systematic and non-linear constituent encoder (designed using scheme I) that may be used as the constituent encoders of a rate 5/6 non-systematic and non-linear PC-TCM encoder is built according to the invention.
FIG. 31B is a diagram illustrating an embodiment of a rate 5/6 non-systematic and non-linear constituent encoder (designed using scheme II) that may be used as the constituent encoders of a rate 5/6 non-systematic and non-linear PC-TCM encoder is built according to the invention.
FIG. 31C is a diagram illustrating an embodiment of 8 PSK constellation mappers for the rate 5/6 non-systematic and non-linear PC-TCM encoder (designed using scheme II) that is built according to the invention.

FIG. 31A is a diagram illustrating an embodiment of a rate 5/6 non-systematic and non-linear constituent encoder (designed using scheme I) that may be used as the constituent encoders of a rate 5/6 non-systematic and non-linear PC-TCM encoder is built according to the invention. This rate 5/6 non-systematic and non-linear constituent encoder is obtained by puncturing rate 2/3 non-systematic and non-linear trellis encoder.

At a minimum, there are at least two possible ways to construct punctured rate 5/6 encoder in accordance with invention. Two of these possible embodiments are illustrated within the FIG. 31A and the FIG. 31B.

Referring to the FIG. 31A, one uncoded input bit, $i_5$, is employed that is not provided to the rate 2/3 non-systematic trellis encoder, and two other sets of input bits, $i_4, i_3$ and $i_2, i_1$, are provided sequentially to the rate 2/3 non-systematic trellis encoder to form the 6 output bits that are used to generate 2 separate 8 PSK symbols. Each of these symbols undergoes an individual corresponding mapping within an 8 PSK constellation (map 0 and map 1). In addition, last bit of the first group of output bits from the rate 2/3 non-systematic trellis encoder is punctured.

More specifically, the output bits $i_5, c_{02}, c_{01}$ form the first 8 PSK output symbol that is mapped according to map 1, and the output bits $c_{12}, c_{11}, c_{10}$ form the second 8 PSK output symbol that is mapped according to map 0. This design approach is referred to as scheme I.

FIG. 31B is a diagram illustrating an embodiment of a rate 5/6 non-systematic and non-linear constituent encoder (designed using scheme II) that may be used as the constituent encoders of a rate 5/6 non-systematic and non-linear PC-TCM encoder is built according to the invention.

Referring to the FIG. 31B, two input bits, $i_4, i_3$, are employed that are provided to the rate 2/3 non-systematic trellis encoder, and two other sets of input bits, $i_4, i_3$ and $i_2, i_1$ are also provided sequentially to the rate 2/3 non-systematic trellis encoder to form the 9 output bits that are used to generate 2 separate 8 PSK symbols. In addition, one uncoded bit, $i_5$, is used to form the 2 separate 8 PSK symbols. Although the two input bits, $i_4,i_3$, are provided to the rate 2/3 non-systematic trellis encoder, the encoded bits output there from ($C_5$, $C_4$, $C_3$) that correspond to the two input bits, $i_4,i_3$, are punctured. However, because the rate 2/3 non-systematic trellis encoder has memory, the two input bits, $i_4,i_3$, are protected and induce some redundancy within the next few encoded bit outputs (starting with $c_2,c_1,c_0$). Again, each of these output symbols shown undergoes an individual corresponding mapping within an 8 PSK constellation (map 0 and map 1).

This design approach employs puncturing of all of the first 3 bits of output of rate 2/3 non-systematic trellis encoder. These punctured bits are all replaced with the input bits, $i_4,i_3$, and the one uncoded bit, $i_5$.

More specifically, the output bits $i_5,i_4,i_3$ form the first 8 PSK output symbol that is mapped according to map 1, and the output bits $c_2,c_1,c_0$ form the second 8 PSK output symbol that is mapped according to map 0. This design approach is referred to as scheme II.

When comparing the rate 5/6 non-systematic and non-linear PC-TCM encoders (built using the encoders designed according to the scheme I and the scheme II as the constituent encoders), it is found that the rate 5/6 non-systematic and non-linear PC-TCM (built using the scheme I encoder as the constituent encoders) provides for better performance. It is also noted that encoder D is used as the rate 2/3 non-systematic trellis encoder within the constituent encoder designs designed according to the scheme I and the scheme II.

The non-systematic nature of the rate 5/6 non-systematic and non-linear PC-TCM (built using the scheme I encoder as the constituent encoders) may be verified as follows: according to the trellis of encoder D and also according to scheme II, the output $i_5,i_4,i_3,c_2,c_1,c_0$=001010 corresponds to at least two different inputs. One of the inputs is $i_5,i_4,i_3,i_2,i_1$=00100 when the starting state is 0 (0=000 binary), and the other input is $i_5,i_4,i_3,i_2,i_1$=00110 when the starting state is 1 (1=001 binary). Therefore, by criterion 2, it is verified that the rate 5/6 non-systematic and non-linear PC-TCM encoder (built using the scheme II encoder as the constituent encoders) is in fact non-systematic.

FIG. 31C is a diagram illustrating an embodiment of 8 PSK constellation mappers for the rate 5/6 non-systematic and non-linear PC-TCM encoder (designed using scheme II) that is built according to the invention. Once again, similar to the other embodiments described above, the 2 separate 8 PSK constellation mappings providing the lowest BERs are selected after trying several of the possible constellation mappings. Again, the symbol mapping assignments are shown next to the corresponding constellation point for each of the 8 PSK constellation maps (map 1 and map 0).

Figure 32:
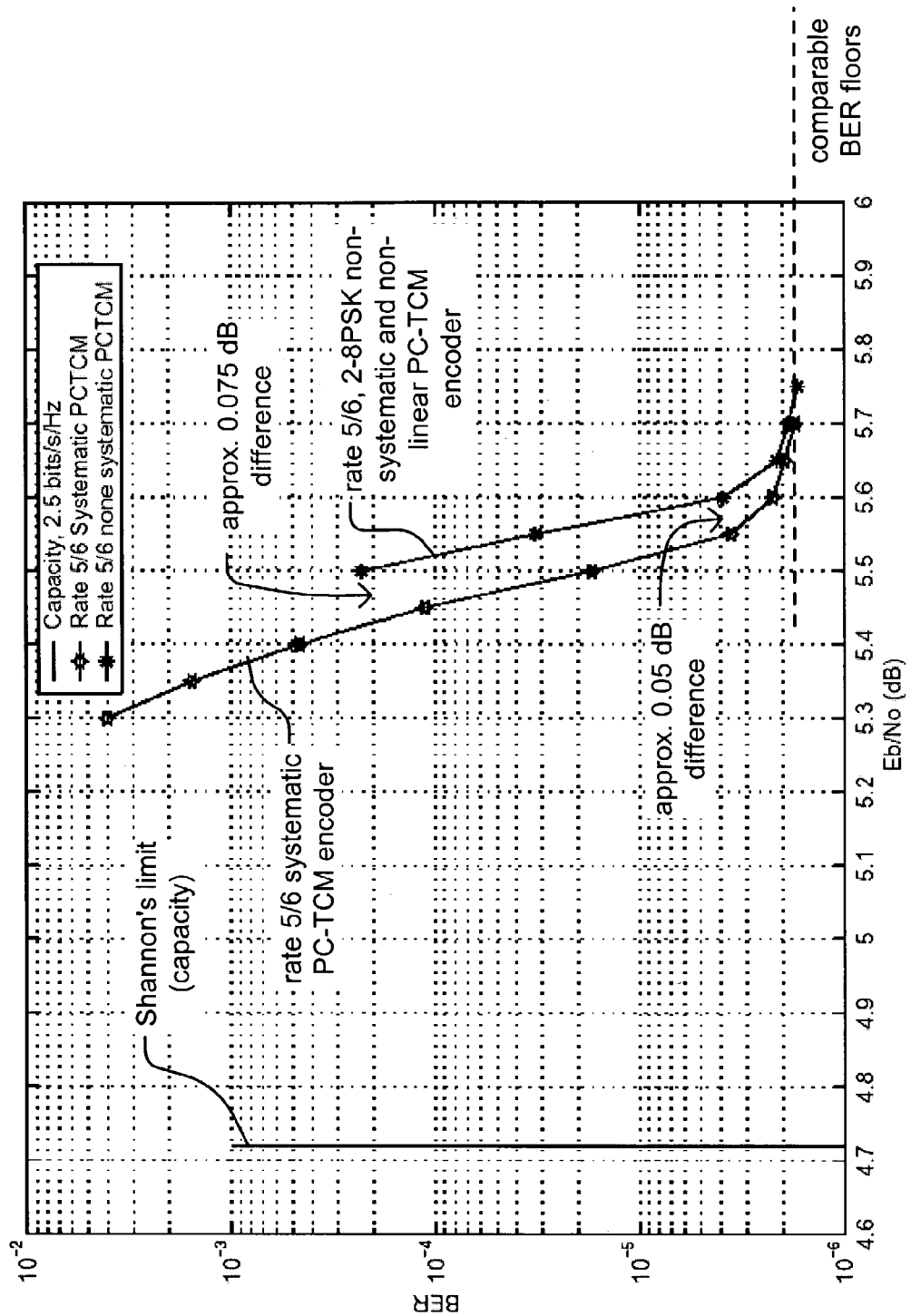
FIG. 32 is a diagram that compares the performance of some of the various rate 5/6 encoder embodiments that may be built according to the invention.

FIG. 32 is a diagram that compares the performance of some of the various rate 5/6 encoder embodiments that may be built according to the invention. Using the two 8 PSK constellation mappings (map 1 and map 0) shown in the FIG. 31C, the performance of a rate 5/6 non-systematic and non-linear PC-TCM encoder is compared to that of a rate 5/6 systematic and linear PC-TCM encoder. The rate 5/6 non-systematic and non-linear PC-TCM encoder is shown to suffer degradation in the waterfall part of the BER curve of approximately 0.05 dB. More specifically, the performance of the rate 5/6 non-systematic and non-linear PC-TCM encoder (scheme I) reaches approximately to within 0.05 dB in terms of $E_b/N_o$ (or SNR) when supporting a BER of approximately $4\times10^{-6}$. Moreover, the performance of the rate 5/6 non-systematic and non-linear PC-TCM encoder reaches approximately to within 0.075 dB in terms of $E_b/N_o$ (or SNR) when supporting a BER of approximately $2\times10^{-4}$.

In contradistinction, if the rate 5/6 non-systematic and non-linear PC-TCM encoder (scheme II) is alternatively employed, then the performance loss could be more than 0.1 dB of degradation in the waterfall part of the BER curve.

Similar to the manner in which a rate 5/6 non-systematic and non-linear PC-TCM encoder may be designed, a rate 8/9 non-systematic and non-linear PC-TCM encoder may also be designed according to the invention. That is to say, like the rate 5/6 non-systematic and non-linear PC-TCM encoder may be built, rate 8/9 non-systematic and non-linear PC-TCM encoders may also be built by puncturing one of the rate 2/3 non-systematic encoders when building the constituent encoders that are employed to make the PC-TCM encoder. At a minimum, there are at least two different schemes that may be employed to construct a rate 8/9 encoder that may be used as the constituent encoders to build a rate 8/9 non-systematic and non-linear PC-TCM encoder according to the invention.

Figure 33A:
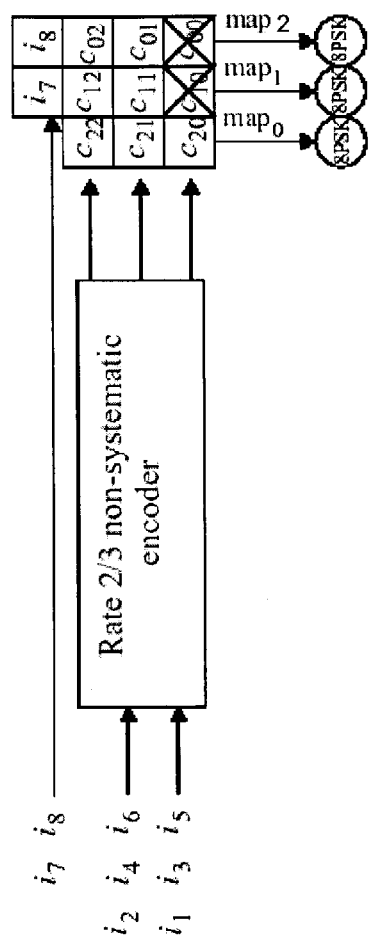
FIG. 33A is a diagram illustrating an embodiment of a rate 8/9 non-systematic constituent encoder (designed using scheme III) that may be used as the constituent encoders of a rate 8/9 non-systematic and non-linear PC-TCM encoder is built according to the invention.

FIG. 33A is a diagram illustrating an embodiment of a rate 8/9 non-systematic constituent encoder (designed using scheme III) that may be used as the constituent encoders of a rate 8/9 non-systematic and non-linear PC-TCM encoder is built according to the invention. The design approach shown in this diagram, scheme III, is an extension of the scheme I design approach of the rate 5/6 non-systematic constituent encoder described above.

Referring to the FIG. 33A, two uncoded input bits, $i_7$, $i_8$, are employed that are not provided to the rate 2/3 non-systematic trellis encoder, and three other sets of input bits, $i_6$, $i_5$, $i_4$, $i_3$, and $i_2$, $i_1$, are provided sequentially to the rate 2/3 non-systematic trellis encoder to form the 9 output bits that are used to generate 3 separate 8 PSK symbols. Each of these symbols undergoes an individual corresponding mapping within an 8 PSK constellation (map 0, map 1, and map 2). Similar to the approach of the scheme I, the last bit of the first and second output groups of bits from the rate 2/3 non-systematic trellis encoder are punctured.

More specifically, the output bits $i_8$, $c_{02}$, $c_{01}$ form the first 8 PSK output symbol that is mapped according to map 2, the output bits $i_7$, $c_{12}$, $c_{11}$ form the second 8 PSK output symbol that is mapped according to map 1, and the output bits $c_{22}$, $c_{21}$, $c_{20}$ form the third 8 PSK output symbol that is mapped according to map 0. Again, this design approach is referred to as scheme III.

Figure 33B:
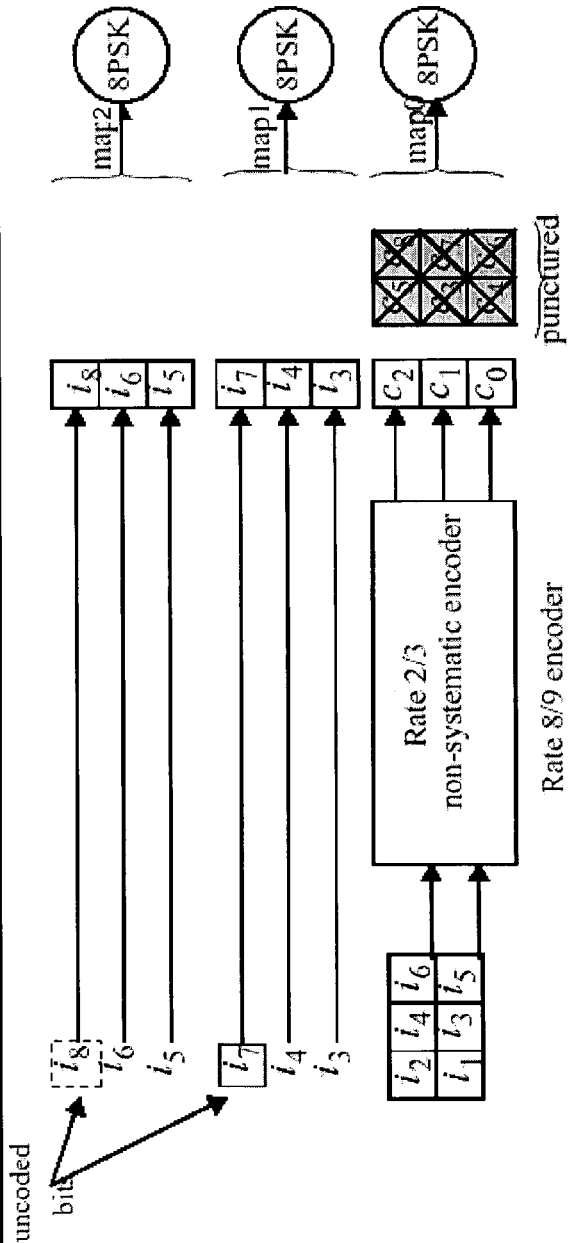
FIG. 33B is a diagram illustrating an embodiment of a rate 8/9 non-systematic constituent encoder (designed using scheme IV) that may be used as the constituent encoders of a rate 8/9 non-systematic and non-linear PC-TCM encoder is built according to the invention.

FIG. 33B is a diagram illustrating an embodiment of a rate 8/9 non-systematic constituent encoder (designed using scheme IV) that may be used as the constituent encoders of a rate 8/9 non-systematic and non-linear PC-TCM encoder is built according to the invention. This rate 8/9 non-systematic constituent encoder is built based on extending the approach shown with respect to the approach of the rate 5/6 non-systematic constituent encoder described above.

Referring to the FIG. 33B, there are two uncoded input bits, $i_7$, $i_8$, that are not provided to the rate 2/3 non-systematic trellis encoder, and there are three sets of input bits, $i_6,i_5$, $i_4,i_3$, and $i_2$, $i_1$, are provided sequentially to the rate 2/3 non-systematic trellis encoder to form the 9 output bits that are used to generate 2 separate 8 PSK symbols. In addition, the two uncoded input bits, $i_7$, $i_8$, are used to form the 3 separate 8 PSK symbols. Although the two sets of input bits, $i_6$, $i_5$ and $i_4$, $i_3$, are provided to the rate 2/3 non-systematic trellis encoder, the sets of encoded bits output there from ($c_8$, $c_7$, $c_6$ and $c_5$, $c_4$, $c_3$) that correspond to the two sets of input bits, $i_6$, $i_5$ and $i_4$, $i_3$, are punctured. However, because the rate 2/3 non-systematic trellis encoder has memory, the two sets of input bits, $i_6$, $i_5$ and $i_4$, $i_3$, are protected and induce some redundancy within the next few encoded bit outputs (starting with $c_2$, $c_1$, $c_0$). Again, each of these output symbols shown undergoes an individual corresponding mapping within an 8 PSK constellation (map 0, map 1, and map 2).

Similar to the design approach of the scheme II, this scheme IV design approach employs puncturing of all of the first 3 output bits of the rate 2/3 non-systematic trellis encoder for the first and second groups of output bits there from.

More specifically, the output bits $i_8$, $i_6$, $i_5$ form the first 8 PSK output symbol that is mapped according to map 2, the output bits $i_7$, $i_4$, $i_3$ form the second 8 PSK output symbol that is mapped according to map 1, and the output bits $c_2$,$c_1$,$c_0$ form the third 8 PSK output symbol that is mapped according to map 0. Again, this design approach is referred to as scheme IV.

When performing simulations comparing the rate 8/9 non-systematic encoders designed according to scheme III and scheme IV, it is found that the scheme IV rate 8/9 non-systematic encoder will provide for better performance when implemented within a rate 8/9 non-systematic and non-linear PC-TCM encoder. The scheme IV approach is better in performance at least when the rate 2/3 non-systematic trellis encoder is encoder D.

The non-systematic nature of the rate 5/6 non-systematic and non-linear PC-TCM (built using the scheme I encoder as the constituent encoders) may be verified as follows: according to the trellis of encoder D and also according to scheme IV, the outputs $i_8$, $i_6$, $i_5$, $i_7$, $i_4$, $i_3$, $c_2$, $c_1$, $c_0$=111100010 corresponds to at least two different inputs. One of the inputs is $i_8$, $i_7$, $i_5$, $i_4$, $i_3$, $i_2$, $i_1$=11110010 when the starting state is 0 (0=000 binary), and the other input is $i_8$, $i_7$, $i_5$, $i_4$, $i_3$, $i_2$, $i_1$=11110000 when the starting state is 4 (4=100 binary). Therefore, by criterion 2, it is verified that the rate 8/9 non-systematic and non-linear PC-TCM encoder (built using the scheme IV encoder as the constituent encoders) is in fact non-systematic.

Figure 34:
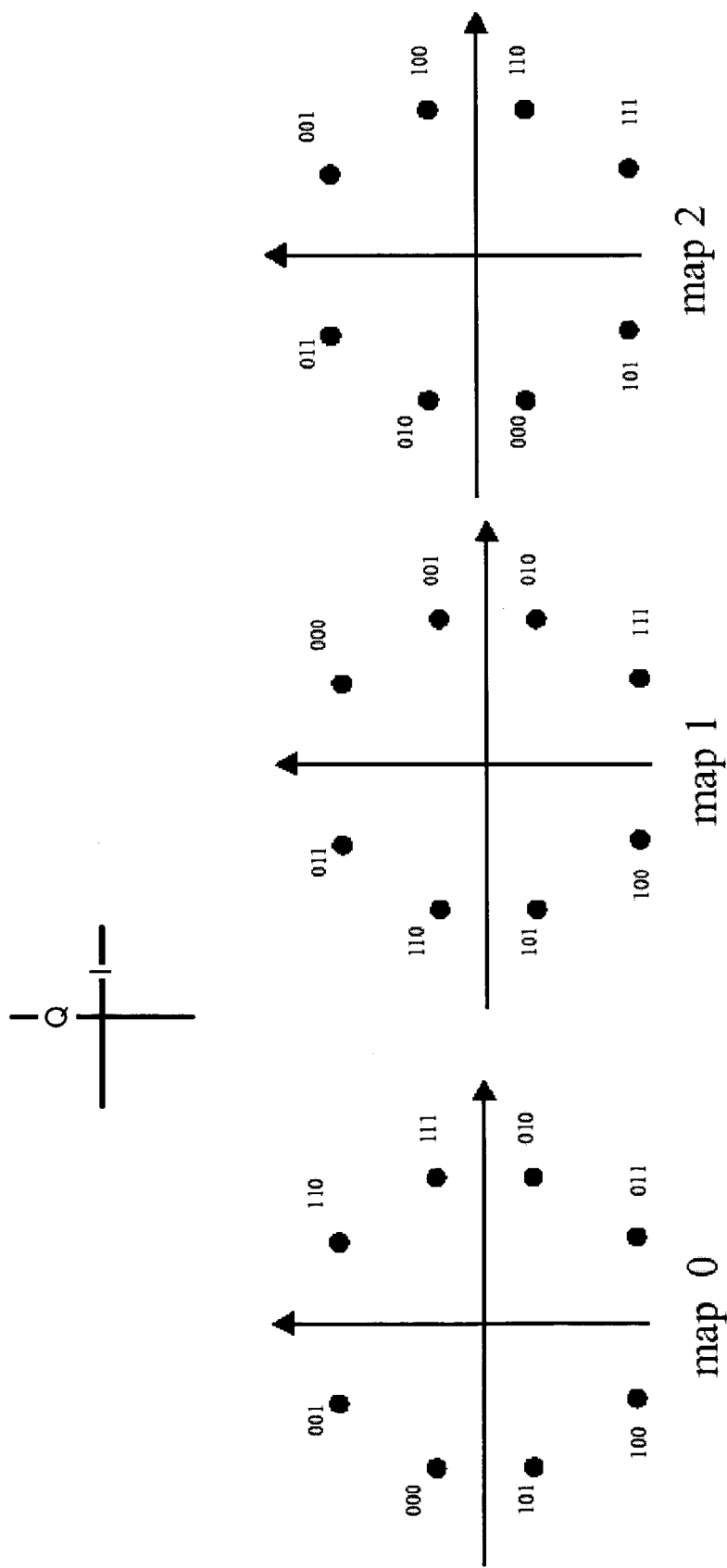
FIG. 34 is a diagram illustrating an embodiment of 8 PSK constellation mappers for the rate 8/9 non-systematic and non-linear PC-TCM encoder (designed using scheme IV) that is built according to the invention.

FIG. 34 is a diagram illustrating an embodiment of 8 PSK constellation mappers for the rate 8/9 non-systematic and non-linear PC-TCM encoder (designed using scheme IV) that is built according to the invention.

Once again, similar to the other embodiments described above, the 3 separate 8 PSK constellation mappings providing the lowest BERs are selected after trying several of the possible constellation mappings. Again, the symbol mapping assignments are shown next to the corresponding constellation point for each of the 8 PSK constellation maps (map 2, map 1, and map 0).

Figure 35:
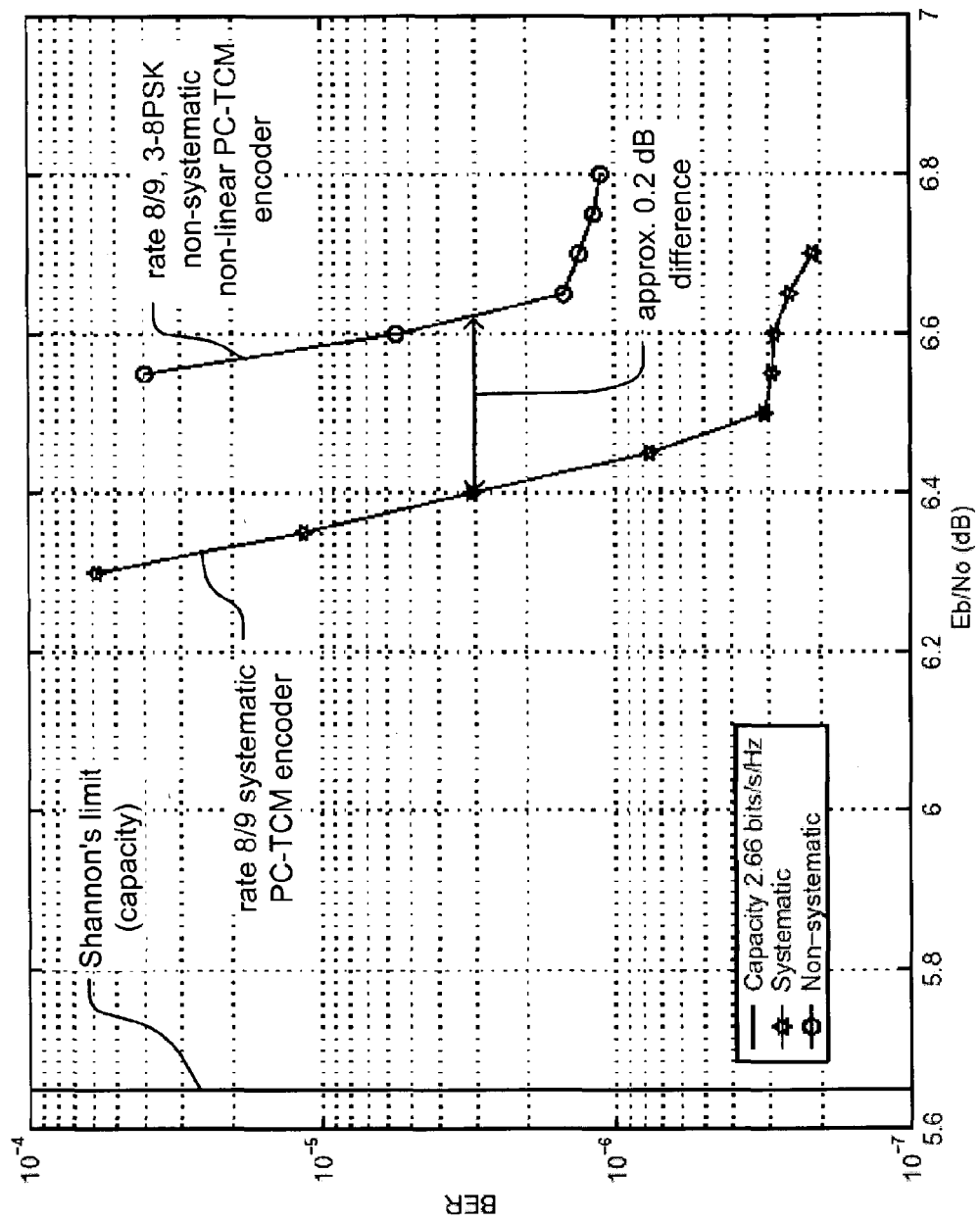
FIG. 35 is a diagram that compares the performance of some of the various rate 8/9 encoder embodiments that may be built according to the invention.

FIG. 35 is a diagram that compares the performance of some of the various rate 8/9 encoder embodiments that may be built according to the invention. Using the three 8 PSK constellation mappings (map 2, map 1 and map 0) shown in the FIG. 34, the performance of a rate 8/9 non-systematic and non-linear PC-TCM encoder is compared to that of a rate 8/9 systematic and linear PC-TCM encoder. The rate 8/9 non-systematic and non-linear PC-TCM encoder is shown to suffer degradation in the waterfall part of the BER curve of only approximately 0.2 dB compared to that of the rate 8/9 systematic and linear PC-TCM encoder.

Figures 36A, 36B:
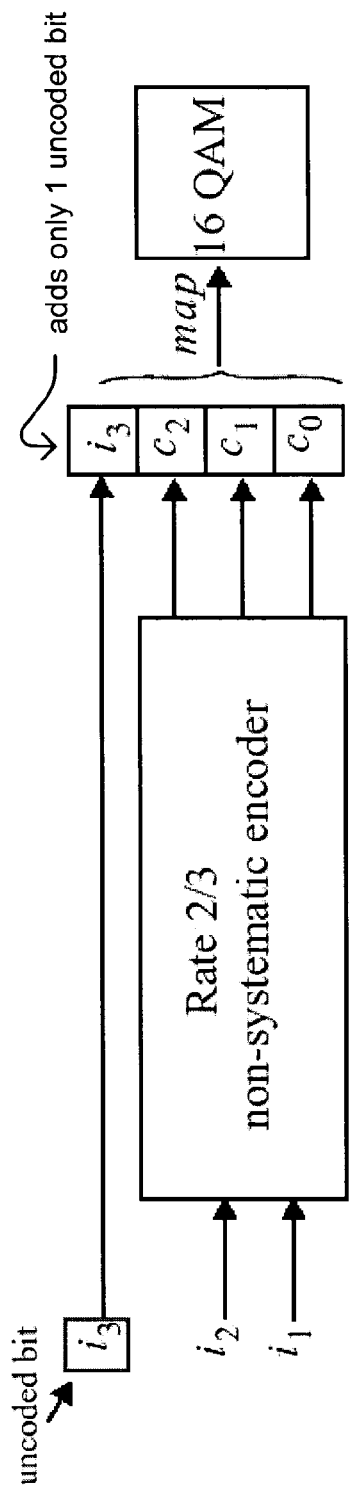
FIG. 36A is a diagram illustrating an embodiment of a rate 3/4 non-systematic constituent encoder that may be used as the constituent encoders of a rate 3/4 non-systematic and non-linear PC-TCM encoder is built according to the invention.
FIG. 36B is a diagram illustrating an embodiment of a 16 QAM (16 Quadrature Amplitude Modulation) constellation mapper for the rate 3/4 non-systematic and non-linear PC-TCM encoder that is built according to the invention.

FIG. 36A is a diagram illustrating an embodiment of a rate 3/4 non-systematic constituent encoder that may be used as the constituent encoders of a rate 3/4 non-systematic and non-linear PC-TCM encoder is built according to the invention. This rate 3/4 non-systematic encoder may be built by adding one uncoded bit, $i_3$, to the output of one of the rate 2/3 non-systematic encoder describe above. In doing so, the rate 3/4 non-systematic encoder depicted in this diagram may be achieved. The input bits include 3 separate bits, $i_3$, $i_2$, $i_1$, where one of them is an uncoded bit, namely, $i_3$. Clearly, when the encoder D is taken as the rate 2/3 non-systematic encoder when building this rate 3/4 non-systematic constituent encoder, the corresponding rate 3/4 non-systematic constituent encoder is also non-systematic. A rate 3/4 non-systematic and non-linear PC-TCM encoder may then be constructed using the rate 3/4 non-systematic constituent encoder as the constituent encoders.

FIG. 36B is a diagram illustrating an embodiment of a 16 QAM (16 Quadrature Amplitude Modulation) constellation mapper for the rate 3/4 non-systematic and non-linear PC-TCM encoder that is built according to the invention. Once again, similar to the other embodiments described above, a 16 QAM constellation mapping providing the lowest BER is selected after trying several of the possible constellation mappings. Again, the symbol mapping assignments are shown next to the corresponding constellation point for each of the constellation points within the 16 QAM constellation mapping.

Figure 37:
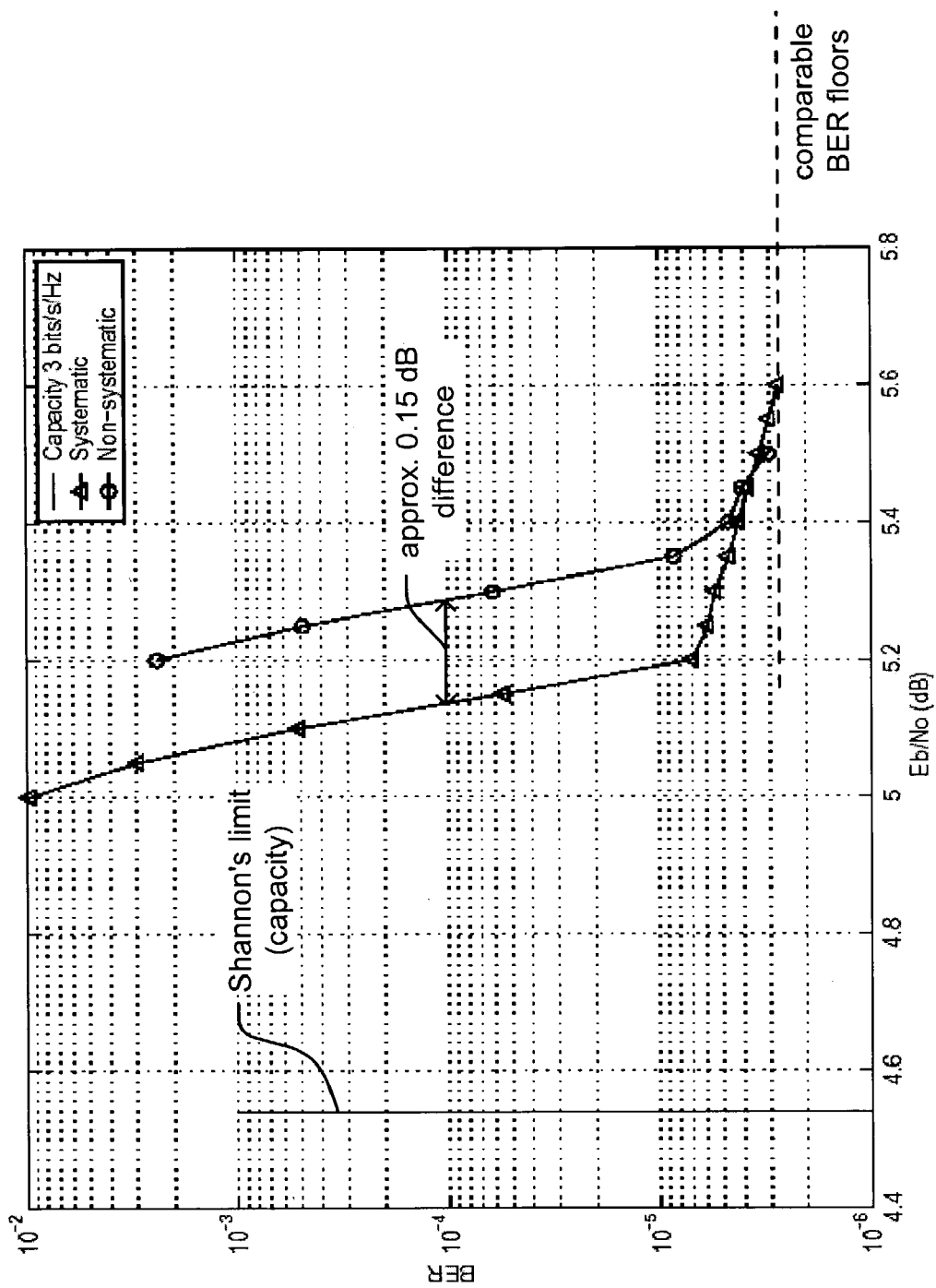
FIG. 37 is a diagram that compares the performance of one of the rate 3/4 encoder embodiments that may be built according to the invention.

FIG. 37 is a diagram that compares the performance of one of the rate 3/4 encoder embodiments that may be built according to the invention. Using the 16 QAM constellation mapping shown in the FIG. 36B, the performance of a rate 3/4 non-systematic and non-linear PC-TCM encoder is compared to that of a rate 3/4 systematic and linear PC-TCM encoder. The rate 3/4 non-systematic and non-linear PC-TCM encoder is shown to suffer degradation in the waterfall part of the BER curve of only approximately 0.15 dB compared to that of the rate 3/4 systematic and linear PC-TCM encoder.

Figure 38:
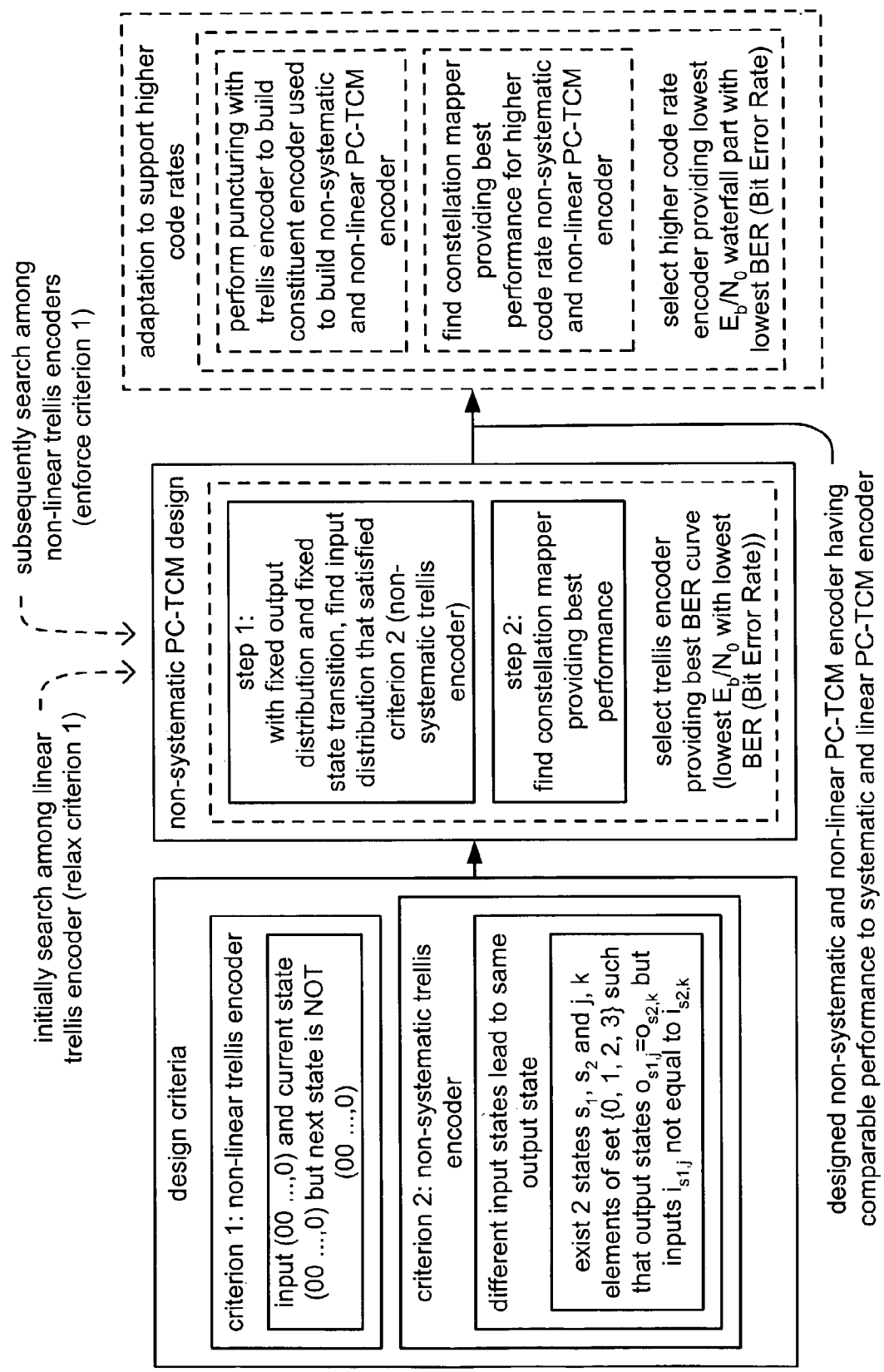
FIG. 38 is a diagram that illustrates an overview of the non-systematic and non-linear PC-TCM encoder design approach that is performed according to the invention.

FIG. 38 is a diagram that illustrates an overview of the non-systematic and non-linear PC-TCM encoder design approach that is performed according to the invention. To design a non-systematic and non-linear PC-TCM encoder that provides comparable performance to a systematic and linear PC-TCM encoder, there are two basic design criteria that must be met. The criterion 1 requires that a trellis encoder that is to be used as a constituent encoder in building a non-systematic and non-linear PC-TCM be a non-linear trellis encoder. The non-linearity requirement may be described as follows: if the current input is (00 . . . , 0) and current state is (00 . . . , 0), but the next state of a trellis encoder is not (00 . . . , 0), then the trellis encoder is non-linear. That is to say, if the current state of the encoder is 0, and the current input to the encoder is 0, and if the trellis undergoes a transition to a state that is NOT 0, then the trellis is non-linear.

The criterion 2 requires that the trellis encoder is a non-systematic encoder. This may be determined if there are at least two different input states that lead to the same output state in response to different inputs. The criterion 2 may be summarized as follows:

Criterion 2: If there exist two states $s_1$, $s_2$ and j,k∈{0,1, 2,3} such that $o_{s_1,j}$=$o_{s_2,k}$ but $i_{s_1,j}$≠$i_{s_2,k}$, then the trellis encoder is non-systematic.

As mentioned above, the design criterion 2 may also be summarized as follows: when there exist two output states that are the same, and yet if each of these output states may be reached when transitioning from different input states in response to different inputs, then the trellis encoder is non-systematic.

Using these design criteria (criterion 1 and criterion 2), the invention presents a code design approach that may be used for designing a high performance non-systematic PC-TCM. This design approach may be performed using the following two steps:

1. With a fixed output distribution and a fixed state transition, an input distribution is to find such that the design criterion 2 is satisfied.

2. A constellation mapper providing the lowest BER (Bit Error Rate) is then found.

After performing these steps in the non-systematic PC-TCM design approach, a trellis encoder having the performance curve with the lowest $E_b/N_o$ (or SNR) with the lowest BER floor (or the BER curve with the lowest waterfall part having the lowest BER) is selected from all of those possible trellis encoders that are found meeting the criteria and constraints described above.

As is also shown above in other embodiments, the searching for such a trellis encoder may be performed initially by relaxing the constraint of criterion 1 such that all types of trellis encoders may be included in the search (including both non-linear and linear trellis encoders. After some potential trellis encoders have been found, then the criterion 1 may be enforced more solidly so that only non-linear trellis encoders are included.

As also shown above in some of the other embodiments, a designed non-systematic and non-linear PC-TCM encoder may also be adapted to build an encoder that supports higher code rates. For example, puncturing may be performed with a designed trellis encoder when building a constituent encoder. This constituent encoder may then be used to build a non-systematic and non-linear PC-TCM encoder. After such a non-systematic and non-linear PC-TCM encoder is built, then a constellation mapper that provides the lowest BER is selected after trying several of the possible constellation mappings.

After such a non-systematic and non-linear PC-TCM encoder is built, and a best constellation mapping is found, then the higher code rate encoder is selected that provides the best performance in terms of providing the lowest $E_b/N_o$ (or SNR) with the lowest BER floor (or the BER curve with the lowest waterfall part having the lowest BER).

Figure 39:
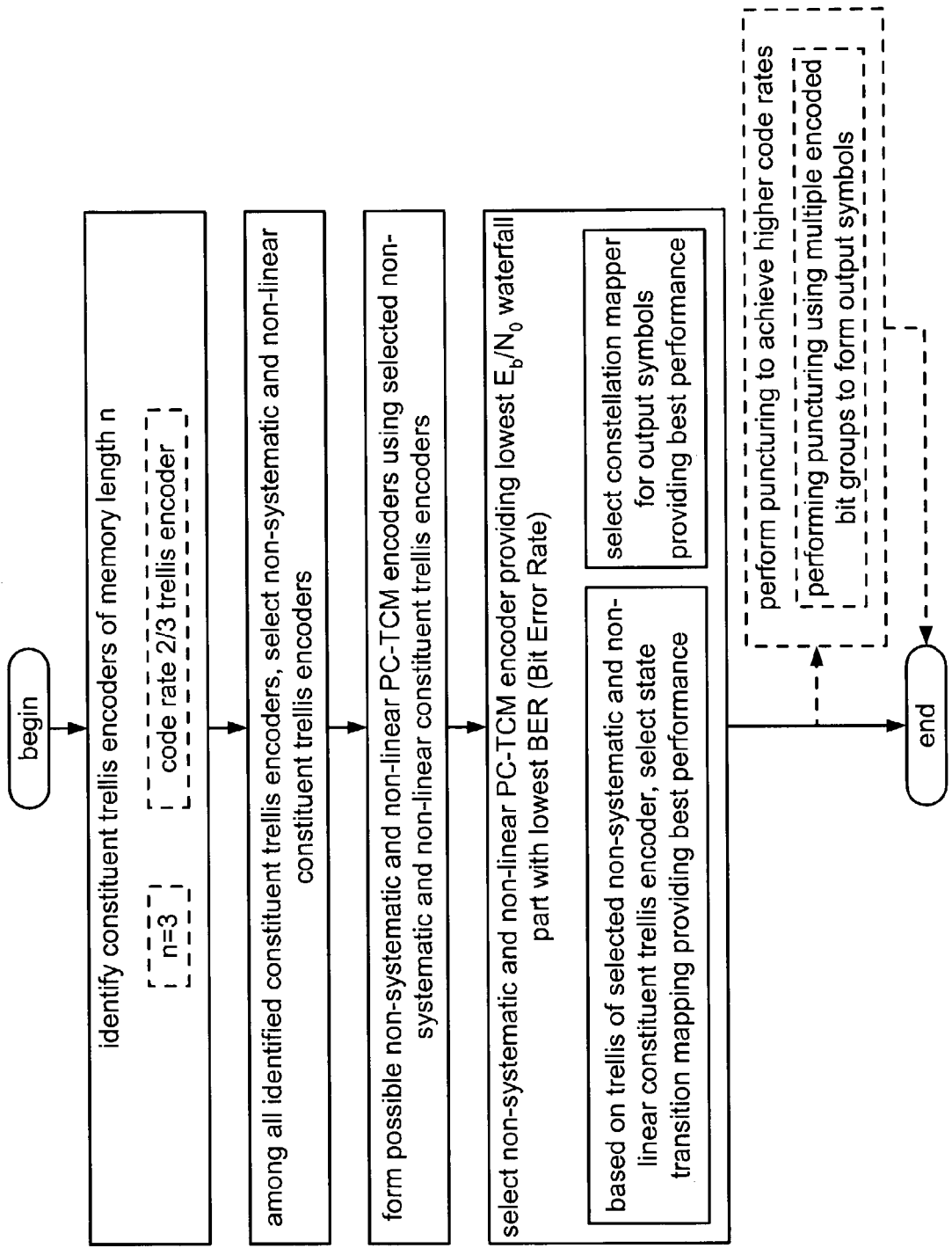
FIG. 39 and FIG. 40 are flowcharts illustrating embodiments of non-systematic and non-linear PC-TCM encoder design methods that are performed according to the invention.
Figure 40:
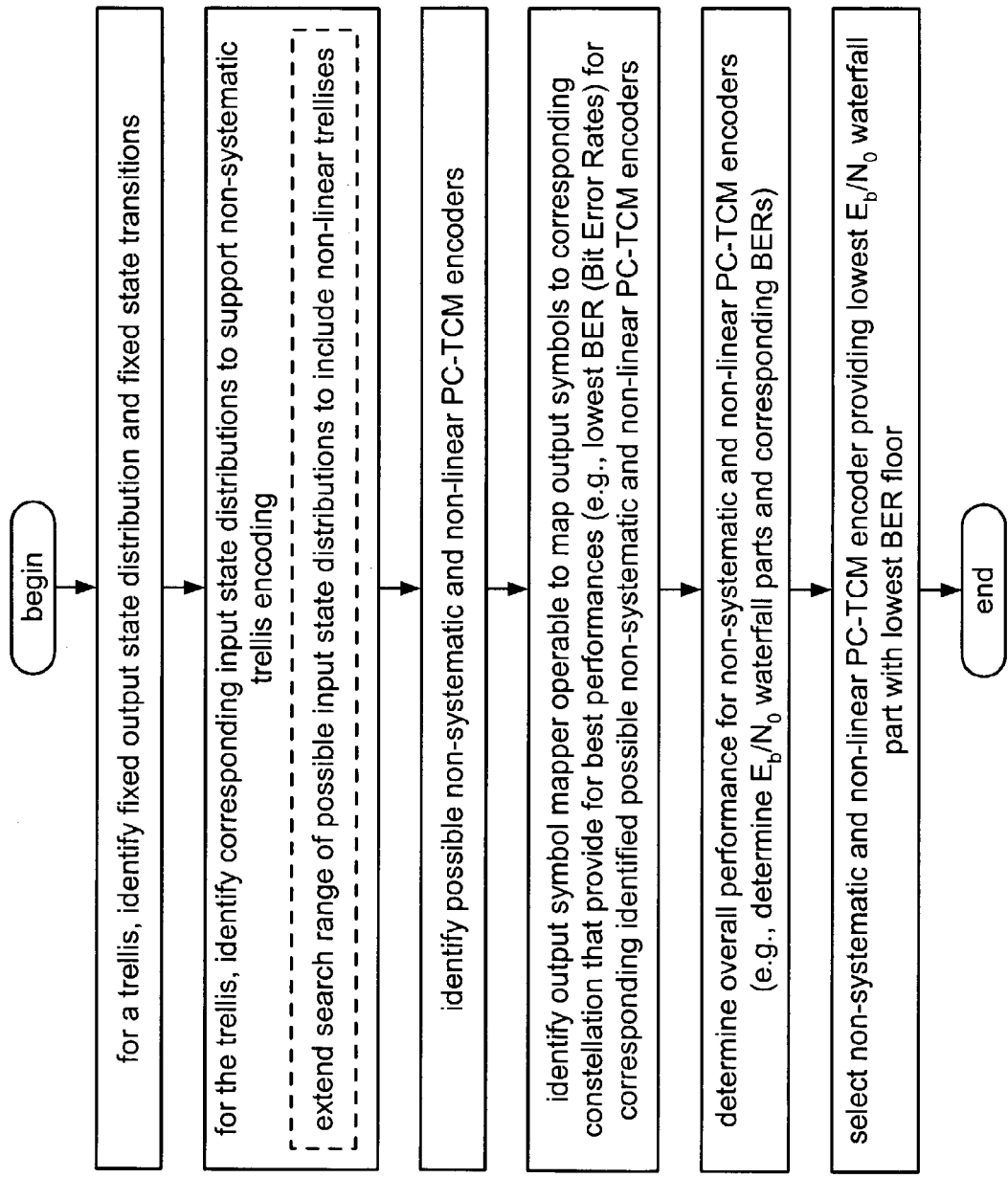

FIG. 39 and FIG. 40 are flowcharts illustrating embodiments of non-systematic and non-linear PC-TCM encoder design methods that are performed according to the invention.

Referring to the FIG. 39, the method of this embodiment begins by identifying all of the constituent trellis encoders having memory length n. In some embodiments, this memory length is 3 (or n=3). In addition, the constituent trellis encoders may be limited to those that are constructed using rate 2/3 trellis encoders. Many such example embodiments are described throughout the specification including rate 2/3 encoders as well as higher rate encoders that employ rate 2/3 trellis encoders as one or more components contained therein.

After all of these possible constituent trellis encoders have been identified, the non-systematic and non-linear constituent trellis encoders are selected to form a sub-set group. Using this sub-set group of these non-systematic and non-linear constituent trellis encoders, the method involves forming a number of possible non-systematic and non-linear PC-TCM encoders.

Then, the method involves selecting the non-systematic and non-linear PC-TCM encoder providing lowest waterfall part (having the lowest $E_b/N_o$) with the lowest BER (Bit Error Rate), or the lowest BER floor. This may also include selecting the state transition mapping that provides the best performance based on the trellis of selected non-systematic and non-linear constituent trellis encoder. In addition, the method will also involve selecting the constellation mapper for the output symbols that provides the best performance.

The method may also involve performing puncturing using one of the constituent encoders in order to achieve higher code rate encoders. This puncturing may also involve performing puncturing of various bits within the multiple encoded bit groups that are output from the encoders to form multiple output symbols. These multiple output symbols may be mapped according to different constellation mappings.

Referring to the FIG. 40, the method of this embodiment involves identifying a fixed output state distribution and the fixed state transitions (or trellis branches, or state transitions) for a given trellis. In addition, for the trellis, the method also involves identifying the corresponding input state distributions that will support non-systematic trellis encoding for that particular trellis. This may involve including both linear and non-linear trellises within this search; alternatively, the method may involve extending the search range of possible input state distributions to include only non-linear trellises.

The method then also involves identifying the possible non-systematic and non-linear PC-TCM encoders that may be constructed using the various corresponding non-systematic and non-linear trellis encoders that have been identified above. Once these non-systematic and non-linear PC-TCM encoders have been identified, then the method also involves identifying output symbol mappers that are operable to map the output symbols from these various non-systematic and non-linear PC-TCM encoders to the corresponding constellations that provide for best performances (e.g., lowest BER (Bit Error Rates).

Once appropriate symbol mappers are identified for these non-systematic and non-linear PC-TCM encoders, the method then involves determining the overall performance for these various non-systematic and non-linear PC-TCM encoders. That is to say, this involves selecting the non-systematic and non-linear PC-TCM encoder providing lowest waterfall part (having the lowest $E_b/N_o$) with the lowest BER (Bit Error Rate), or the lowest BER floor. The method then also involves selecting the non-systematic and non-linear PC-TCM encoder that provides the best performance among all of those non-systematic and non-linear PC-TCM encoders that have been analyzed.

In view of the above detailed description of the invention and associated drawings, other modifications and variations will now become apparent. It should also be apparent that such other modifications and variations may be effected without departing from the spirit and scope of the invention.

What is claimed is:

1. A non-systematic and non-linear PC-TCM (Parallel Concatenate Trellis Coded Modulation) code design method, the method comprising:

for a trellis, identifying a fixed output state distribution and a plurality of fixed state transitions;

for the trellis, identifying a corresponding input state distribution to support non-systematic and non-linear trellis encoding using the trellis;

identifying a plurality of possible non-systematic and non-linear PC-TCM encoders capable of performing the non-systematic and non-linear trellis encoding using the trellis according to the identified, corresponding input state distribution, the fixed output state distribution, and the plurality of fixed state transitions;

for each non-systematic and non-linear PC-TCM encoder of the plurality of possible non-systematic and non-linear PC-TCM encoders, identifying a symbol mapper, operable to map output symbols to a corresponding constellation, that provides for a best performance in terms of a lowest BER (Bit Error Rate) for output bits that are grouped into the output symbols;

determining the overall performance of each non-systematic and non-linear PC-TCM encoder of the plurality of possible non-systematic and non-linear PC-TCM encoders in terms of the $E_b/N_0$ (ratio of energy per bit $E_b$ to the Spectral Noise Density $N_0$) waterfall parts and corresponding BERs; and selecting a non-systematic and non-linear PC-TCM encoder of the plurality of possible non-systematic and non-linear PC-TCM encoders that provides the lowest $E_b/N_0$ waterfall part with the lowest BER floor.

2. The method of claim 1, wherein:

the selected non-systematic and non-linear PC-TCM encoder includes a rate k/k+n upper constituent encoder and a rate k/k+n lower constituent encoder;

input provided to the rate k/k+n lower constituent encoder passes through an interleaver that is operable to perform sub-block interleaving on groups of input bits taken during alternate clock cycles; and k and n are both integers.

3. The method of claim 2, wherein:

during alternate clock cycles, the symbol mapper alternatively maps output symbols generated by the rate k/k+n upper constituent encoder and the rate k/k+n lower constituent encoder, respectively.

4. The method of claim 2, wherein:

the rate k/k+n upper constituent encoder and the rate k/k+n lower constituent encoder are both rate 2/3 constituent encoders, rate 5/6 constituent encoders, rate 8/9 constituent encoders, or rate 3/4 constituent encoders.

5. The method of claim 4; wherein:

each of the rate 5/6 constituent encoders and the rate 8/9 constituent encoders is implemented using a rate 2/3 constituent encoder in conjunction with puncturing of at least output bit.

6. The method of claim 5, wherein:

for the rate 5/6 constituent encoders, the output bits are grouped to simultaneously form 2 separate output symbols of 3 bits each; and for the rate 8/9 constituent encoders, the output bits are grouped to simultaneously form 3 separate output symbols of 3 bits each.

7. The method of claim 4, wherein:

the output bits include at least one encoded bit and at least one uncoded bit.

8. The method of claim 2, wherein:

the trellis is an 8 state trellis;

the rate k/k+n upper constituent encoder and the rate k/k+n lower constituent encoder are both rate 2/3 constituent encoders; and each of the rate 2/3 upper constituent encoder and the rate 2/3 lower constituent encoder encodes input symbols including 2 bits each and generates output symbols including 3 bits each.

9. The method of claim 1, wherein:

the selected non-systematic and non-linear PC-TCM encoder is a rate 2/3 non-systematic and non-linear PC-TCM encoder that maps output symbols to an 8 PSK (8 Phase Shift Key) shaped constellation according to the identified symbol mapper;

for a communication channel having a Shannon's limit capacity of approximately 2 bits per second per Hz (Hertz), the lowest $E_b/N_0$ waterfall part of the rate 2/3 non-systematic and non-linear PC-TCM encoder ranges between approximately 3.45 dB (decibels) at a BER of approximately $2\times10^{-3}$ and approximately 3.65 db at a BER of approximately $3\times10^{-7}$; and the BER floor of the rate 2/3 non-systematic and non-linear PC-TCM encoder ranges between approximately $2\times10^{-7}$ and approximately $3\times10^{-7}$.

10. The method of claim 1, further comprising:

implementing the selected non-systematic and non-linear PC-TCM encoder within at least one of a satellite communication system, an HDTV (High Definition Television) communication system, a cellular communication system, a microwave communication system, a point-to-point communication system, and a uni-directional communication system, a bi-directional communication system, and a one to many communication system.

11. A non-systematic and non-linear PC-TCM (Parallel Concatenate Trellis Coded Modulation) code design method, the method comprising:

for a trellis, identifying a fixed output state distribution and a plurality of fixed state transitions;

for the trellis, identifying a corresponding input state distribution to support non-systematic and non-linear trellis encoding using the trellis;

identifying a plurality of possible non-systematic and non-linear PC-TCM encoders capable of performing the non-systematic and non-linear trellis encoding using the trellis according to the identified, corresponding input state distribution, the fixed output state distribution, and the plurality of fixed state transitions;

for each non-systematic and non-linear PC-TCM encoder of the plurality of possible non-systematic and non-linear PC-TCM encoders, identifying a symbol mapper, operable to map output symbols to a corresponding constellation, that provides for a best performance in terms of a lowest BER (Bit Error Rate) for output bits that are grouped into the output symbols;

determining the overall performance of each non-systematic and non-linear PC-TCM encoder of the plurality of possible non-systematic and non-linear PC-TCM encoders in terms of the $E_b/N_0$ (ratio of energy per bit $E_b$ to the Spectral Noise Density $N_0$) waterfall parts and corresponding BERs;

selecting a non-systematic and non-linear PC-TCM encoder of the plurality of possible non-systematic and non-linear PC-TCM encoders that provides the lowest $E_b/N_0$ waterfall part with the lowest BER floor;

the selected non-systematic and non-linear PC-TCM encoder includes a rate k/k+n upper constituent encoder and a rate k/k+n lower constituent encoder;

input provided to the rate k/k+n lower constituent encoder passes through an interleaver that is operable to perform sub-block interleaving on groups of input bits taken during alternate clock cycles;

during alternate clock cycles, the symbol mapper alternatively maps output symbols generated by the rate k/k+n upper constituent encoder and the rate k/k+n lower constituent encoder, respectively; and wherein k and n are both integers.

12. The method of claim 11, wherein:

the rate k/k+n upper constituent encoder and the rate k/k+n lower constituent encoder are both rate 2/3 constituent encoders, rate 5/6 constituent encoders, rate 8/9 constituent encoders, or rate 3/4 constituent encoders;

each of the rate 5/6 constituent encoders and the rate 8/9 constituent encoders is implemented using a rate 2/3 constituent encoder in conjunction with puncturing of at least output bit;

for the rate 5/6 constituent encoders, the output bits are grouped to simultaneously form 2 separate output symbols of 3 bits each; and for the rate 8/9 constituent encoders, the output bits are grouped to simultaneously form 3 separate output symbols of 3 bits each.

13. The method of claim 11, wherein:

the trellis is an 8 state trellis;

the rate k/k+n upper constituent encoder and the rate k/k+n lower constituent encoder are both rate 2/3 constituent encoders; and each of the rate 2/3 upper constituent encoder and the rate 2/3 lower constituent encoder encodes input symbols including 2 bits each and generates output symbols including 3 bits each.

14. The method of claim 11, wherein:

the selected non-systematic and non-linear PC-TCM encoder is a rate 2/3 non-systematic and non-linear PC-TCM encoder that maps output symbols to an 8 PSK (8 Phase Shift Key) shaped constellation according to the identified symbol mapper;

for a communication channel having a Shannon's limit capacity of approximately 2 bits per second per Hz (Hertz), the lowest $E_b/N_0$ waterfall part of the rate 2/3 non-systematic and non-linear PC-TCM encoder ranges between approximately 3.45 dB (decibels) at a BER of approximately $2 \times 10^{-3}$ and approximately 3.65 dB at a BER of approximately $3 \times 10^{-7}$; and the BER floor of the rate 2/3 non-systematic and non-linear PC-TCM encoder ranges between approximately $2 \times 10^{-7}$ and approximately $3 \times 10^{-7}$.

15. The method of claim 11, further comprising:

implementing the selected non-systematic and non-linear PC-TCM encoder within at least one of a satellite communication system, an HDTV (High Definition Television) communication system, a cellular communication system, a microwave communication system, a point-to-point communication system, and a unidirectional communication system, a bi-directional communication system, and a one to many communication system.

16. A non-systematic and non-linear PC-TCM (Parallel Concatenate Trellis Coded Modulation) encoder, the encoder comprising:

a rate k/k+n upper constituent encoder that is operable to receive input bits and to generate a first plurality of output bits there from;

a sub-block interleaver that is operable to interleave input bit sub-blocks selected during alternate clock cycles;

a rate k/k+n lower constituent encoder that is operable to receive the interleaved input bit sub-blocks from the sub-block interleaver and to generate a second plurality of output bits there from;

during alternate clock cycles, a symbol mapper that alternatively selects and groups bits from the first plurality of output bits and the second plurality of output bits to generate a plurality of output symbols;

wherein the symbol mapper maps output symbols from the plurality of output symbols to a constellation according to a symbol mapping;

wherein each of the rate k/k+n upper constituent encoder and the rate k/k+n lower constituent encoder employs a trellis having a fixed output state distribution and a plurality of fixed state transitions;

wherein a corresponding input state distribution for the trellis is identified and employed to support non-systematic and non-linear trellis encoding within each of the rate k/k+n upper constituent encoder and the rate k/k+n lower constituent encoder; and wherein k and n are both integers.

17. The encoder of claim 16, wherein:

the rate k/k+n upper constituent encoder and the rate k/k+n lower constituent encoder are both rate 2/3 constituent encoders.

18. The encoder of claim 16, wherein:

the symbol mapper selects and employs at least one uncoded bit when generating at least one output symbol of the plurality of output symbols.

19. The encoder of claim 16, wherein:

the rate k/k+n upper constituent encoder and the rate k/k+n lower constituent encoder are both rate 5/6 constituent encoders, rate 8/9 constituent encoders, or rate 3/4 constituent encoders.

20. The encoder of claim 16, wherein:

each of the rate 5/6 constituent encoders and the rate 8/9 constituent encoders is implemented using a rate 2/3 constituent encoder in conjunction with puncturing of at least output bit.

21. The encoder of claim 20, wherein:

for the rate 5/6 constituent encoders, the output bits are grouped to simultaneously form 2 separate output symbols of 3 bits each;

for the rate 8/9 constituent encoders, the output bits are grouped to simultaneously form 3 separate output symbols of 3 bits each;

the output symbols of 3 bits each are 8 PSK (8 Phase Shift Key) output symbols; and the symbol mapper is an 8 PSK symbol mapper.

22. The encoder of claim 16, wherein:

for the rate 3/4 constituent encoders, three output bits and one uncoded bit are grouped to form an output symbols having 4 bits;

the output symbol having 4 bits is a 16 QAM (16 Quadrature Amplitude Modulation) output symbol; and the symbol mapper is a 16 QAM symbol mapper.

23. The encoder of claim 16, wherein:

the trellis is an 8 state trellis;

the rate k/k+n upper constituent encoder and the rate k/k+n lower constituent encoder are both rate 2/3 constituent encoders; and each of the rate 2/3 upper constituent encoder and the rate 2/3 lower constituent encoder encodes input symbols including 2 bits each and generates output symbols including 3 bits each.

24. The encoder of claim 16, wherein:

the non-systematic and non-linear PC-TCM encoder is a rate 2/3 non-systematic and non-linear PC-TCM encoder;

the symbol mapper maps output symbols to an 8 PSK (8 Phase Shift Key) shaped constellation;

for a communication channel having a Shannon's limit capacity of approximately 2 bits per second per Hz (Hertz), the lowest $E_b/N_0$ (ratio of energy per bit $E_b$ to the Spectral Noise Density $N_0$) waterfall part of the rate 2/3 non-systematic and non-linear PC-TCM encoder ranges between approximately 3.45 dB (decibels) at a BER (Bit Error Rate) of approximately $2 \times 10^{-3}$ and approximately 3.65 dB at a BER of approximately $3 \times 10^{-7}$; and the BER floor of the rate 2/3 non-systematic and non-linear PC-TCM encoder ranges between approximately $2 \times 10^{-7}$ and approximately $3 \times 10^{-7}$.

25. The encoder of claim 16, wherein:
the encoder is implemented within at least one of a satellite communication system, an HDTV (High Definition Television) communication system, a cellular communication system, a microwave communication system, a point-to-point communication system, and a uni-directional communication system, a bi-directional communication system, and a one to many communication system.

26. A rate 2/3 non-systematic and non-linear PC-TCM (Parallel Concatenate Trellis Coded Modulation) encoder, the encoder comprising:
a rate 2/3 upper constituent encoder that is operable to receive input bits and to generate a first plurality of output bits there from;
a sub-block interleaver that is operable to interleave input bit sub-blocks selected during alternate clock cycles, the input bit sub-blocks being generated from an input bit block;
a rate 2/3 lower constituent encoder that is operable to receive the interleaved input bit sub-blocks from the sub-block interleaver and to generate a second plurality of output bits there from;
during alternate clock cycles, a symbol mapper that alternatively selects and groups bits from the first plurality of output bits and the second plurality of output bits to generate a plurality of output symbols;
the symbol mapper maps output symbols from the plurality of output symbols to a constellation according to a symbol mapping;
wherein each of the rate 2/3 upper constituent encoder and the rate 2/3 lower constituent encoder employs a trellis having a fixed output state distribution and a plurality of fixed state transitions; and
wherein a corresponding input state distribution for the trellis is identified and employed to support non-systematic and non-linear trellis encoding within each of the rate 2/3 upper constituent encoder and the rate 2/3 lower constituent encoder.

27. The encoder of claim 26, wherein:
the trellis is an 8 state trellis; and
each of the rate 2/3 upper constituent encoder and the rate 2/3 lower constituent encoder encodes input symbols including 2 bits each and generates output symbols including 3 bits each.

28. The encoder of claim 26, wherein:
the symbol mapper maps output symbols to an 8 PSK (8 Phase Shift Key) shaped constellation;
for a communication channel having a Shannon's limit capacity of approximately 2 bits per second per Hz (Hertz), the lowest $E_b/N_0$ (ratio of energy per bit $E_b$ to the Spectral Noise Density $N_0$) waterfall part of the rate 2/3 non-systematic and non-linear PC-TCM encoder ranges between approximately 3.45 dB (decibels) at a BER (Bit Error Rate) of approximately $2 \times 10^{-3}$ and approximately 3.65 dB at a BER of approximately $3 \times 10^{-7}$; and
the BER floor of the rate 2/3 non-systematic and non-linear PC-TCM encoder ranges between approximately $2 \times 10^{-7}$ and approximately $3 \times 10^{-7}$.

29. The encoder of claim 26, wherein:
the encoder is implemented within at least one of a satellite communication system, an HDTV (High Definition Television) communication system, a cellular communication system, a microwave communication system, a point-to-point communication system, and a uni-directional communication system, a bi-directional communication system, and a one to many communication system.

30. A rate 5/6 and two 8-PSK non-systematic and non-linear PC-TCM (Parallel Concatenate Trellis Coded Modulation) encoder, the encoder comprising:
a rate 5/6 upper constituent encoder that is operable to receive input bits and to generate a first plurality of output bits there from;
a sub-block interleaver that is operable to interleave input bit sub-blocks selected during alternate clock cycles, the input bit sub-blocks being generated from an input bit block;
a rate 5/6 lower constituent encoder that is operable to receive the interleaved input bit sub-blocks from the sub-block interleaver and to generate a second plurality of output bits there from;
during alternate clock cycles, a symbol mapper that alternatively selects and groups bits from the first plurality of output bits and the second plurality of output bits to generate a plurality of output symbols;
the symbol mapper maps output symbols from the plurality of output symbols to a constellation according to a symbol mapping;
wherein each of the rate 5/6 upper constituent encoder and the rate 5/6 lower constituent encoder employs a trellis having a fixed output state distribution and a plurality of fixed state transitions;
wherein a corresponding input state distribution for the trellis is identified and employed to support non-systematic and non-linear trellis encoding within each of the rate 5/6 upper constituent encoder and the rate 5/6 lower constituent encoder;
wherein each of the rate 5/6 upper constituent encoder and the rate 5/6 lower constituent encoder includes a rate 2/3 non-systematic encoder;
wherein the trellis is an 8 state trellis;
wherein each of the rate 2/3 non-systematic encoders within the rate 5/6 upper constituent encoder and the rate 5/6 lower constituent encoder encodes input symbols including 2 bits each and generates output symbols including 3 bits each; and
wherein the plurality of output symbols includes 2 output symbols of 3 bits each such that the 2 output symbols are 8 PSK (8 Phase Shift Key) symbols.

31. The encoder of claim 30, wherein:
the 2 output symbols are simultaneously generated over a 2 clock cycle period; and
at least one output symbol of the 2 output symbols includes at least one uncoded bit.

32. The encoder of claim 30, wherein:
the 2 output symbols are simultaneously generated over a 2 clock cycle period; and
at least one output bit of the first plurality of output bits and the second plurality of output bits is punctured when forming the 2 output symbols.

33. The encoder of claim 30, wherein:
the symbol mapper maps the 2 output symbols to an 8 PSK (8 Phase Shift Key) shaped constellation using 2 different constellation mappings;
for a communication channel having a Shannon's limit capacity of approximately 2.5 bits per second per Hz (Hertz), the lowest $E_b/N_0$ (ratio of energy per bit $E_b$ to the Spectral Noise Density $N_0$) waterfall part of the rate 5/6 and 2-8PSK non-systematic and non-linear PC- TCM encoder ranges between approximately 5.5 dB (decibels) at a BER (Bit Error Rate) of approximately $2 \times 10^{-4}$ and approximately 5.66 dB at a BER of approximately $2 \times 10^{-6}$; and the BER floor of the rate 5/6 and 2-8PSK non-systematic and non-linear PC-TCM encoder ranges between approximately $1.75 \times 10^{-6}$ and approximately $2 \times 10^{-6}$.

34. A rate 8/9 and 8-PSK non-systematic and non-linear PC-TCM (Parallel Concatenate Trellis Coded Modulation) encoder, the encoder comprising:

a rate 8/9 upper constituent encoder that is operable to receive input bits and to generate a first plurality of output bits there from;

a sub-block interleaver that is operable to interleave input bit sub-blocks selected during alternate clock cycles, the input bit sub-blocks being generated from an input bit block;

a rate 8/9 lower constituent encoder that is operable to receive the interleaved input bit sub-blocks from the sub-block interleaver and to generate a second plurality of output bits there from;

during alternate clock cycles, a symbol mapper that alternatively selects and groups bits from the first plurality of output bits and the second plurality of output bits to generate a plurality of output symbols;

the symbol mapper maps output symbols from the plurality of output symbols to a constellation according to a symbol mapping;

wherein each of the rate 8/9 upper constituent encoder and the rate 8/9 lower constituent encoder employs a trellis having a fixed output state distribution and a plurality of fixed state transitions;

wherein a corresponding input state distribution for the trellis is identified and employed to support non-systematic and non-linear trellis encoding within each of the rate 8/9 upper constituent encoder and the rate 8/9 lower constituent encoder;

wherein each of the rate 8/9 upper constituent encoder and the rate 8/9 lower constituent encoder includes a rate 2/3 non-systematic encoder;

wherein the trellis is an 8 state trellis;

wherein each of the rate 2/3 non-systematic encoders within the rate 8/9 upper constituent encoder and the rate 8/9 lower constituent encoder encodes input symbols including 2 bits each and generates output symbols including 3 bits each; and wherein the plurality of output symbols includes 3 output symbols of 3 bits each such that the 3 output symbols are 8 PSK (8 Phase Shift Key) symbols.

35. The encoder of claim 34, wherein:

the 3 output symbols are simultaneously generated over a 3 clock cycle period; and at least one output symbol of the 3 output symbols includes at least one uncoded bit.

36. The encoder of claim 34, wherein:

the 3 output symbols are simultaneously generated over a 3 clock cycle period; and at least one output bit of the first plurality of output bits and the second plurality of output bits is punctured when forming the 3 output symbols.

37. The encoder of claim 34, wherein:

the symbol mapper maps the 3 output symbols to an 8 PSK (8 Phase Shift Key) shaped constellation using 3 different constellation mappings;

for a communication channel having a Shannon's limit capacity of approximately 2.66 bits per second per Hz (Hertz), the lowest $E_b/N_0$ (ratio of energy per bit $E_b$ to the Spectral Noise Density $N_0$) waterfall part of the rate 8/9 and 3-8PSK non-systematic and non-linear PC-TCM encoder ranges between approximately 6.55 dB (decibels) at a BER (Bit Error Rate) of approximately $4 \times 10^{-5}$ and approximately 6.65 dB at a BER of approximately $1.5 \times 10^{-6}$; and the BER floor of the rate 8/9 and 3-8PSK non-systematic and non-linear PC-TCM encoder ranges between approximately $1 \times 10^{-6}$ and approximately $15 \times 10^{-6}$.

* * * * *

UNITED STATES PATENT AND TRADEMARK OFFICE
CERTIFICATE OF CORRECTION

PATENT NO. : 7,221,714 B2 Page 1 of 1
APPLICATION NO. : 10/446318
DATED : May 22, 2007
INVENTOR(S) : Ba-Zhong Shen et al.

It is certified that error appears in the above-identified patent and that said Letters Patent is hereby corrected as shown below:

Column 43, line 8, in Claim 34: before "8-PSK" insert --three--

Signed and Sealed this

Twenty-second Day of July, 2008

JON W. DUDAS
*Director of the United States Patent and Trademark Office*